US010700799B2

(12) United States Patent
Chang et al.

(10) Patent No.: US 10,700,799 B2
(45) Date of Patent: Jun. 30, 2020

(54) METHOD AND APPARATUS FOR BROADCAST SIGNAL TRANSMISSION

(71) Applicant: DS BROADCAST, INC., Daejeon (KR)

(72) Inventors: Hyun Sik Chang, Seoul (KR); Joo Yeon Hwang, Gwangju-si (KR)

(73) Assignee: DS BROADCAST, INC., Daejeon (KR)

( * ) Notice: Subject to any disclaimer, the term of this patent is extended or adjusted under 35 U.S.C. 154(b) by 20 days.

(21) Appl. No.: 16/032,983

(22) Filed: Jul. 11, 2018

(65) Prior Publication Data
US 2019/0207696 A1    Jul. 4, 2019

(30) Foreign Application Priority Data

Dec. 28, 2017 (KR) .......................... 10-2017-0183053
Feb. 22, 2018 (KR) .......................... 10-2018-0021142

(51) Int. Cl.
| H04W 56/00 | (2009.01) |
| H04J 3/06 | (2006.01) |
| H04N 21/24 | (2011.01) |
| H04N 21/236 | (2011.01) |
| H04N 21/2368 | (2011.01) |
| H04J 13/10 | (2011.01) |
| H04L 12/54 | (2013.01) |
| H04L 12/70 | (2013.01) |

(52) U.S. Cl.
CPC ............ *H04J 3/0682* (2013.01); *H04J 13/10* (2013.01); *H04L 12/5601* (2013.01); *H04N 21/2368* (2013.01); *H04N 21/23611* (2013.01); *H04N 21/2401* (2013.01); *H04L 2012/5636* (2013.01)

(58) Field of Classification Search
CPC ...... H04J 3/0682; H04J 13/10; H04J 12/5601; H04J 2012/5636
USPC ........................................................ 370/350
See application file for complete search history.

(56) References Cited

U.S. PATENT DOCUMENTS 6,421,359 B1    7/2002  Bennett et al.
6,584,120 B1    6/2003  Shiomoto et al.
(Continued)

FOREIGN PATENT DOCUMENTS

EP    0719054 A2    6/1996
EP    1011224 A2    6/2000
(Continued)

*Primary Examiner* — Sai Ming Chan
(74) *Attorney, Agent, or Firm* — Maschoff Brennan

(57) ABSTRACT

The method and apparatus for broadcast signal transmission are provided. A method of adjusting points of time when output packets are to be provided, performed by a stream generation device which provides an output stream, including the output packets, to a decoding device, according to an embodiment may include obtaining a first output packet and a second output packet; assigning a first multiplexing time to the first output packet and assigning a second multiplexing time different from the first multiplexing time to the second output packet; and providing the first output packet and the second output packet in the output stream to the decoding device by multiplexing the first output packet and the second output packet on the basis of the first multiplexing time and the second multiplexing time.

18 Claims, 33 Drawing Sheets

100

(56) References Cited

U.S. PATENT DOCUMENTS

| | | | |
|---|---|---|---|
| 6,931,021 B1* | 8/2005 | Enari | H04H 60/04 |
| | | | 348/E5.008 |
| 7,100,182 B2 | 8/2006 | Choi et al. | |
| 9,307,298 B2* | 4/2016 | Milne | H04N 21/23655 |
| 2005/0013377 A1 | 1/2005 | Kirihara | |
| 2005/0013593 A1 | 1/2005 | Jung et al. | |
| 2005/0190872 A1* | 9/2005 | Seong | H04N 21/23608 |
| | | | 375/354 |
| 2005/0232597 A1* | 10/2005 | Shimazaki | H04N 5/772 |
| | | | 386/240 |
| 2006/0007958 A1 | 1/2006 | Kang et al. | |
| 2007/0237187 A1 | 10/2007 | Aoki | |
| 2009/0028192 A1* | 1/2009 | Rieger | H04H 20/42 |
| | | | 370/535 |
| 2009/0169177 A1* | 7/2009 | Ui | H04N 5/85 |
| | | | 386/338 |
| 2010/0061466 A1* | 3/2010 | Gozen | G10L 19/167 |
| | | | 375/240.28 |
| 2014/0334553 A1* | 11/2014 | Novotny | H04N 19/115 |
| | | | 375/240.26 |
| 2016/0337672 A1 | 11/2016 | Lee et al. | |
| 2017/0048560 A1 | 2/2017 | Tanaka et al. | |

FOREIGN PATENT DOCUMENTS

| | | |
|---|---|---|
| JP | 2003-163897 A | 6/2003 |
| KR | 10-2002-0094427 A | 12/2002 |
| KR | 10-2004-0086564 A | 10/2004 |
| KR | 10-2005-0009673 A | 1/2005 |
| KR | 10-2006-0005207 A | 1/2006 |
| KR | 10-2008-0008928 A | 1/2008 |
| KR | 10-2017-0136005 A | 12/2017 |
| WO | 2015/146378 A1 | 10/2015 |

\* cited by examiner

METHOD AND APPARATUS FOR BROADCAST SIGNAL TRANSMISSION

CROSS-REFERENCE TO RELATED APPLICATION

This application claims priority to and the benefit of Korean Patent Application No. 10-2017-0183053, filed on Dec. 28, 2017 and Korean Patent Application No. 10-2018-0021142, filed on Feb. 22, 2018 the disclosure of which is incorporated herein by reference in its entirety.

BACKGROUND

1. Field of the Disclosure

Embodiments set forth herein relate to the method and apparatus for broadcast signal transmission.

2. Discussion of Related Art

As the conversion of analog broadcasting to digital broadcasting has almost been completed all over the world, the demand for research on new next-generation broadcasting standards to prepare for the Post-HD generation, e.g., realistic large-capacity broadcasting, such as that for Ultra-High Definition TVs (UHDTVs), and a broadcasting communication convergence environment, is increasing. In this regard, fourteen institutes, such as the Advanced Television Systems Committee (ATSC), Digital Video Broadcasting (DVB), the European Broadcasting Union (EBU), NHK, the Electronics and Telecommunications Research Institute (ETRI), etc., have formed the Future of Broadcast TV (FoBTV) on November of 2011 and have begun a discussion about future broadcasting systems, e.g., the role of broadband echo system-based broadcasting, the features of next-generation terrestrial broadcasting systems, spectrum squeeze, etc. Furthermore, as mobile communication technology is increasingly advanced and the conversion to digital broadcasting is being completed, in order to acquire highly developed next-generation broadcasting technology, technical development of the DVB 2.0 system, the ATSC 3.0 system, and the Integrated Services Digital Broadcasting (ISDB)-Terrestrial mobile multi-media (Tmm) system have already been advanced in Europe, the USA, and Japan. Accordingly, research on equipment of original technology and new services for future broadcasting technology related thereto is needed in Korea.

SUMMARY OF THE DISCLOSURE

The present disclosure is directed the method and apparatus for broadcast signal transmission.

The present disclosure is also directed to a method of generating an output stream available in an Advanced Television Systems Committee (ATSC) 3.0 broadcasting system.

The present disclosure is also directed to a method of generating an output stream available in an UHD broadcasting system.

The present disclosure is also directed to a method of multiplexing output packets, which is performed by a stream providing device, to prevent an error from occurring in a decoding device.

Aspects of the present disclosure should not be understood as being limited thereto, and other aspects of the present disclosure not mentioned herein will be clearly understood by those of ordinary skill in the art from the present specification and the accompanying drawings.

According to the one embodiment, there is provided a method for adjusting output packet provision timing of a stream generation device, wherein the stream generation device providing an output stream including output packets to a decoding device, the method comprising: obtaining a first output packet and a second output packet; assigning a first multiplexing time to the first output packet and a second multiplexing time different than the first multiplexing time to the second output packet; multiplexing the first output packet and the second output packet based on the first multiplexing time and the second multiplexing time; and providing the multiplexed first output packet and second output packet as the output stream to the decoding device, wherein a timing that the first output packet and the second output packet are provided to the decoding device is adjusted such that an error related to the first output packet and the second output packet is not occurred in the decoding device.

According to the one embodiment, there is provided a method for adjusting output packet provision timing of a stream generation device, wherein the stream generation device providing an output stream including output packets to a decoding device, the method comprising: obtaining a first output packet and a second output packet; assigning a first multiplexing time to the first output packet and a second multiplexing time different than the first multiplexing time to the second output packet; multiplexing the first output packet and the second output packet based on the first multiplexing time and the second multiplexing time; and providing the multiplexed first output packet and second output packet as the output stream to the decoding device, wherein a timing that the first output packet and the second output packet are provided to the decoding device is adjusted such that an error related to the first output packet and the second output packet is not occurred in the decoding device.

Technical solutions should be understood as not being limited thereto, and other solutions not mentioned herein will be clearly understood by those of ordinary skill in the art from the present specification and the accompanying drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
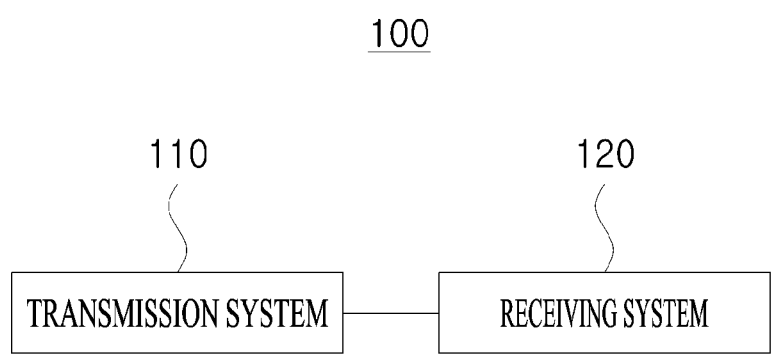
FIG. 1 is a block diagram of a broadcasting system according to an embodiment.

Hereinafter, embodiments will be described in detail below with reference to the accompanying drawings. However, the present disclosure is not limited thereto. In the drawings, the same reference numerals denote the same reference components.

The method and apparatus for multiplexing broadcast signal will be provided below. In one embodiment, a broadcast signal may be provided for a broadcast service, and examples thereof may include a terrestrial broadcast service, an Internet protocol television (IPTV) broadcast service, a satellite broadcast service, a mobile broadcast service, a high-definition (HD) TV service, a full-HD (FHD) TV service, an Ultra-HD (UHD) TV service, etc. However, the broadcast service according to the embodiment is not limited thereto, and should be understood to include all broadcasting services which may be provided using a broadcast signal. For example, the broadcast service may include a virtual-reality (VR) broadcast service, a 360-degree VR broadcast service, and a three-dimensional (3D) broadcast service.

In one embodiment, a stream providing a broadcast signal may be a Moving Picture Exports Group-2 (MPEG-2) transport stream (TS), Real-time Object delivery over Unidirectional Transport (ROUTE), or an MPEG Media Transport Protocol (MMTP). The ROUTE and the MMTP represent broadcast network transport stream multiplexing standards for which standardization is being proceeded with by the Advanced Television Systems Committee (ATSC) 3.0. A transport stream transmitted via the Internet is subject to MPEG-Dynamic Adaptive Streaming over HTTP (DASH) standards. However, the present disclosure is not limited thereto.

According to one embodiment, there is provided a stream generation method of generating an output stream on the basis of a first elementary stream and a second elementary stream, performed by a stream generation device, the stream generation method including obtaining first output packets on the basis of the first elementary stream, obtaining second output packets on the basis of the second elementary stream, and providing an output stream by multiplexing the first output packets and the second output packets. The providing of the output stream may include dispersing null packets included in the output stream to prevent an error from being mistaken as occurring in the stream generation device due to the provided output stream.

In one embodiment, the first elementary stream may include a video elementary stream, the second elementary stream may include an audio elementary stream, and the stream generation method may further include obtaining the first elementary stream from a video encoder at first elementary stream bitrate; and the second elementary stream from an audio encoder at a second elementary stream bitrate.

In the providing of the output stream, the output stream may be provided at a output bitrate, and the output bitrate may be greater than or equal to the sum of the first elementary stream bitrate and the second elementary stream bitrate.

A total number of the null packets included in the output stream may correspond to a bitrate calculated by subtracting the first elementary stream bitrate and the second elementary stream bitrate from the output bitrate. The providing of the output stream may include sequencing the first output packets, the second output packets, and the null packets in the output stream to prevent a certain number or more of null packets from being consecutively arranged among the total number of the null packets included in the output stream.

In one embodiment, the stream generation method may further include assigning different multiplexing time to the first output packets on the basis of the first elementary stream bitrate and assigning different multiplexing time to the second output packets on the basis of the second elementary stream bitrate. The providing of the output stream may include sequencing the first output packets and the second output packets in the output stream on the basis of the multiplexing time assigned to the first output packets and the multiplexing time assigned to the second output packets.

The providing of the output stream may include forming the output stream with the first output packets and the second output packets on the basis of the multiplexing time assigned to the first output packets and the multiplexing time assigned to the second output packets, and arranging the null packets in the remaining region of the output stream in which the first output packets and the second output packets are not located.

In one embodiment, the stream generation method may further include setting reference times for multiplexing the output streams on the basis of the output bitrate. The providing of the output stream may include sequencing the first output packets and the second output packets in the output stream by comparing the multiplexing time assigned to the first output packets and the multiplexing time assigned to the second output packets with the reference times.

The providing of the output stream may include inserting an $n^{th}$ first output packet among the first output packets into a location on the output stream corresponding to the first reference time when the multiplexing time of the $n^{th}$ first output packet is earlier than the first reference time among the reference times and the multiplexing time of an $m^{th}$ second output packet among the second output packets is later than the first reference time.

In one embodiment, in the stream generation method, the providing of the output stream may include locating the null packet at a location on the output stream corresponding to the first reference time when the multiplexing time of the $n^{th}$ first output packet among the first output packets is later than the first reference time among the reference times and the multiplexing time of the $m^{th}$ second output packet among the second output packets is later than the first reference time.

The providing of the output stream may include determining priorities of the $n^{th}$ first output packet and an $m^{th}$ second output packet and locating a higher-priority output packet among the $n^{th}$ first output packet and the $m^{th}$ second output packet at a location corresponding to the first reference time when the multiplexing time of the $n^{th}$ first output packet among the first output packets is earlier than the first reference time among the reference times and the multiplexing time of the $m^{th}$ second output packet among the second output packets is earlier than the first reference time.

The providing of the output stream may include determining an output packet assigned an earlier multiplexing time among the multiplexing time of the $n^{th}$ first output packet and the multiplexing time of the $m^{th}$ second output packet to be a higher-priority output packet.

The providing of the output stream may include determining priorities of the $n^{th}$ first output packet and the $m^{th}$ second output packet on the basis of types of access units included in the $n^{th}$ first output packet and the $m^{th}$ second output packet.

The assigning of the different multiplexing time to the first output packets on the basis of the first elementary stream bitrate may include assigning different multiplexing time to the first output packets on the basis of sizes of the access units included in the first output packets.

The assigning of the different multiplexing time to the first output packets on the basis of the first elementary stream bitrate may include assigning different multiplexing time to the first output packets on the basis of sizes of the first output packets.

The assigning of the different multiplexing time to the first output packets on the basis of the first elementary stream bitrate may include adding an additional field containing information regarding the multiplexing time to each of the first output packets. The assigning of the different multiplexing time to the second output packets on the basis of the second elementary stream bitrate may include adding an additional field containing information regarding the multiplexing time to each of the second output packets. The providing of the output stream may include sequencing the first output packets and the second output packets in the output stream on the basis of the multiplexing time assigned to the first output packets and the second output packets, and removing the additional fields added to the first output packets and the second output packets.

According to an embodiment, there is provided a stream providing method including obtaining first output packets and second output packets at a first point of time for a first time section, obtaining third output packets and fourth output packets at a second point of time for the first time section, generating a first output stream by multiplexing the first output packets and the second output packets at a point of time corresponding to the first point of time, and generating a second output stream by multiplexing the third output packets and the fourth output packets at a point of time corresponding to the second point of time. The first output packets and the third output packets may be generated on the basis of video access units. The second output packets and the fourth output packets may be generated on the basis of audio access units. When the number of the second output packets and the number of the fourth output packets are equal and the number of the first output packets and the number of the third output packets are different by a predetermined number or more, locations of the second output packets in the first output stream and locations of the fourth output packets in the second output stream are different.

According to an embodiment, there is provided a stream generation device including a controller configured to generate an output stream on the basis of a first elementary stream and a second elementary stream, wherein the controller obtains first output packets on the basis of the first elementary stream, obtains second output packets on the basis of the second elementary stream, provides an output stream by multiplexing the first output packets and the second output packets, and disperses null packets to be in the output stream to prevent an error from being mistaken as occurring in the stream generation device due to the provided output stream.

According to the other embodiment, there is provided a method for adjusting output packet provision timing of a stream generation device, wherein the stream generation device providing an output stream including output packets to a decoding device, the method comprising: obtaining a first output packet and a second output packet; assigning a first multiplexing time to the first output packet and a second multiplexing time different than the first multiplexing time to the second output packet; multiplexing the first output packet and the second output packet based on the first multiplexing time and the second multiplexing time; and providing the multiplexed first output packet and second output packet as the output stream to the decoding device, wherein a timing that the first output packet and the second output packet are provided to the decoding device is adjusted such that an error related to the first output packet and the second output packet is not occurred in the decoding device.

Also, wherein the providing the multiplexed first output packet and second output packet may comprise, setting a first reference time for multiplexing the first output packet and the second reference time for multiplexing the second output packet based on a predetermined output bitrate; sequencing the first output packet to the output stream by comparing the first reference time and the first multiplexing time; and sequencing the second output packet to the output stream by comparing the second reference time and the second multiplexing time.

Also, according to the other embodiment, wherein when it is preset that the first output packet and the second output packet are obtained at the first bitrate, the assigning a first multiplexing time to the first output packet and a second multiplexing time different than the first multiplexing time to the second output packet may comprise assigning the first multiplexing time the first output packet and the second multiplexing time to the second output packet based on the first bitrate.

Also, the method may further comprise wherein when the first output packet and the second output packet are obtained at the second bitrate different than the first bitrate, adjusting the first multiplexing time and the second multiplexing time so that a time when the first output packet and the second output packet are provided to the decoding device is adjusted.

Also, wherein the adjusting the first multiplexing time and the second multiplexing time so that a time when the first output packet and the second output packet are provided to the decoding device is adjusted may comprise adjusting the first multiplexing time and the second multiplexing time without using the second bitrate.

Also, wherein the adjusting the first multiplexing time and the second multiplexing time so that a time when the first output packet and the second output packet are provided to the decoding device is adjusted may comprise adjusting the first multiplexing time and the second multiplexing time by applying a predetermined adjustment value to the first multiplexing time and the second multiplexing time.

Also, wherein the adjusting the first multiplexing time and the second multiplexing time so that a time when the first output packet and the second output packet are provided to the decoding device is adjusted may comprise adjusting the first multiplexing time and the second multiplexing time by increasing the first multiplexing time and the second multiplexing time by the predetermined adjustment value when the first bitrate larger than the second bitrate.

Also, wherein the adjusting the first multiplexing time and the second multiplexing time so that a time when the first output packet and the second output packet are provided to the decoding device is adjusted may comprise adjusting the first multiplexing time and the second multiplexing time by decreasing the first multiplexing time and the second multiplexing time by the predetermined adjustment value when the first bitrate smaller than the second bitrate.

Also, wherein the adjusting the first multiplexing time and the second multiplexing time so that a time when the first output packet and the second output packet are provided to the decoding device is adjusted may comprise adjusting the first multiplexing time and the second multiplexing time using the second bitrate.

Also, wherein the adjusting the first multiplexing time and the second multiplexing time so that a time when the first output packet and the second output packet are provided to the decoding device is adjusted may comprise adjusting the first multiplexing time and the second multiplexing time by applying a ratio of the first bitrate and the second bitrate to the first multiplexing time and the second multiplexing time.

Also, wherein the adjusting the first multiplexing time and the second multiplexing time so that a time when the first output packet and the second output packet are provided to the decoding device is adjusted may comprise selecting the predetermined adjustment value among a plurarlity of adjustment values based on a difference between the first bitrate and the second bitrate, and adjusting the first multiplexing time and the second multiplexing time by applying the selected predetermined adjustment value to the first multiplexing time and the second multiplexing time.

Also, wherein the timing that the first output packet and the second output packet are provided to the decoding device may be adjusted when an error related to the first output packet and the second output packet is occurred in the decoding apparatus.

Also, the method may further comprise obtaining information on the error from the decoding device, and determining whether or not the error has occurred in the decoding device based on the information.

Also, the method may further comprises estimating a time at which the first output packet and the second output packet are stored in a storage unit of the decoding device based on a virtual buffer in the stream generation device, and a time at which the first output packet and the second output packet are removed in the storage unit, and determining whether or not the error has occurred in the decoding device based on the time at which the first output packet and the second output packet are stored in the storage unit and the time at which the first output packet and the second output packet are removed in the storage unit.

Also, wherein the error related to the first output packet and the second output packet may include an overflow in the storage unit of the decoding device.

Also, wherein the error related to the first output packet and the second output packet may include a thing that at least one of the first output packet and the second output packet is not decoded at an intended time in the decoding device.

Also, the method may further comprise wherein when the first output packet and the second output packet are obtained at the second bitrate different than the first bitrate, adjusting the first reference time and the second reference time so that a time when the first output packet and the second output packet are provided to the decoding device is adjusted.

According to the another embodiment, there is provided a method for adjusting output packet provision timing of a stream generation device, wherein the stream generation device providing an output stream including output packets to a decoding device, the method comprising: presetting to obtain a first output packet and a second output packet at a first bitrate; obtaining the first output packet and the second output packet; multiplexing the first output packet and the second output packet according to a first sequence, wherein the first sequence represents the order in which the first output packet, the second output packet and at least one null packet are inserted into output stream; and providing the multiplexed first output packet and second output packet as the output stream to the decoding device, wherein when the first output packet and the second output packet are obtained at the second bitrate different than the first bitrate, multiplexing the first output packet and the second output packet according to a second sequence different than the first sequence such that an error related to the first output packet and the second output packet is not occurred in the decoding device.

According to the one embodiment, there is provided a stream generation device for providing an output stream including an output packet to a decoding device, the stream generation device comprising: a control unit is configured to obtaining a first output packet, assigning a first multiplexing time to the first output packet, multiplexing the first output packet according to the first multiplexing time, and providing the multiplexed first output packet as the output stream to the decoding device, wherein a timing that the first output packet is provided to the decoding device is adjusted such that an error related to the first output packet is not occurred in the decoding device.

FIG. 1 is a block diagram of a broadcasting system according to an embodiment.

Referring to FIG. 1, a broadcasting system 100 may include a transmission system 110 and a receiving system 120.

The transmission system 110 performs, for example, transmission of a service such as a TV program or the like (transmission of digital broadcasting or data). That is, the transmission system 110 transmits (sends), for example, a stream of target data to be transmitted, such as data regarding an image or sound which is a component of a service such as a TV program or the like, in the form of a broadcast signal via a transmission path. Here, the transmission path may be configured in various ways for transmitting the broadcast signal, e.g., a radio-frequency (RF) method or a network method.

In one embodiment, the transmission system 110 may be used to generate and transmit a broadcast signal of the broadcasting station. In this case, the broadcast signal may be transmitted using a frequency in a frequency band defined by operational regulations of the broadcasting system and according to regulations of a region/country operating the broadcasting system.

In one embodiment, the receiving system 120 may receive the broadcast signal transmitted from the transmission system 110 via the transmission path, decode the broadcast signal into an original stream, and output the original stream. For example, the receiving system 120 may include a decoding device and an image output device. The image output device may receive an output signal from the decoding device, and then output data regarding images or sound of a service, such as a TV program, according to the output signal.

In one embodiment, the receiving system 120 may receive the broadcast signal from the transmission system 110 according to a broadcast or broadband method. Here, the broadband method may be understood as a method of using a broadband as a frequency band for streamlining or downloading audio/video (AV) content using bidirectional Internet Protocol (IP) access, and the broadcast method may be understood as a conventional unidirectional transmission method such as Digital Video Broadcasting-Terrestrial (DVB-T), DVB-Satellite (DVB-S), or DVB-Cable (DVB-C).

In one embodiment, the receiving system 120 may obtain a broadcast signal via a broadcast network, and the broadcast signal may include linear A/V content, non-real-time A/V content, application data, application signaling information, etc.

Alternatively, the receiving system 120 may obtain a broadcast signal via a broadband network, and the broadcast signal may include application data, non-linear A/V content, etc. Here, the non-linear A/V content may be content, e.g., streaming-on-demand, for which a user may freely determine a content viewing time or determine a playback time in the content, and the linear A/V content may be push type content which may be viewed only in a specific time period for which a provider provides the content.

In one embodiment, the broadcasting system 100 is applicable to not only transmission of data in compliance with ATSC standards but also transmission of data in compliance with DVB standards or Integrated Services Digital Broadcasting (ISDB) standards or other data transmission. For convenience of explanation, an example of an ATSC 3.0-based broadcasting system will be described below. However, the present disclosure is not limited to the ATSC 3.0-based broadcasting system and is applicable to other systems.

Figure 2:
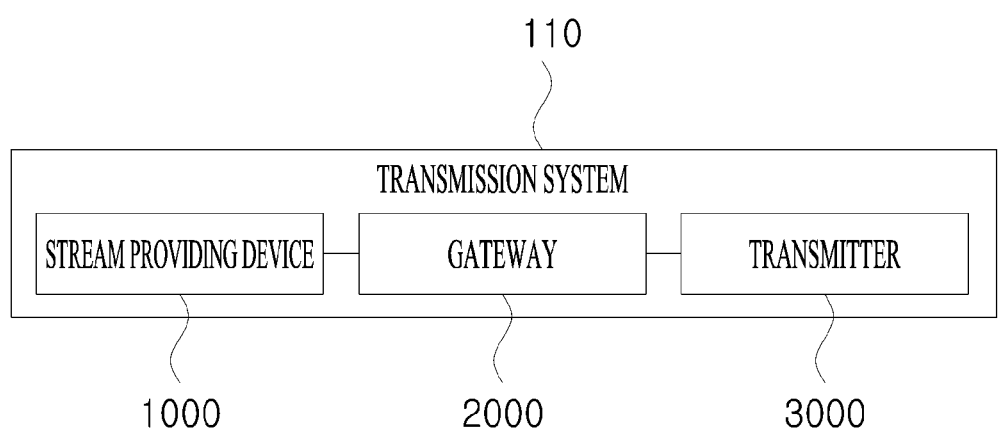
FIG. 2 is a block diagram of a transmission system according to an embodiment.

FIG. 2 is a block diagram of the transmission system according to the embodiment.

Referring to FIG. 2, the transmission system 110 may include a stream providing device 1000, a gateway 2000, and a transmitter 3000. Although not shown in FIG. 2, the transmission system 110 may include a studio (broadcasting studio) and a transmission station. In this case, the studio (broadcasting studio) may include the stream providing device 1000 and the gateway 2000, and the transmission station may include the transmitter 3000.

In one embodiment, the stream providing device 1000 may be a device which receives a source broadcast signal from the outside, converts the source broadcast signal to certain data according to certain regulations, and provides the converted certain data in the form of a stream to the gateway 2000. In one embodiment, the stream providing device 1000 may be embodied as an encoder. The source broadcast signal which the stream providing device 1000 receives from the outside may include a source video signal and a source audio signal. Here, the source video/audio signals may include analog or digital data. The source video signal may be a standard definition (SD) broadcast signal having a resolution of 720×480, a high-definition (HD) broadcast signal having a resolution of 1280×720, a full-HD (FHD) broadcast signal having a resolution of 1920×1080, a quad HD (QHD) broadcast signal having a resolution of 2560×1440, or an ultra HD (UHD) broadcast signal having a resolution of 3840×2160. Here, the UHD broadcast signal is technology called a next-generation broadcast image. Generally, the numbers of horizontal and vertical pixels of a UHD image may be in a range of 4000 (4 k UHD of 3840×2160 pixels) to 8000 (8 k UHD of 7680×4320 pixels). Since a resolution of a screen depends on the number of picture elements called pixels, a degree of sharpness of the UHD image, when having 4 k UHD, may be four times higher than an HD image having 2 k UHD of 1920×1080 pixels. A degree of sharpness of the UHD image, when having 8 k UHD, may be up to sixteen times higher than an HD image having 2 k UHD of 1920×1080 pixels. A screen scan rate, i.e., the number of frames per second, of the HD image is 30 Hz but a screen scan rate of the UHD image is 60 Hz. Accordingly, user may be feel more natural and dynamic.

The source video signal and the source audio signal may be combined as one signal and then be input to the stream providing device 1000 or may be input as different signals.

The stream providing device 1000 may obtain a source broadcast signal from a camera or a storage in which the source broadcast signal has been previously stored. Alternatively, the stream providing device 1000 may obtain a source video signal, the resolution of which has been converted from a converter (e.g., HD-UHD upconverter) which up-scales or down-scales a resolution.

The stream providing device 1000 may generate an ES by encoding the source broadcast signal, generate an output stream by adding various types of additional data to the elementary stream, multiplexing and synchronizing the elementary stream, and provide the output stream to the gateway 2000. The stream providing device 1000 will be described in more detail with reference to FIGS. 3 and 4 below.

Although not shown in FIG. 2, the transmission system 110 may include a plurality of stream providing devices 1000. In this case, the transmission system 110 may include a re-multiplexer. The re-multiplexer may multiplex output streams, which are received from the plurality of stream providing device 1000, into multiplexed output stream and provide the multiplexed output stream to the gateway 2000.

The gateway 2000 may convert the output stream received from the stream providing device 1000 into an output signal and provide the output signal to the transmitter 3000. In this case, the gateway 2000 may transmit the output signal to the transmitter 3000 via a microwave network or a wired IP network. In one embodiment, the output signal may consist of IP packets. Although not shown in FIG. 2, the transmission system 110 may include a signaling server, and the gateway 2000 may obtain signaling information from the signaling server and insert the signaling information into the output signal.

The transmitter 3000 may RF-convert and amplify the output signal received from the gateway 2000 and transmit the amplified RF signal via a channel assigned a certain band. In one embodiment, the transmitter 3000 may include an exciter, a high-power amplifier (HPA), a mask filter, and an antenna. The exciter may convert the output signal obtained from the gateway 2000 into an RF transmission signal. The HPA may amplify the power of the RF transmission signal. The mask filter may protect the RF transmission signal from adjacent band interference. The antenna may transmit the RF transmission signal to the receiving system 120.

In one embodiment, the decoding device of the receiving system 120 may decode the output stream from the stream providing device 1000 into a format that may be handled by an image output device.

Hereinafter, for convenience of explanation, components present between the stream providing device 1000 and the decoding device will not be described herein, and the exchange of broadcast signals between the transmission system 110 and the receiving system 120 will be described as transmitting an output stream from the stream providing device 1000 and receiving the output stream by the decoding device. However, the above description is merely provided for convenience of explanation, and it will be apparent that a plurality of devices may be located between the stream providing device 1000 and the decoding device and that the output stream is transmitted to the decoding device from stream providing device 1000 via the plurality of devices.

Figure 3:
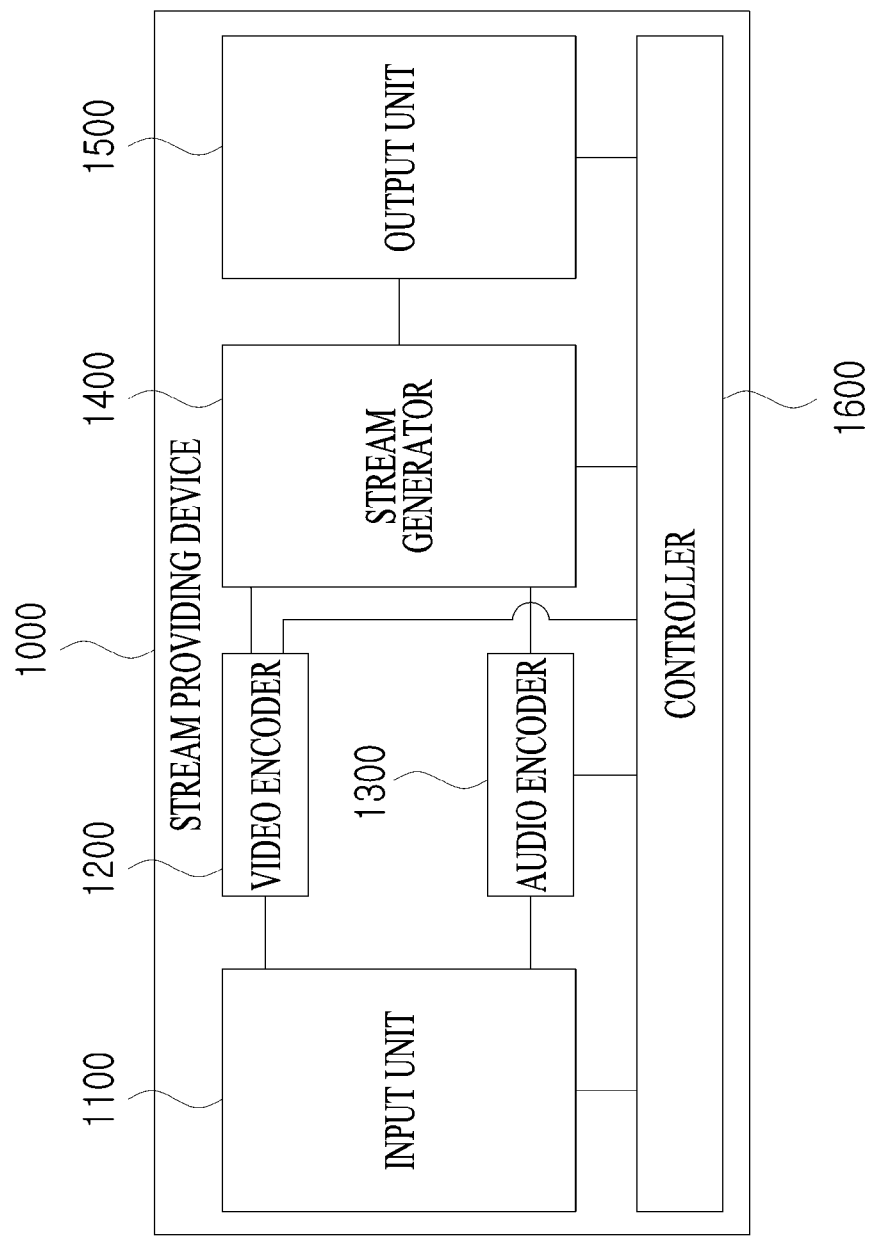
FIG. 3 is a block diagram of a stream provider according to an embodiment.

FIG. 3 is a block diagram of a stream provider according to an embodiment.

Referring to FIG. 3, a stream providing device 1000 may include an input unit 1100, a video encoder 1200, an audio encoder 1300, a stream generator 1400, an output unit 1500, and a controller 1600.

The input unit 1100 may obtain a source broadcast signal from the outside. As described above, a source video signal input to the input unit 1100 may be an SD, HD, FHD, QHD, or UHD broadcast signal. The source video signal and a source audio signal may be combined as one signal and then be input to the stream providing device 1000 or may be input as different signals.

In one embodiment, the input unit 1100 may be embodied in the form of a processor.

The video encoder 1200 may generate an effective bitstream by encoding the source video signal. In one embodiment, a bitstream output from the video encoder 1200 may be expressed in the form of an elementary stream (ES). In one embodiment, the elementary stream may consist of only one type of data, e.g., audio, video, or metadata, and a format thereof may vary according to a compression technique used to encode the source video signal.

In one embodiment, the video encoder 1200 may encode the source video signal according to a predetermined moving picture compression technique (codec). For example, the video encoder 1200 may encode the source video signal using various compression techniques, e.g., H.261, MPEG-1, H.262/MPEG-2, H.263/MPEG-3, MPEG-4, H.264/AVC, H.265/HEVC, etc. In addition, other moving picture compression techniques for encoding the source video signal are available, as well as the above-described moving picture compression techniques.

In one embodiment, the video encoder 1200 may perform encoding using an access unit (AU) as a base unit. Here, the access unit is a coded representation of a unit to be reproduced. In the case of video, the access unit may represent all pieces of coded data and stuffed portions of a picture.

However, embodiments are not limited thereto, and the video encoder 1200 may perform encoding using a plurality of access units as base units rather than one access unit.

In one embodiment, the video encoder 1200 may encode the source video signal based on an access unit and generate an elementary stream.

In one specific embodiment, when the video encoder 1200 encodes a source video signal according to the H.264/AVC or H.265/HEVC compression technique, the video encoder 1200 may generate network abstraction layer (NAL) units by encoding a picture obtained from the input unit 1100, and generate an elementary stream by combining the NAL units. Here, the term "NAL unit" is a syntax structure in which an encoded bitstream is written in a network-friendly format. Each picture may consist of one NAL unit or a plurality of NAL units.

In some embodiments, the video encoder 1200 may generate an elementary stream according to a certain bitrate. For example, when a bitrate is 10 Mbps, the video encoder 1200 may generate an elementary stream of $10 \times 10^6$ bits per second. In one embodiment, the controller 1600 may set a bitstream of the video encoder 1200. As one example, the controller 1600 may adjust the bitstream of the video encoder 1200 to prevent an overflow of a buffer of the decoding device when the number of bits of an output stream from the stream providing device 1000 is greater than a reference value (e.g., when bitstreams having the number of bits greater than the reference value are accumulated in the buffer of the decoding device). As another example, the controller 1600 may adjust the bitstream of the video encoder 1200 to prevent an underflow of the buffer of the decoding device when the number of bits of the output stream from the stream providing device 1000 is less than the reference value (e.g., when bitstreams having the number of bits less than the reference value are accumulated in the buffer of the decoding device).

As described above, the controller 1600 may adjust a bitrate in consideration of the size and degree of usage of the buffer of the decoding device. For the adjustment of the bitrate, the stream providing device 1000 may further include a virtual buffer corresponding to the buffer of the decoding device. The controller 1600 may determine whether an overflow or an underflow occurs in the buffer of the decoding device by referring to the virtual buffer.

The audio encoder 1300 may generate an effective bitstream by encoding a source audio signal. In one embodiment, similar to the video encoder 1200, a bitstream output from the audio encoder 1300 may be expressed in the form of an ES. In one embodiment, a format of the elementary stream may vary according to a compression technique used to perform encoding.

In one embodiment, the audio encoder 1300 may encode a source audio signal according to a predetermined audio compression technique (codec). For example, the audio encoder 1300 may encode the source audio signal according to compression techniques, such as Dolby AC-4, AC-3, Moving Picture Exports Group-H (MPEG-H) Advanced Audio Coding (AAC), Ogg Vorbis (OGG), MP3, Windows Media Audio (WMA), Adaptive Multi-Rate Wideband (AMR-WB), OPUS, Free Lossless Audio Codec (FLAC), etc. In addition, other audio compression techniques for encoding the source audio signal are available, as well as the above-described audio compression techniques.

In one embodiment, the audio encoder 1300 may perform encoding using an AU as a base unit. When the source broadcast signal is an audio signal, the access unit may represent all coded data of one audio frame. However, the embodiments are not limited thereto, and the audio encoder 1300 may perform encoding using a plurality of access units as base units rather than one access unit.

In some embodiments, the audio encoder 1300 may generate an elementary stream according to a certain bitrate. For example, when a bitrate is 128 kbps, the audio encoder 1300 may generate an elementary stream of $128 \times 10^3$ bits per second. Similar to the video encoder 1200, the controller 1600 may set a bitstream of the audio encoder 1300. The above description of the video encoder 1200 may also apply to the setting of the bitstream of the audio encoder 1300 and thus the setting of the bitstream of the audio encoder 1300 is not described in detail herein.

Although not shown in FIG. 3, the stream providing device 1000 may include a data encoder. The data encoder is configured to encode metadata. Here, the metadata may represent information needed for the decoding device to successfully reproduce video information and audio information. For example, the metadata may include information regarding time when an elementary stream is decoded and/or information regarding time when the elementary stream is reproduced.

The data encoder may generate the metadata in the form of an elementary stream. The metadata generated in the form of an elementary stream may be referred to as a meta-data elementary stream.

The stream generator 1400 may packetize an elementary stream (hereinafter referred to as a video elementary stream) generated by the video encoder 1200 and an elementary stream (hereinafter referred to as an audio elementary stream) generated by the audio encoder 1300 into output packets and generate an output stream by multiplexing the output packets. That is, the stream generator 1400 may combine the video elementary stream and the audio elementary stream into one stream. Here, the video elementary stream and the audio elementary stream combined into one stream may be video information and audio information of one program. Thus, the stream generator 1400 may multiplex the video elementary stream and the audio elementary stream to be synchronized with each other so as to prevent a mismatch between video and audio to be reproduced by the decoding device.

Alternatively, the stream generator 1400 may generate an output stream by packetizing and multiplexing the above-described meta-data elementary stream generated by the data encoder, the video elementary stream, and the audio elementary stream.

In one embodiment, the stream generator 1400 may generate an output stream by packetizing elementary streams in the form of a predetermined packet and combining generated packets according to a certain rule. An operation of the stream generator 1400 will be described in more detail with reference to FIGS. 5 to 11 below.

The output unit 1500 may output an output stream generated by the stream generator 1400 to the outside. In one embodiment, the output unit 1500 may output the output stream according to an asynchronous serial interface (ASI) method or an IP method. In addition, the output unit 1500 may output the output stream using various interfaces.

The controller 1600 may control overall operations of the stream providing device 1000. Thus, the controller 1600 may control the components 1100, 1200, 1300, 1400, and 1500 included in the stream providing device 1000. In particular, the controller 1600 may control operations of the stream providing device 1000 according to an operating system (OS) installed in the stream providing device 1000 and various programs.

Herein, the OS may monitor and surveil all operating states of the stream providing device 1000, manage resources, control various input/output devices (e.g., the user input unit 1100, the output unit 1500, etc.), manage scheduling and works of a central processing unit (e.g., the controller 150), and manage a storage device (e.g., a memory). That is, the OS may provide various functions for controlling the overall operations of the stream providing device 1000 and provide a basic platform to install and operate various applications in the stream providing device 1000.

The program may include program codes for executing specific functions of the stream providing device 1000.

The OS and the programs described above may be embodied in the form of software. The OS, which is in the form of software, and/or the applications may be stored in a memory device and provide desired functions to the stream providing device 1000 via the controller 1600 if necessary.

Figure 4:
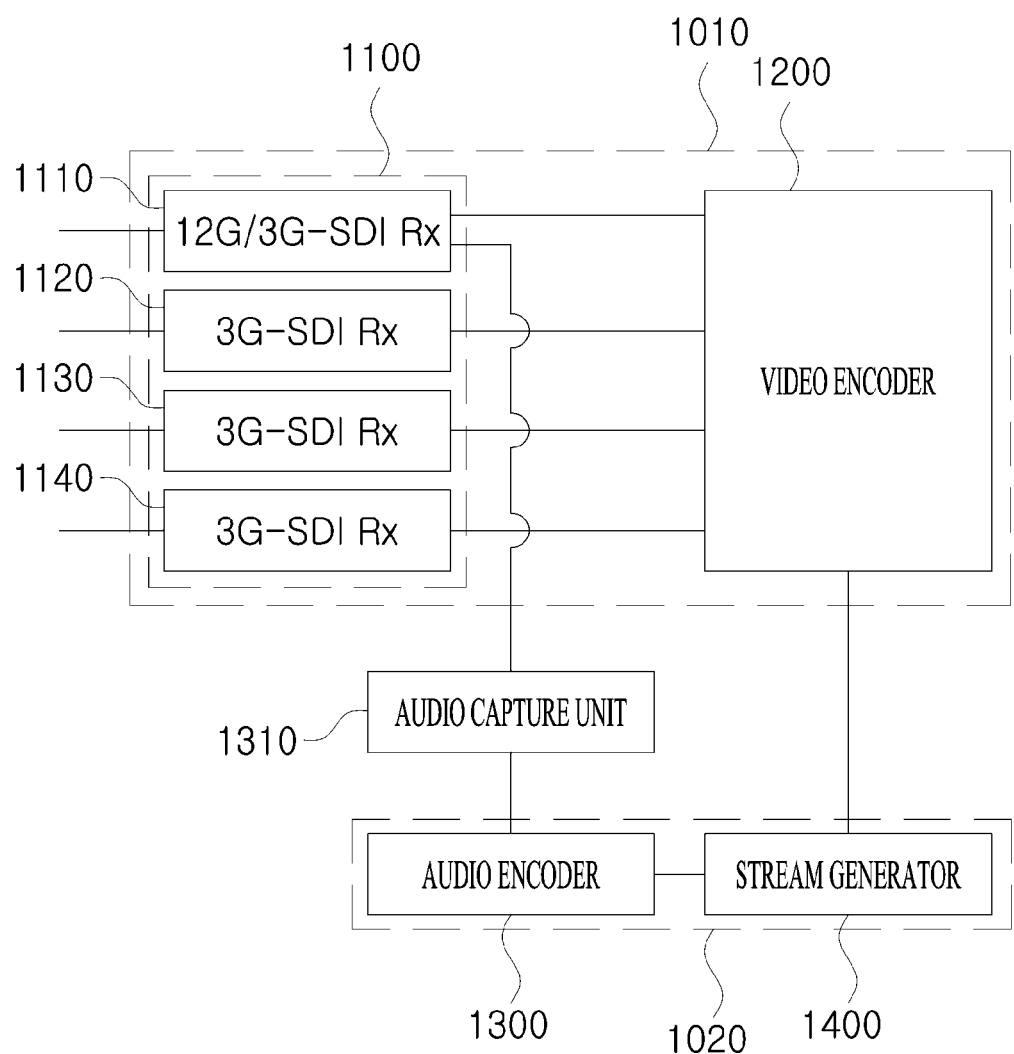
FIG. 4 is a block diagram of a stream providing device according to an embodiment.

FIG. 4 is a block diagram of a stream providing device according to another embodiment.

The stream provider of FIG. 4 is an embodiment of the stream providing device 1000 described above with reference to FIG. 3, which is divided by hardware.

Referring to FIG. 4, a stream providing device 1000 may include an input unit 1100, a video encoder 1200, an audio encoder 1300, and a stream generator 1400.

In one embodiment, the input unit 1100 and the video encoder 1200 may be configured as one System-on-Chip (SoC), and the audio encoder 1300 and the stream generator 1400 may be configured as one processor 1020. In one embodiment, the input unit 1100 and the video encoder 1200 may not be configured as one SoC and the audio encoder 1300 and the stream generator 1400 may not be configured as one processor 1020. The input unit 1100 may obtain source broadcast signals with various resolutions. For example, the input unit 1100 may include a 12G/3G-serial digital interface (SDI) receiver 1110 and 3G-SDI receivers 1120, 1130, and 1140. In this case, when a source broadcast signal is a UHD image, the input unit 1100 may obtain the source broadcast signal via the 12G SDI receiver 1110 or via the four 3G-SDI receivers 1110, 1120, 1130, and 1140.

The stream providing device 1000 may further include an audio capture unit 1310. In one embodiment, the audio capture unit 1310 may capture a source audio signal from the source broadcast signal obtained via the input unit 1100 and provide the source audio signal to the audio encoder 1300.

The video encoder 1200 may obtain a source video signal from the input unit 1100 and generate a video elementary stream with respect to the source video signal. The audio encoder 1300 may generate an audio elementary stream by encoding a source audio signal obtained from the audio capture unit 1310.

The stream generator 1400 may obtain the video elementary stream from the video encoder 1200, obtain the audio elementary stream from the audio encoder 1300, and generate an output stream by packetizing and multiplexing the obtained video elementary stream and audio elementary stream. For example, the stream generator 1400 may obtain the video elementary stream from the video encoder 1200 through PCI-express (PCIe).

The stream generator 1400 may provide the output stream to the output unit 1500, and the output unit 1500 may output the output stream to the outside.

Figure 5:
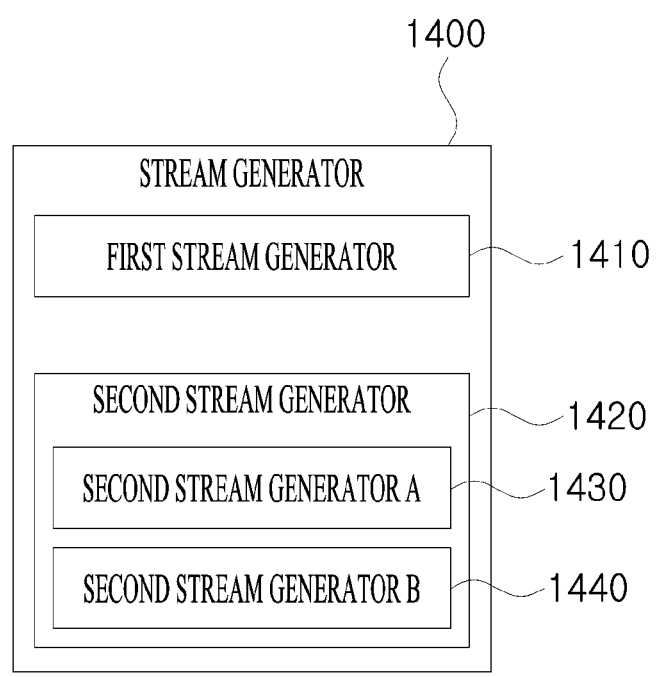
FIG. 5 is a block diagram of a stream generator according to an embodiment.

FIG. 5 is a block diagram of a stream generator according to an embodiment.

Referring to FIG. 5, the stream generator 1400 may include a first stream generator 1410 and a second stream generator 1420. The second stream generator 1420 may include a second stream generator a 1430 and a second stream generator b 1440. Although FIG. 5 illustrates that the stream generator 1400 includes the first stream generator 1410 and the second stream generator 1420, embodiments are not limited thereto, and the stream generator 1400 may include either the first stream generator 1410 or the second stream generator 1420. Furthermore, although FIG. 5 illustrates that the second stream generator 1420 includes the second stream generator a 1430 and the second stream generator b 1440, the embodiments are not limited thereto and the second stream generator 1420 may include only one of the second stream generator a 1430 and the second stream generator b 1440, or may include a plurality of second stream generator as 1430 and a plurality of second stream generator bs 1440.

The stream generator 1400 may generate output packets by packetizing elementary streams obtained from the video encoder 1200 and audio encoder 1300 and generate an output stream by multiplexing the generated output packets. In this case, the stream generator 1400 may generate different types of output streams according to a transport protocol.

In one embodiment, the first stream generator 1410 may generate a transport stream (TS) according to an MPEG-2 protocol. The second stream generator 1420 may generate an ATSC 3.0 transport stream (hereinafter referred to as an A3 stream) available in an ATSC 3.0 broadcasting system. In detail, the second stream generator a 1430 may generate a ROUTE stream consisting of ROUTE packets, and the second stream generator b 1430 may generate an MMTP stream consisting of MMTP packets. Hereinafter, for convenience of explanation, a ROUTE packet and an MMTP packet are referred to together as an A3 packet (which may be understood as an ATSC 3.0 exclusive packet), and a ROUTE stream and an MMTP stream are referred to together as an A3 stream. However, the above description is merely for convenience of explanation, and the ROUTE packet and the MMTP packet should be differentiated from each other, and the ROUTE stream and the MMTP stream should be differentiated from each other.

Figure 6:
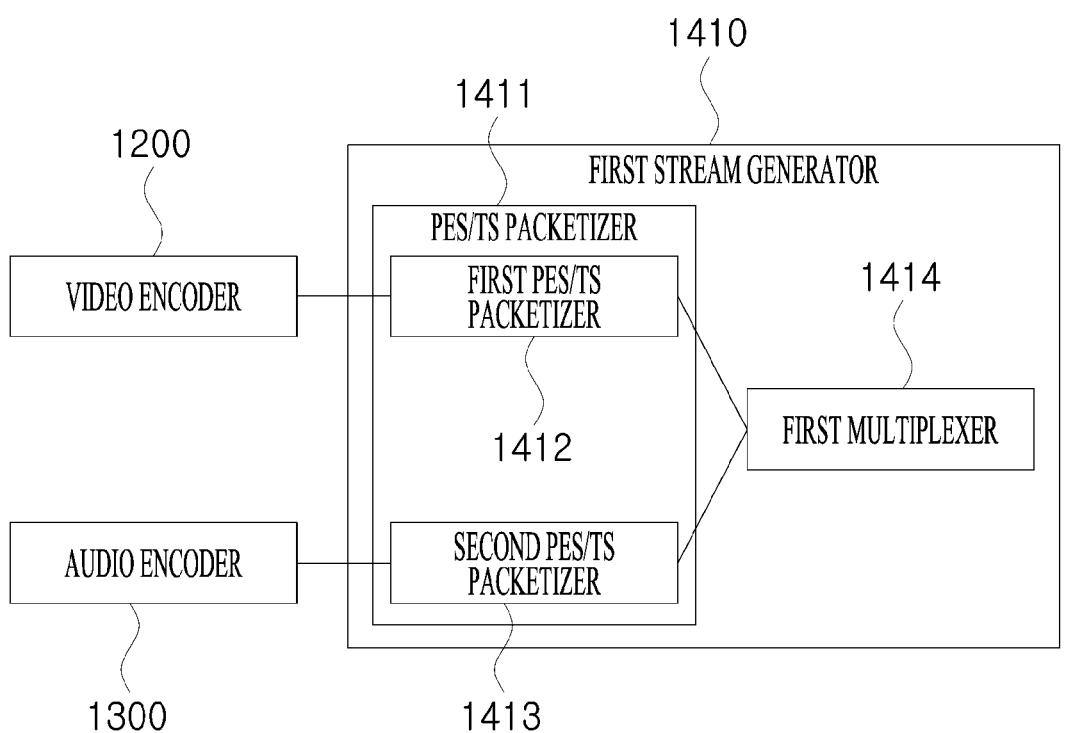
FIG. 6 is a block diagram of a first stream generator according to an embodiment.

FIG. 6 is a block diagram of a first stream generator according to an embodiment.

Referring to FIG. 6, the first stream generator 1410 may include a packetized elementary stream (PES)/TS packetizer 1411 and a first multiplexer 1414.

The PES/TS packetizer 1411 may packetize a video elementary stream obtained from the video encoder 1200 and an audio elementary stream obtained from the audio encoder 1300 into a PES packet, and packetize the PES packet into a TS packet. In the embodiment of FIG. 6, the above-described output packet may correspond to the TS packet.

The first multiplexer 1414 may generate an output stream by multiplexing TS packets generated by the PES/TS packetizer 1411. Hereinafter, the output stream may be referred to as a transport stream.

In detail, the PES/TS packetizer 1411 may include a first PES/TS packetizer 1412 and a second PES/TS packetizer 1413. However, embodiments are not limited thereto, and in one embodiment, the first PES/TS packetizer 1412 and the second PES/TS packetizer 1413 may not be differentiated from each other and may be configured as one PES/TS packetizer.

In one embodiment, the PES/TS packetizer 1411 may packetize an elementary stream into a PES packet. The PES packet may be referred to as a data structure to be used to transfer data of the elementary stream. In one embodiment, one access unit of the elementary stream may be included in one PES packet or a plurality of PES packets. For example, when one access unit is included in a plurality of PES packets, the plurality of PES packets may be referred to as a PES stream. In an alternative embodiment, a plurality of access units of the elementary stream may be included in one PES packet.

A PES packet may include a PES packet header and a payload. An elementary stream may be stored in the payload. The PES packet header may include identification information identifying the PES packet and information related to the elementary stream stored in the payload. For example, the PES packet header may include a decoding time stamp (DTS) and a presentation time stamp (PTS). The DTS may represent information regarding time when an access unit included in the payload of the PES packet is decoded by a decoding device. The PTS may represent information regarding time when the access unit included in the payload of the PES packet is reproduced by the decoding device. A length of the PES packet may be predetermined or may vary according to a length of the elementary stream.

In one embodiment, the PES/TS packetizer 1411 may packetize a generated PES packet into a TS packet. Here, the TS packet is a packet having a predetermined format for transmitting the elementary stream to a channel in which a transmission error occurs. The length of the TS packet may be fixed to 188 bytes. Thus, the PES packet may be included in one TS packet or dispersed in a plurality of TS packets. In one embodiment, at least a portion of one PES packet may be inserted into one TS packet, and a plurality of PES packets may not be inserted into one TS packet. Accordingly, one TS packet may include information regarding one access unit but may not include information regarding a plurality of access units.

The TS packet may include a TS packet header, a TS packet adaptation field, and a payload. In one embodiment, the TS packet header and the TS packet adaptation field may be referred to together as a TS packet header portion.

A PES packet may be stored in the payload, and the TS packet header may include information indicating the TS packet and information related to the PES packet stored in the payload. For example, the TS packet header may include identification information (packet ID (PID)) identifying the TS packet, sync information (sync byte) indicating the start of the TS packet, information indicating whether an error occurs in the TS packet (a transport error indicator), information indicating a portion of entire data corresponding to data included in the payload (payload unit start indicator), and information indicating priority of the TS packet (a transport priority indicator). The length of the TS packet header may be 4 bits.

The TS packet adaptation field may include additional information such as time information. For example, the TS packet adaptation field may include program clock reference (PCR) information indicating a time reference value to equalize time of the stream providing device 1000 and time of the decoding device.

The TS packet adaptation field need not be provided to all TS packets, and some TS packets may not include the TS packet adaptation field. Thus, the PCR information is not included in all the TS packets but may be included in some TS packets according to a certain cycle.

The sum of the length of the TS packet adaptation field and the length of the payload may be 184 bytes. That is, the TS packet may include the 4-byte TS packet header and one or both of the TS packet adaptation field and the payload, the total length of which is 184 bytes.

The payload may store the PES packet but the length of the PES packet stored in the payload may be shorter than that of the payload. In this case, since the length of the TS packet is fixed to 188 bytes, null data may be inserted into the remaining portion of the payload after the PES packet is stored in the payload. The inserting of the null data into the remaining portion of the payload may be referred to as stuffing.

Figure 7:
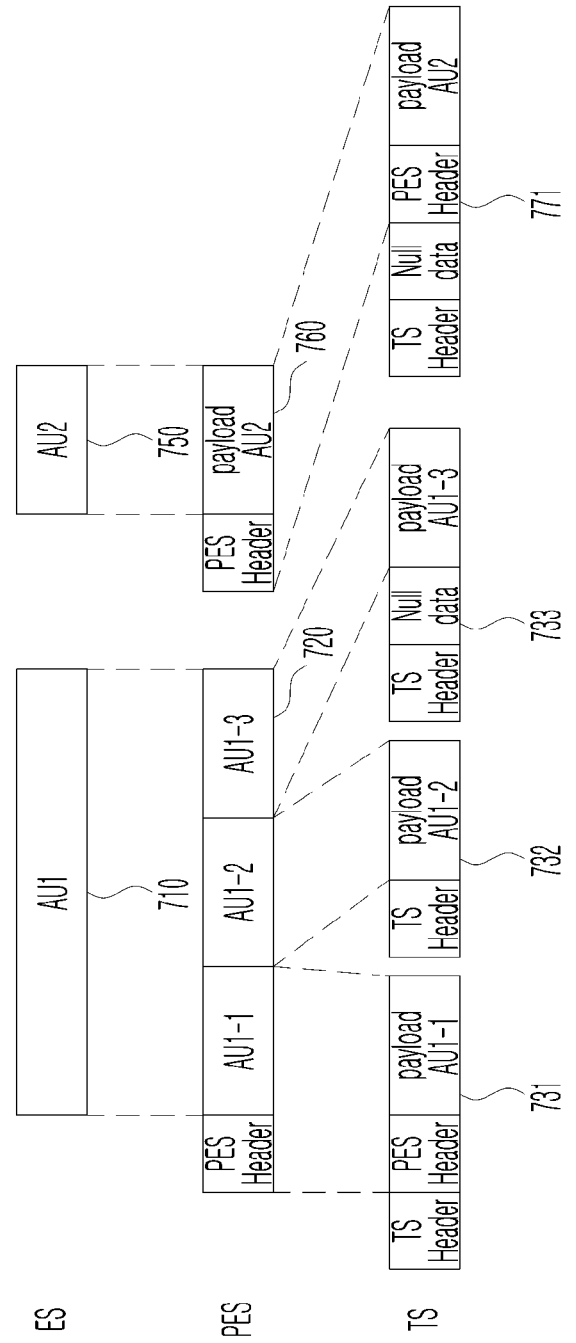
FIG. 7 is a diagram for describing a packetized elementary stream (PES) packet and a transport stream (TS) packet according to an embodiment.

In an embodiment of FIG. 7, a first elementary stream 710 may include a first access unit, and a second elementary stream 750 may include a second access unit. The PES/TS packetizer 1411 may generate a first PES packet 720 by packetizing the first elementary stream 710 and generate a second PES packet 760 by packetizing the second elementary stream 750. In this case, since the size of the first elementary stream 710 is greater than that of the second elementary stream 750, the length of the first PES packet 720 may be greater than that of the second PES packet 760. In the embodiment of FIG. 7, the first PES packet 720 may include a 6-byte PES packet header and a 522-byte payload and the second PES packet 760 may include a 6-byte PES packet header and a 156-byte payload.

The PES/TS packetizer 1411 may generate a first TS packet 731 to a third TS packet 733 by packetizing the first PES packet 720 and generate a fourth TS packet 771 by packetizing the second PES packet 760. At least one among the first TS packet 731 to the fourth TS packet 771 may include a TS packet adaptation field, but for convenience of explanation, the TS packet adaptation field is omitted in the embodiment of FIG. 7.

Since the first PES packet 720 includes data regarding the first access unit, the data regarding the first access unit is included in payloads of the first TS packet 731 to the third TS packet 733 and data regarding the second access unit may be included in a payload of the fourth TS packet 771. Since the length of a payload of the first PES packet 720 is 522 bytes, the sizes of the payloads of the first TS packet 731 and second TS packet 732 are 184 bytes, but the size of data regarding the first PES packet 720 stored in the payload of the third TS packet 733 may be 160 bytes. In this case, the other 24 bytes of the payload may be null data.

Since the size of the payload of the second PES packet 760 is 156 bytes, the size of data regarding the second PES packet 760 stored in the payload of the fourth TS packet 771 may be 150 bytes. In this case, the other 28 bytes of the payload may be null data.

In some embodiments, the first PES/TS packetizer 1412 may obtain a video elementary stream from the video encoder 1200, packetize the video elementary stream into a PES packet, and packetize the PES packet into a TS packet. Here, the TS packet of the video elementary stream may be referred to as a video TS packet.

The second PES/TS packetizer 1413 may obtain an audio elementary stream from the audio encoder 1300, packetize the audio elementary stream into a PES packet, and packetize the PES packet into a TS packet. Here, the TS packet of the audio elementary stream may be referred to as an audio TS packet.

Although not shown in FIG. 6, the PES/TS packetizer 1411 may include a third PES/TS packetizer. The third PES/TS packetizer may packetize the above-described meta-data elementary stream into a PES packet and packetize the PES packet into a TS packet. Here, the TS packet of the metadata elementary stream may be referred to as a meta-data TS packet.

The first multiplexer 1414 may generate an output stream by multiplexing TS packets generated by the first stream generator 1410. For example, the first multiplexer 1414 may generate an output stream by multiplexing a video TS packet from the first PES/TS packetizer 1412 and an audio TS packet from the second PES/TS packetizer 1413. Alternatively, the first multiplexer 1414 may generate an output stream by multiplexing a meta-data TS packet together with the video TS packet and the audio TS packet.

The first multiplexer 1414 may provide the generated output stream to the output unit 1500.

The first multiplexer 1414 may multiplex TS packets according to a certain bitrate. For example, when a bitrate is 11 Mbps, the first multiplexer 1414 may generate an output stream of $11 \times 10^6$ bits per second. In one embodiment, the controller 1600 may set an output stream of the first multiplexer 1414. For example, when the number of bits of the output stream from the stream providing device 1000 is greater or less than a predetermined level, the controller 1600 may adjust a bitrate of the first multiplexer 1414, i.e., a bitrate of the output stream, to prevent an overflow or underflow of the buffer of the decoding device. The controller 1600 may adjust the bitrate of the output stream using the virtual buffer described above with reference to FIG. 3.

Figure 8:
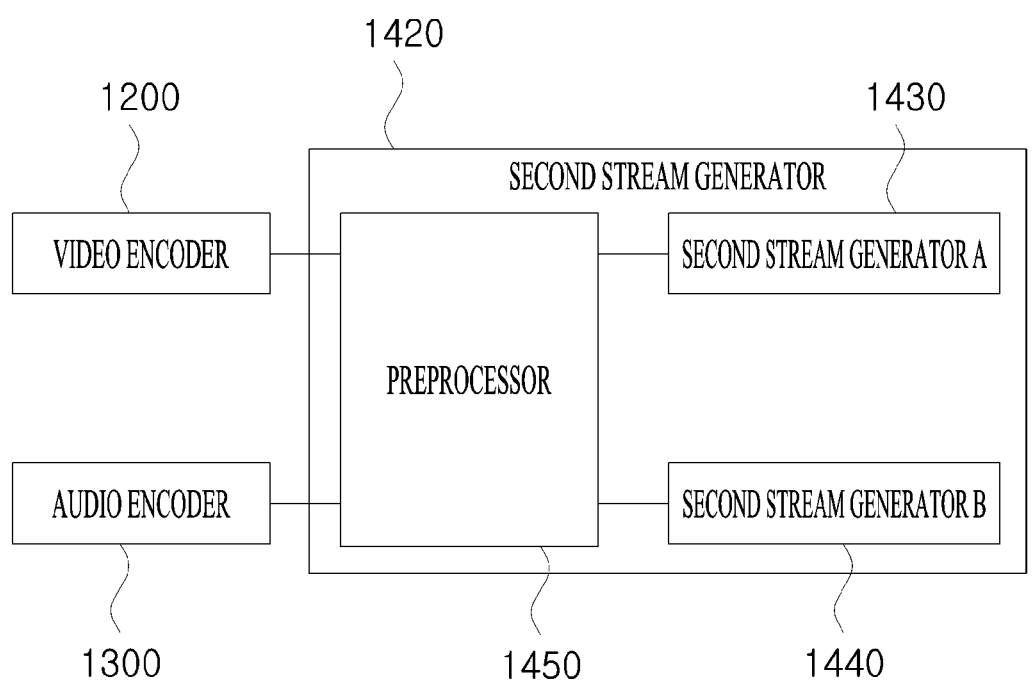
FIG. 8 is a block diagram of a second stream generator according to an embodiment.

FIG. 8 is a block diagram of a second stream generator according to an embodiment.

Referring to FIG. 8, the second stream generator 1420 may include a preprocessor 1450, a second stream generator a 1430, and a second stream generator b 1440.

The preprocessor 1450 may provide information needed for the second stream generator a 1430 and the second stream generator b 1440 to generate an output stream.

In detail, the ATSC 3.0 standard defines UDP/IP-based ROUTE and the MMTP as transport protocols for transmission of a broadcast service via a broadcast network and defines a Transmission Control Protocol (TCP)/IP-based HTTP protocol for transmission of a broadcast service via a communication network.

The stream providing device 1000 may provide an A3 stream to provide such an ATSC 3.0 broadcast service, and more specifically, the second stream generator a 1430 may provide a ROUTE stream and the second stream generator b 1440 may provide an MMTP stream.

The second stream generator a 1430 may generate the ROUTE stream using Dynamic Adaptive Streaming over HTTP (DASH) segment, and the second stream generator b 1440 may generate an MMTP stream using a media processing unit (MPU). As described above, the preprocessor 1450 may provide the DASH segment and/or the MPU so that the A3 stream may be smoothly generated by the second stream generator 1420.

In one embodiment, the DASH segment and the MPU may be generated based on an International Organization for Standardization (ISO)based media file format (ISOBMFF) (hereinafter referred to as an ISOBMFF file). Here, the ISOBMFF may be a format defining a data structure for time-based multimedia files such as video or audio. In one embodiment, the preprocessor 1450 may generate a metadata elementary stream in an ISOBMFF file from a video elementary stream from the video decoder 1200, an audio elementary stream from the audio decoder 1300, and/or metadata elementary stream from a metadata decoder. For example, an MP4 file may be generated, based on the ISOBMFF file.

In one embodiment, the ISOBMFF file may include a file type (ftyp) box, a movie (moov) box, a movie fragment (moof) box, and a media data (mdat) box. The file type (ftyp) box may include a file type, a file version, and compatibility information. The movie (moov) box may include metadata for describing media data. The media data (mdat) box may include actual media data (the video elementary stream and the audio elementary stream). The movie fragment (moof) box may include metadata regarding media data (mdat) information corresponding thereto. For example, the movie fragment (moof) box may include information (BaseMediaDecodeTime (BMDT)) regarding time when media data corresponding thereto is decoded. The movie fragment (moof) box may include a composition time offset (CTO) indicating information regarding a length of the media data corresponding thereto. Furthermore, the movie fragment (moof) box may include information regarding time when the media data corresponding thereto is reproduced.

In some embodiments, the preprocessor 1450 may generate the DASH segment to be provided to the second stream generator a 1430.

In one embodiment, the preprocessor 1450 may generate media segments, which include encoded media data regarding one or more access units, in the form of the DASH segment. In detail, in one embodiment, DASH segments may include an initialization segment and one or more media segments. The initialization segment may include the file type (ftyp) box and the movie (moov) box as information needed to reproduce media data included in the media segments.

The media segments may include the media data (mdat) box including the actual media data and include one or more whole self-contained movie fragment (moof) boxes related to the media data (mdat) box. The media segments may further include the segment type (styp) box.

In some embodiments, the preprocessor 1450 may generate an MPU to be provided to the second stream generator b 1440. Here, the MPU is a physical file subject to the ISOBMFF and may be independently reproduced. Accordingly, the MPU may include initialization information and metadata needed to perform decoding.

In one embodiment, the MPU may include the file type (ftyp) box, the mmpu box, the movie (moov) box, the media data (mdat) box, and the movie fragment (moof) box related to the media data (mdat) box according to the ISOBMFF.

The second stream generator a 1430 may generate a ROUTE packet from a DASH segment obtained from the preprocessor 1450 and generate a ROUTE stream on the basis of the ROUTE packet. The second stream generator b 1440 may generate an MMTP packet from an MPU obtained from the preprocessor 1450 and generate an MMTP stream on the basis of the MMTP packet.

Figure 9:
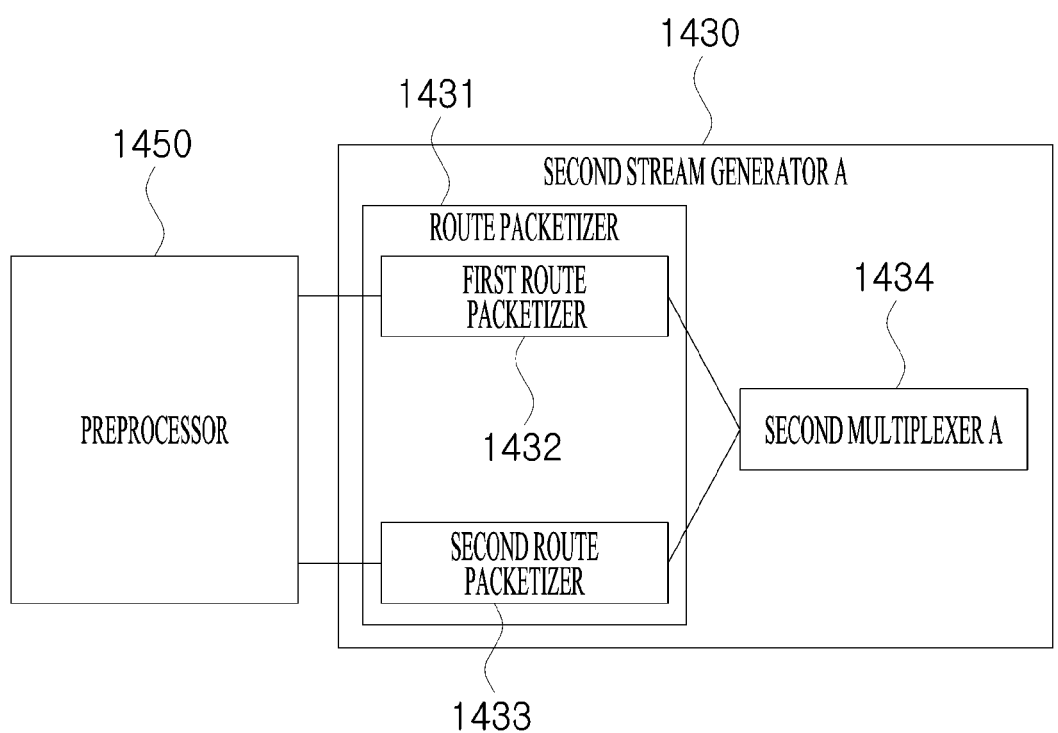
FIG. 9 is a block diagram of a second stream generator a according to an embodiment.

FIG. 9 is a block diagram of a second stream generator a according to an embodiment.

Referring to FIG. 9, the second stream generator a 1430 may include a ROUTE packetizer 1431 and a second multiplexer a 1434.

The ROUTE packetizer 1431 may packetize a video elementary stream-based DASH segment and an audio elementary stream-based DASH segment obtained from the preprocessor 1450 into a ROUTE packet.

The second multiplexer a 1434 may generate an output stream by multiplexing ROUTE packets generated by the ROUTE packetizer 1431. Here, the output packet may be understood as a ROUTE packet, and the output stream may be understood as a ROUTE stream.

In detail, the ROUTE packetizer 1431 may include a first ROUTE packetizer 1432 and a second ROUTE packetizer 1433. However, embodiments are not limited thereto. In one embodiment, the first ROUTE packetizer 1432 and the second ROUTE packetizer 1433 may be configured as one ROUTE packetizer without being divided.

In one embodiment, the ROUTE packet may be referred to as a layered coding transport (LCT) packet. The ROUTE packet may include a ROUTE packet header and a payload. The payload may store an elementary stream. The ROUTE packet header may include identification information identifying the ROUTE packet and information related to data included in the payload.

In one embodiment, the ROUTE packet header may include information regarding time when an access unit included in the payload is decoded by the decoding device and when the access unit included in the payload is reproduced by the decoding device.

In some cases, the payload may include information corresponding to the elementary stream and other information, or may include only the other information. For example, a payload of a first ROUTE packet may include data regarding a file type (ftyp) box and a movie (moov) box according to the ISOBMFF, a payload of a second ROUTE packet may include data regarding a movie fragment (moof) box and a media data (mdat) box, and a payload of a third ROUTE packet may include data regarding a media data (mdat) box. A length of a ROUTE packet may be predetermined or may be variable.

In some embodiments, the first ROUTE packetizer 1432 may obtain a DASH segment regarding a video elementary stream from the preprocessor 1450 and generate a ROUTE packet on the basis of the DASH segment.

The second ROUTE packetizer 1433 may obtain a DASH segment regarding an audio elementary stream from the preprocessor 1450 and generate a ROUTE packet on the basis of the DASH segment.

The second multiplexer a 1434 may generate an output stream by multiplexing ROUTE packets generated by the first ROUTE packetizer 1432 and second ROUTE packetizer 1443 and provide the generated output stream to the output unit 1500.

The second multiplexer a 1434 may multiplex ROUTE packets at a certain bitrate.

When the number of bits of an output stream from the stream providing device 1000 is greater or less than a predetermined level, the controller 1600 may adjust a bitrate of the second multiplexer a 1434, i.e., a bitrate of the output stream, to prevent an overflow or an underflow of the buffer of the decoding device.

Figure 10:
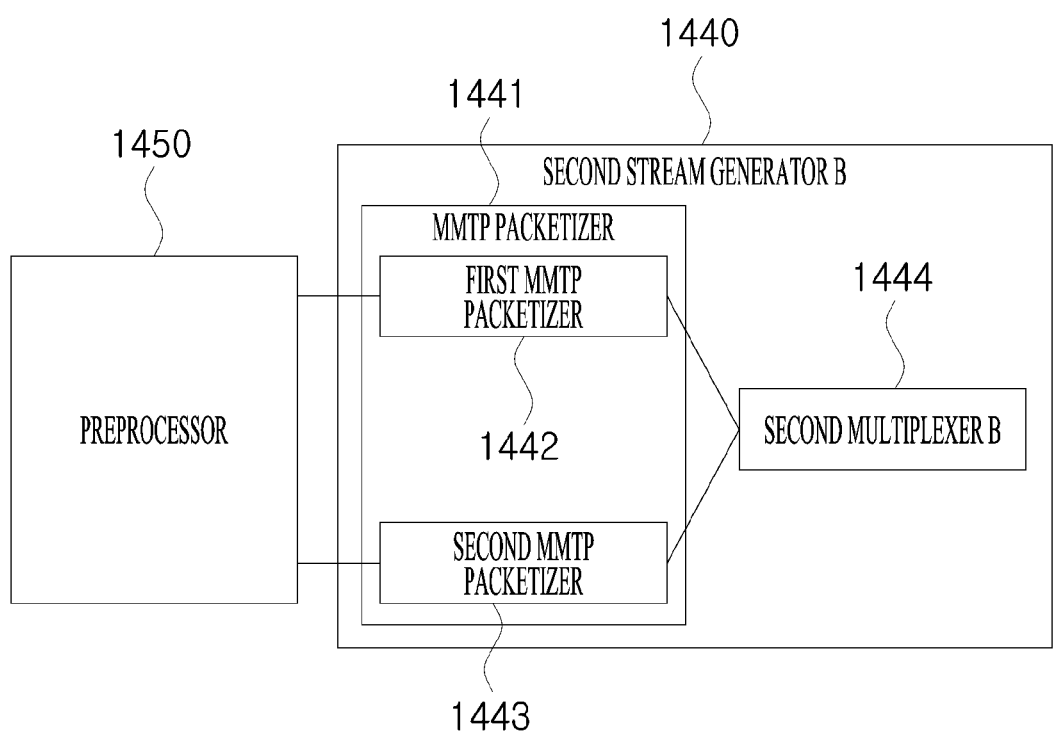
FIG. 10 is a block diagram of a second stream generator b according to an embodiment.

FIG. 10 is a block diagram of a second stream generator b according to an embodiment.

Referring to FIG. 10, the second stream generator b 1440 may include an MMTP packetizer 1441 and a second multiplexer b 1444.

The MMTP packetizer 1441 may packetize a video elementary stream-based MPU and an audio elementary stream-based MPU obtained from the preprocessor 1450 into an MMTP packet.

The second multiplexer b 1444 may generate an output stream by multiplexing MMTP packets generated by the MMTP packetizer 1441. Here, the output packet may be understood as an MMTP packet and an output stream may be understood as an MMTP stream.

In detail, the MMTP packetizer 1441 may include a first MMTP packetizer 1442 and a second MMTP packetizer 1443. However, embodiments are not limited thereto, and in one embodiment, the first MMTP packetizer 1442 and the second MMTP packetizer 1443 may be configured as one MMTP packetizer.

In one embodiment, an MMTP packet may include an MMTP packet header and a payload. The payload may store an elementary stream, and the MMTP packet header may include identification information identifying the MMTP packet and information related to data included in the payload.

For example, the MMTP packet header may include information regarding a packet sequence number for sequentially arranging access units, which are included in the payload, in the decoding device.

In some cases, the payload may include information corresponding to the elementary stream and other information, or may include only the other information. For example, a payload of a first MMTP packet may include data regarding a file type (ftyp) box and a movie (moov) box according to the ISOBMFF. A payload of a second MMTP packet may include data regarding a movie fragment (moof) box. A payload of a third MMTP packet may include a media data (mdat) box. A length of an MMTP packet may be predetermined or may be variable. For example, the length of the MMTP packet may be in a range of 20 bytes to 1500 bytes.

In some embodiments, the first MMTP packetizer 1442 may obtain an MPU regarding a video elementary stream from the preprocessor 1450 and generate an MMTP packet on the basis of the MPU.

The second MMTP packetizer 1443 may obtain an MPU regarding an audio elementary stream from the preprocessor 1450 and generate an MMTP packet on the basis of the MPU.

The second multiplexer b 1444 may generate an output stream by multiplexing MMTP packets generated by the first MMTP packetizer 1442 and second MMTP packetizer 1443 and provide the output stream to the output unit 1500.

The second multiplexer a 1434 may multiplex MMTP packets at a certain bitrate.

When the number of bits of an output stream from the stream providing device 1000 is greater or less than a predetermined level, the controller 1600 may adjust a bitrate of the second multiplexer b 1444, i.e., a bitrate of the output stream, to prevent an overflow or an underflow of the buffer of the decoding device.

Figure 11:
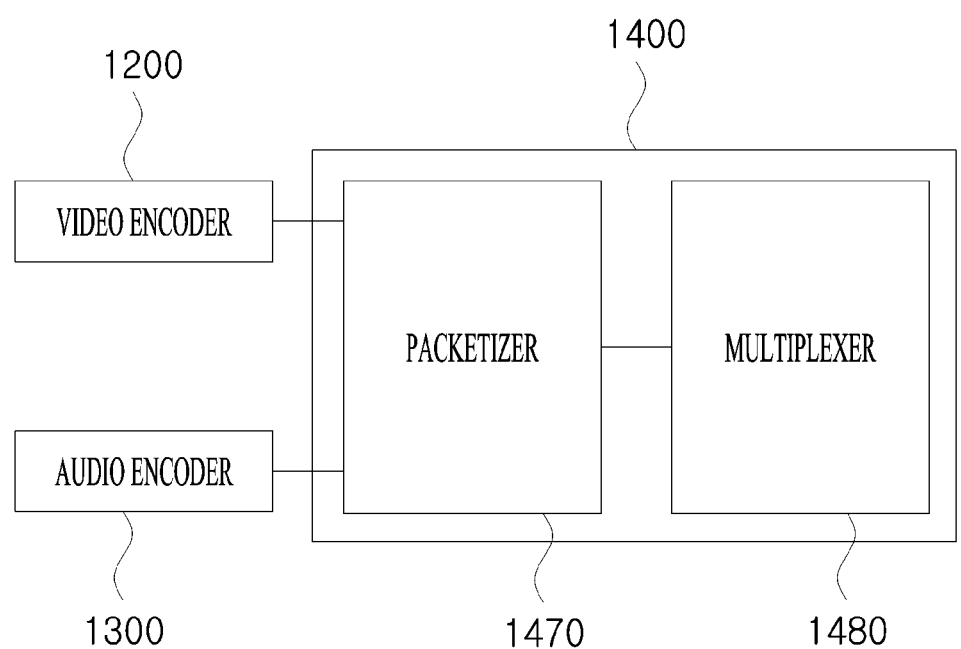
FIG. 11 is a block diagram of a stream generator according to another embodiment.

FIG. 11 is a block diagram of a stream generator according to another embodiment.

Referring to FIG. 11, a stream generator 1400 may include a packetizer 1470 and a multiplexer 1480. The packetizer 1470 is configured to packetize a video elementary stream obtained from the video encoder 1200 and an audio elementary stream obtained from the audio encoder 1300 into an output packet and may be embodied as at least one of the PES/TS packetizer 1411, the ROUTE packetizer 1431, and the MMTP packetizer 1441 described above with reference to FIGS. 6, 9, and 10. The multiplexer 1480 is configured to generate an output stream by multiplexing output packets generated by the packetizer 1470 and may be embodied as at least one of the first multiplexer 1414, the second multiplexer a 1434 and the second multiplexer b 1444 described above with reference to FIGS. 6, 9, and 10.

The packetizer 1470 may obtain a video elementary stream from the video encoder 1200 at an L bitrate and obtain an audio elementary stream from the audio encoder 1300 at an M bitrate. That is, the video encoder 1200 may encode a source video signal into a video elementary stream and provide the video elementary stream to the packetizer 1470 at the L bitrate (hereinafter referred to as a video ES bitrate). The audio encoder 1300 may encode a source audio signal into an audio elementary stream and provide the audio elementary stream to the packetizer 1470 at the M bitrate (hereinafter referred to as an audio ES bitrate).

The packetizer 1470 may generate a video output packet and an audio output packet packetizing the video elementary stream and the audio elementary stream and provide the video output packet and the audio output packet to the multiplexer 1480.

The multiplexer 1480 may receive the video output packet and the audio output packet from the packetizer 1470 and multiplex the video output packet and the audio output packet. In one embodiment, the video output packet and the audio output packet generated by the packetizer 1470 may be stored in an output packet buffer of the stream providing device 1000, and the multiplexer 1480 may read the video output packet and the audio output packet from the output packet buffer.

In some embodiments, the multiplexer 1480 may output an output stream at an N bitrate (hereinafter referred to as an output bitrate). In one embodiment, the output bitrate may be greater than or equal to the sum of the video ES bitrate and the audio ES bitrate so that the stream generator 1400 may stably output the video elementary stream input at the video ES bitrate and the audio elementary stream input at the audio ES bitrate. When the output bitrate is less than the sum of the video ES bitrate and the audio ES bitrate, the multiplexer 1480 cannot simultaneously output elementary streams, which are received from the video encoder 1200 and the audio encoder 1300 within a certain time period, in the form of an output stream. That is, the output of the output stream from the multiplexer 1480 may be delayed and thus decoding of the elementary streams by the decoding device may be delayed. Accordingly, the output bitrate of the multiplexer 1480 may be greater than or equal to the sum of the video ES bitrate and the audio ES bitrate.

In this case, since the output bitrate is greater than or equal to the sum of the video ES bitrate and the audio ES bitrate (hereinafter referred to as an ES bitrate), null packets corresponding to the difference between the output bitrate and the ES bitrate may be included in the output stream. For example, when the output bitrate is 11 Mbps and the ES bitrate is 10.1 Mbps, the number of bits of the output stream may be $11 \times 10^6$ per second, and $10.1 \times 10^6$ output packets and $0.9 \times 10^6$ null packets may be included in the output stream.

Figure 12:
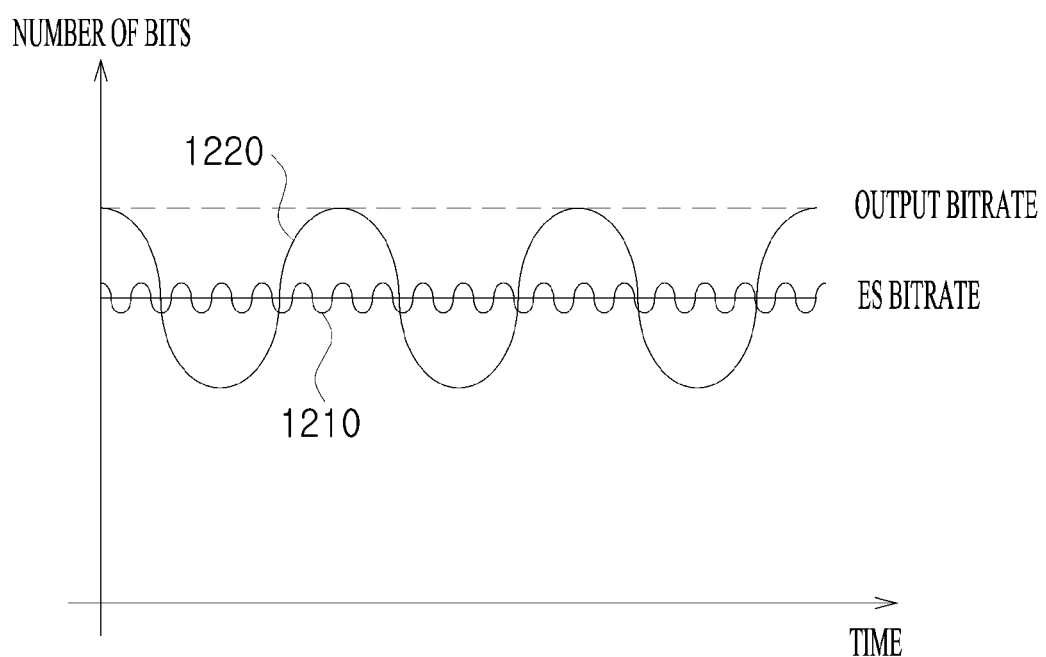
FIG. 12 is a diagram for describing the number of bits of an output packet included in an output stream.

However, in some cases, null packets may be concentrated in an output stream. FIG. 12 illustrates the number of bits of an output packet. In a graph in FIG. 12, an X-axis represents time and a Y-axis represents the number of bits. An output stream may be output at an output bitrate. However, in the case of an output packet, the difference between a maximum number of bits and a minimum number of bits of an output packet may be equal to or less than a predetermined threshold value as indicated by a line 1210 or may be greater than the predetermined threshold value as indicated by a line 1220 according to how multiplexing is performed by the multiplexer 1480. That is, referring to FIG. 12, the line 1210 illustrates a case in which null packets are dispersed in the output stream and thus the difference between the maximum number of bits and the minimum number of bits of the output packet may be equal to or less than the predetermined threshold value, whereas the line 1220 illustrates a case in which null packets are concentrated in a region of the output stream and thus the difference between the maximum number of bits and the minimum number of bits of the output packet may be greater than the predetermined threshold value.

However, in some cases, when the difference between the maximum number of bits and the minimum number of bits of the output packet is greater than the predetermined threshold value, switching (switchover) may occur in the transmission system 110. In detail, although FIG. 2 illustrates that one stream providing device 1000 is included in the transmission system 110, two or more stream providing devices 1000 may be included in the transmission system 110. In this case, a stream providing device among a plurality of stream providing devices may provide an output stream to the gateway 2000 and the remaining stream providing device may be provided as a spare device in preparation for a case in which an error occurs in the main stream providing device. In this case, when null packets, the number of which is greater than or equal to the predetermined threshold value are included in the output stream output from the main stream providing device, the transmission system 110 may determine that an error occurs in the main stream providing device. In this case, although no error occurs in the main stream providing device, the transmission system 110 may determine that an error occurs in the main stream providing device and switch the remaining stream providing device to the main stream providing device. To prevent such an unnecessary switching between stream providing devices, the stream providing device 1000 may provide an output stream in which null packets are not concentrated but are dispersed.

Figure 13:
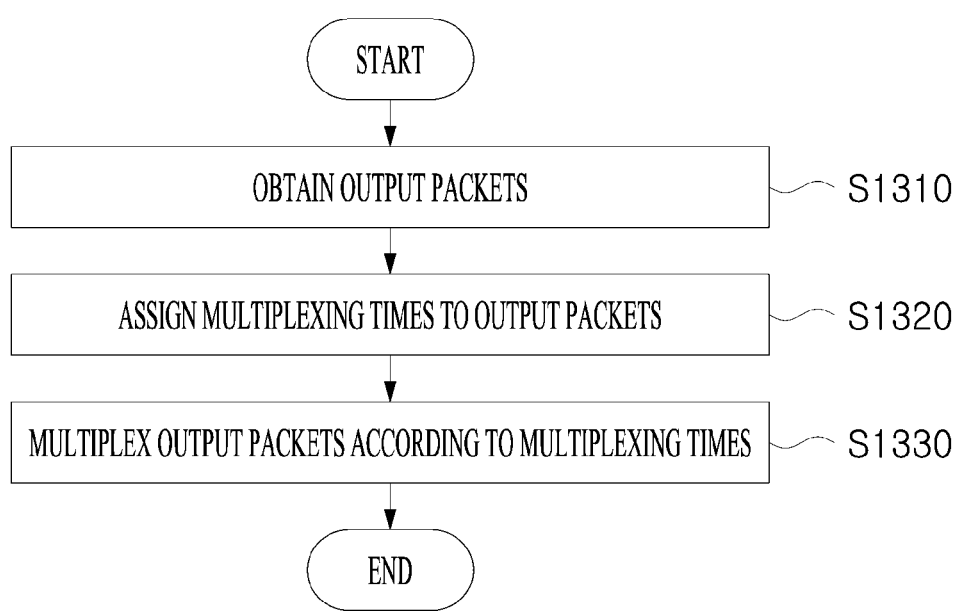
FIG. 13 is a flowchart of a method of multiplexing output packets according to an embodiment.

FIG. 13 is a flowchart of a method of multiplexing output packets according to an embodiment.

Referring to FIG. 13, the stream generator 1400 may obtain output packets (operation S1310). For example, the packetizer 1470 may receive a video elementary stream from the video decoder 1200 and generate a video output packet by packetizing the video elementary stream. Furthermore, the packetizer 1470 may receive an audio elementary stream from the audio decoder 1300 and generate an audio output packet by packetizing the audio elementary stream. Here, the video output packet and the audio output packet may be TS packets generated by the first stream generator 1410 or A3 packets generated by the second stream generator 1420.

In some embodiments, the stream generator 1400 may assign multiplexing time to the output packets (operation S1320). Here, the multiplexing time may be understood as time information assigned to multiplex the output packets in the stream generator 1400. A multiplexing time may be set for each of the output packets. For example, when the packetizer 1470 obtains video output packets, the stream generator 1400 may assign different multiplexing time to the video output packets.

The multiplexing time assigned to the output packets may be in various data forms. For example, the multiplexing time may be set in the forms of numbers, on the basis of a clock signal of the stream providing device 1000, on the basis of relative time information used in the stream providing device 1000 and an encoding device, or on the basis of absolute time information. In addition, the multiplexing time may be set in other various data forms identifying the output packets.

The stream generator 1400 sets multiplexing time according to various criteria, e.g., times when or an order in which output packets are generated by the packetizer 1470, times when or an order in which the output packets are read by the multiplexer 1480, the sizes of the output packets, the sizes of access units included in the output packets, the type of the access units included in the output packets, the size of the buffer of the decoding device, etc. Alternatively, the stream generator 1400 may set multiplexing time for the output packets on the basis of various criteria identifying the output packets.

For example, the stream generator 1400 may set multiplexing time for the output packets on the basis of the times when or the order in which the output packets are read by the multiplexer 1480. When the packetizer 1470 does not consider times when elementary streams are packetized into output packets, the stream generator 1400 may set multiplexing time for the output packets based on times when or an order in which the elementary streams are obtained by the packetizer 1470. The setting of the multiplexing time will be described in more detail with reference to FIGS. 21 and 22 below.

In some embodiments, the stream generator 1400 may insert a multiplexing time into an output packet. In this case, the stream generator 1400 may add an additional field to the output packet and insert the multiplexing time into an additional header.

Figure 14:
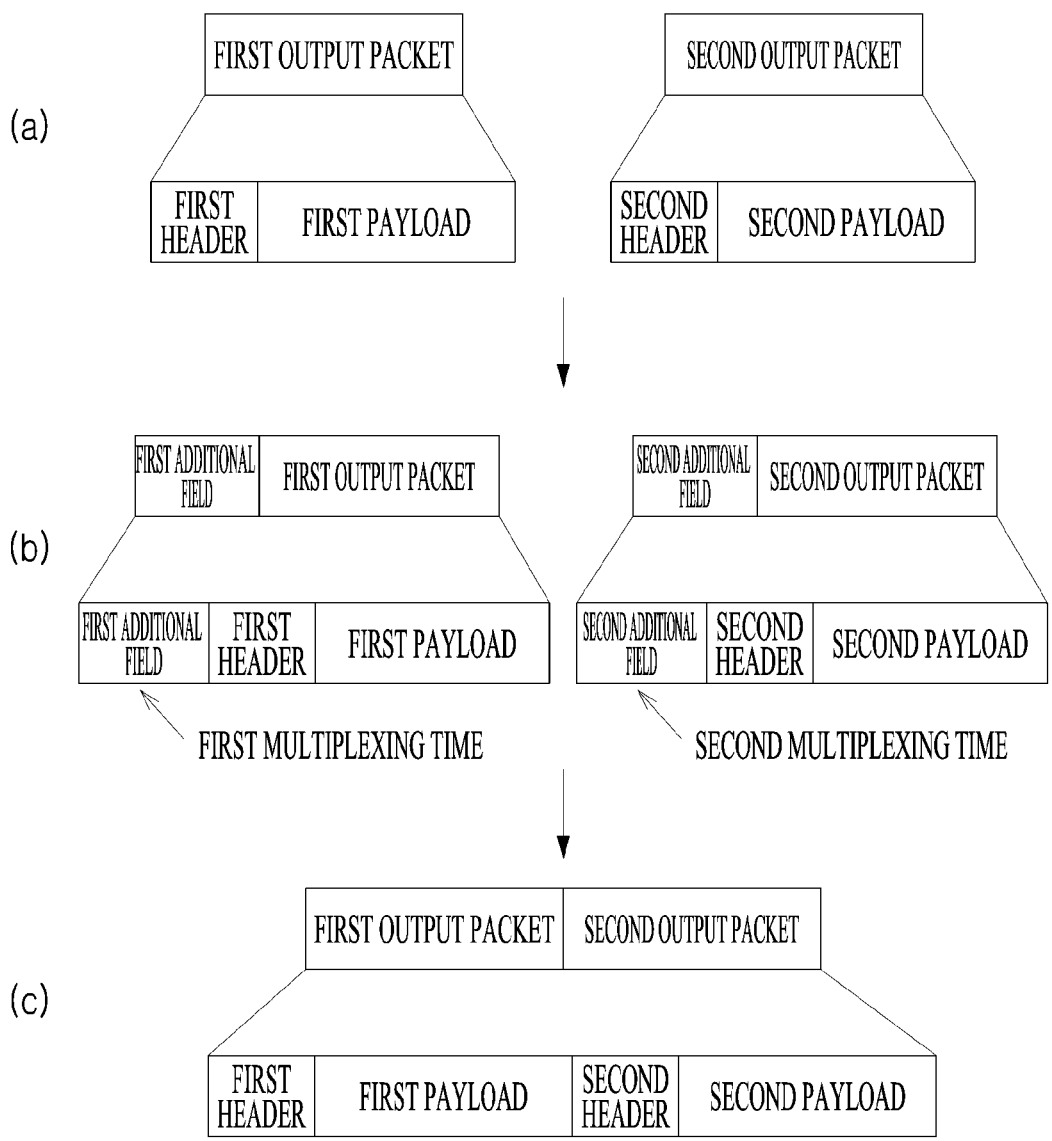
FIG. 14 is a diagram for describing insertion of multiplexing time according to an embodiment.

FIG. 14 is a diagram for describing adding multiplexing time according to an embodiment. FIG. 14(a) illustrates an output packet #1 and an output packet #2. Each of the output packet #1 and the output packet #2 may include a header and a payload.

FIG. 14(b) illustrates that an additional field is added to each of the output packet #1 and the output packet #2. In FIG. 14 (b), in order to insert a multiplexing time to each of the output packets, the stream generator 1400 may add an additional field to each of the output packet #1 and the output packet #2 and insert the multiplexing time into the additional field. In one embodiment, the additional field may be added in the form of an additional header to a front end of each of the output packets. However, embodiments are not limited thereto, and the additional field may be inserted into a rear end or a middle portion of each of the output packets. The additional field may consist of a plurality of fields, and information other than the multiplexing time may be inserted into the additional field. The additional field may have a fixed size, and may be, for example, 20 bytes long. In one embodiment, the size of the additional field may be variable. For example, the size of the additional field may be set differently according to the type of an output packet.

In some embodiments, the stream generator 1400 may multiplex the output packets according to the multiplexing time (operation S1330). In detail, the stream generator 1400 may multiplex the output packet by comparing a multiplexing reference time with the multiplexing time of the output packets. Here, the multiplexing reference time may be understood as a reference time for the stream generator 1400 to insert the output packets into an output stream. In one embodiment, the stream generator 1400 may set the multiplexing reference time, based on an output bitrate and in consideration of the type of the output packets. For example, the stream generator 1400 may set the multiplexing reference time using Equation 1 below.

$$t_{mux\_ref}=1/OP_{tot\_num}=OP_{size}/OS_{bitrate},\quad\text{[Equation 1]}$$

wherein $t_{mux\_ref}$ denotes a multiplexing reference time, $OP_{tot\_num}$ denotes the number of packets inserted into an output stream per second, $OP_{size}$ denotes the size of an output packet, and $OS_{bitrate}$ denotes a bitrate of an output stream.

For example, when the output bitrate of the output stream is 11 Mbps and the size of the output packet is 188 bytes, the multiplexing reference time may be 137 μsec. That is, an output packet may be inserted into an output stream at time intervals of 137 μsec.

In one embodiment, the stream generator 1400 may generate an output stream by comparing the multiplexing reference time with the multiplexing time of each of the output packets. For example, when the multiplexing time of the output packet #1 is equal to or less than a first reference time, the stream generator 1400 may include the output packet #1 into a location on the output stream corresponding to the first reference time. When the multiplexing time of the output packet #2 is greater than the first reference time and is equal to or less than a second reference time, the stream generator 1400 may include the output packet #2 into a location on the output stream corresponding to the second reference time. When the multiplexing time of an output packet #3 is greater than the second reference time and a third reference time and is equal to or less than a fourth reference time, the stream generator 1400 may insert a null packet into a location on the output stream corresponding to the third reference time and include the output packet #3 into a location on the output stream corresponding to the fourth reference time.

Figure 15:
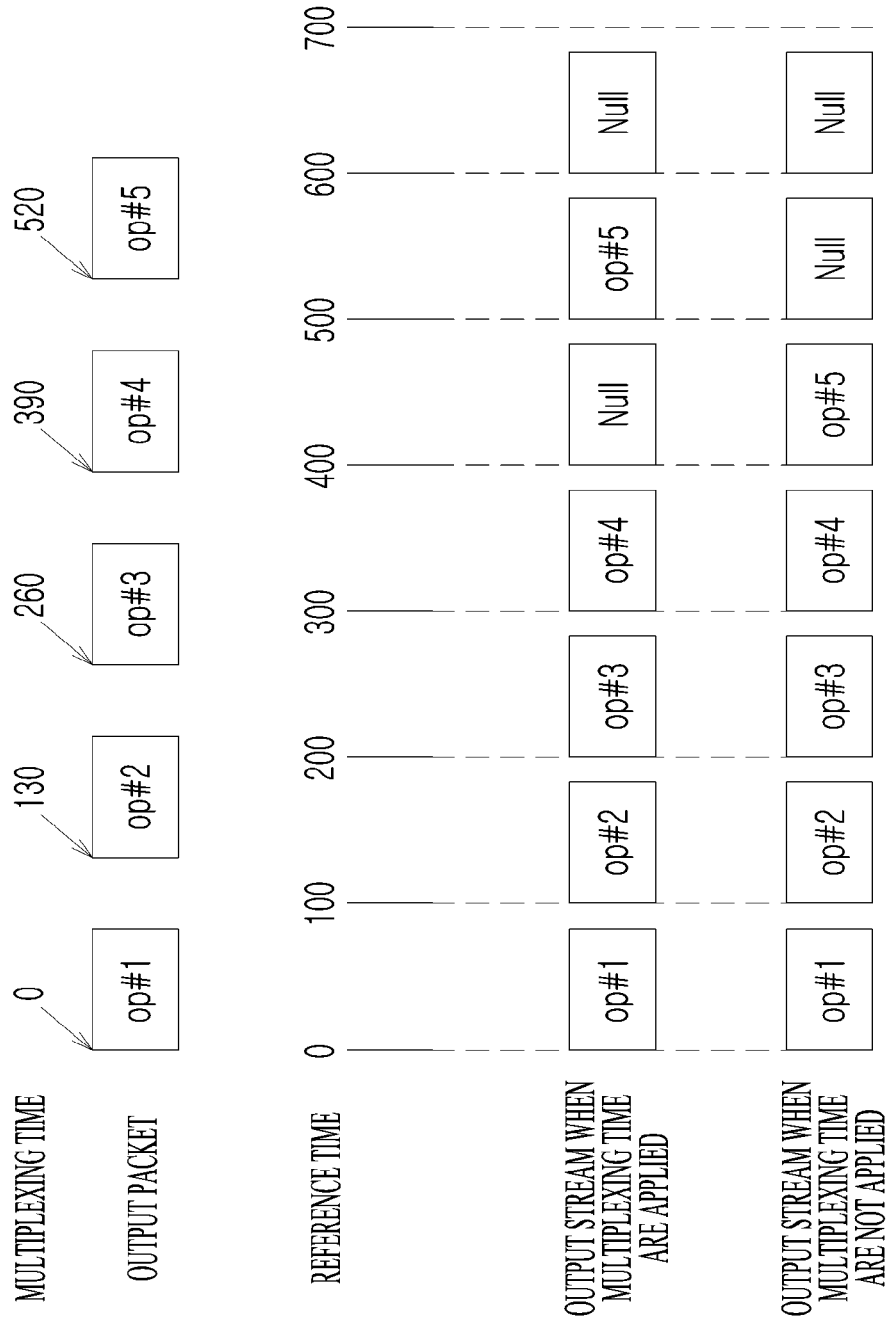
FIG. 15 is a diagram for describing multiplexing according to an embodiment.

As a concrete example, FIG. 15 is a diagram for describing multiplexing according to an embodiment.

In the embodiment of FIG. 15, the stream generator 1400 may obtain five output packets at an ES bitrate for a certain time. The stream generator 1400 may set multiplexing time for five output packets in units of 130.

In the embodiment of FIG. 15, the stream generator 1400 may set multiplexing reference time in units of 100.

In one embodiment, when the five output packets are multiplexed without assigning multiplexing time thereto, the five output packets may be consecutively inserted into an output stream. Thus, in the output stream, null packets may be consecutively located after the five output packets.

Alternatively, the stream generator 1400 may multiplex the five output packets in consideration of multiplexing time thereof In this case, since a multiplexing time for an output packet #4 is set to 390 and a multiplexing time for an output packet #5 is set to 520, an output packet assigned a multiplexing time may not be present between a reference time 400 and a reference time 500. Thus, the stream generator 1400 may insert a null packet into a location on the output stream corresponding to the reference time 400, and insert the output packet #5 into a location on the output stream corresponding to reference time 500. Accordingly, in the output stream, a null packet may be present between the output packet #4 and the output packet #5 and thus null packets may be dispersed in the output stream. As described above, since the null packets are dispersed in the output stream, switching from a main stream providing device to a spare stream providing device may be prevented from occurring without causing any errors to occur.

Figure 16:
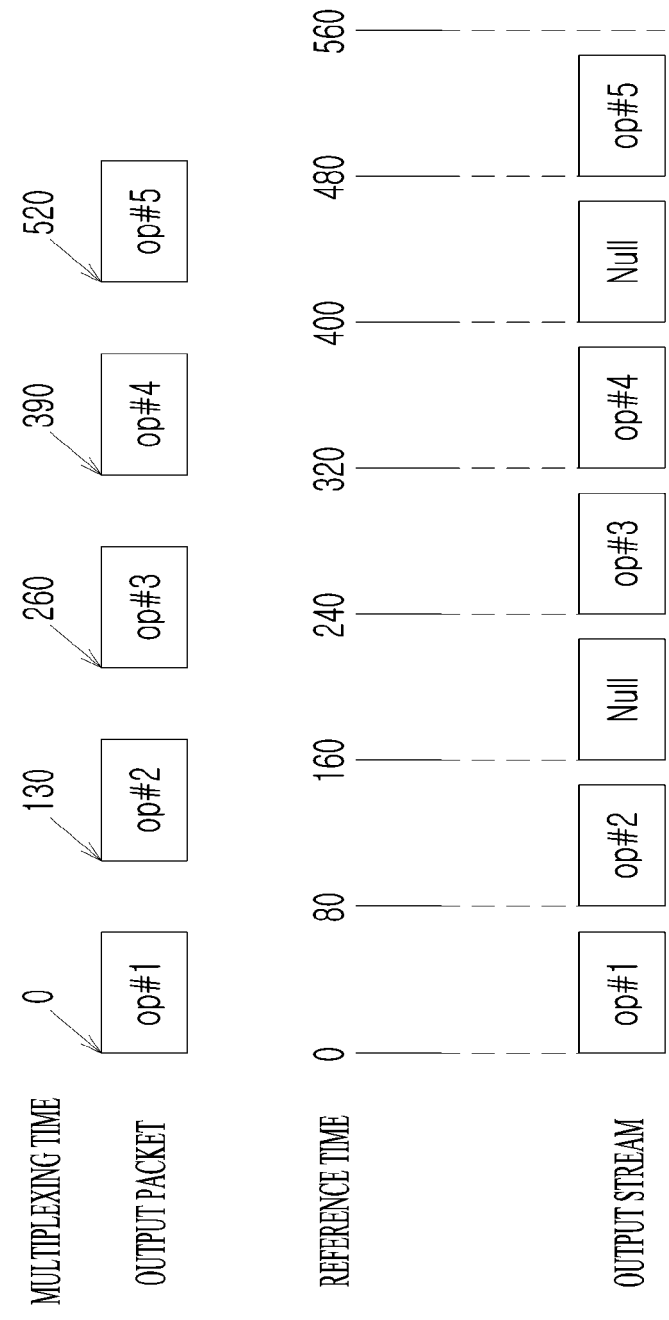
FIG. 16 is a diagram for describing multiplexing according to another embodiment.

In some embodiments, the stream generator 1400 may insert output packets and null packets at different locations on an output stream according to a reference time. As a specific embodiment, FIG. 16 is a diagram for describing multiplexing according to another embodiment. Similar to the embodiment of FIG. 15, in the embodiment of FIG. 16, the stream generator 1400 may obtain five output packets at an ES bitrate for a certain time. The stream generator 1400 may set multiplexing time for five output packets in units of 130. However, unlike in the embodiment of FIG. 15, in the embodiment of FIG. 16, the stream generator 1400 may set reference time in units of 80. In this case, since a multiplexing time of an output packet #2 is set to 130 and a multiplexing time of an output packet #3 is set to 260, an output packet assigned a multiplexing time may not be present between a reference time 160 and a reference time 240. Thus, the stream generator 1400 may insert a null packet into a location on an output stream corresponding to the reference time 160 and insert the output packet #3 into a location on the output stream corresponding to the reference time 240. That is, a null packet may be inserted between the output packet #4 and the output packet #5 in the embodiment of FIG. 15, whereas a null packet may be inserted between the output packet #2 and the output packet #3 in the embodiment of FIG. 16. Accordingly, sequencing (or ordering) of output packets and null packets in an output stream may vary according to a reference time.

In some embodiments, when output packets are multiplexed, the stream generator 1400 may remove additional fields added to the output packets and then multiplex the output packets. In detail, referring to FIG. 14(*c*), when an output packet #1 and an output packet #2 are multiplexed into an output stream, additional fields added to the output packets may be removed from the output stream. That is, the stream generator 1400 may obtain information regarding multiplexing time for the output packets from the additional fields and multiplex the output packets using the multiplexing time. In this case, in order to multiplex the output packets, the stream generator 1400 may remove the additional fields added to the output packets and multiplex the output packets from which the additional fields are removed using the multiplexing time.

Figure 17:
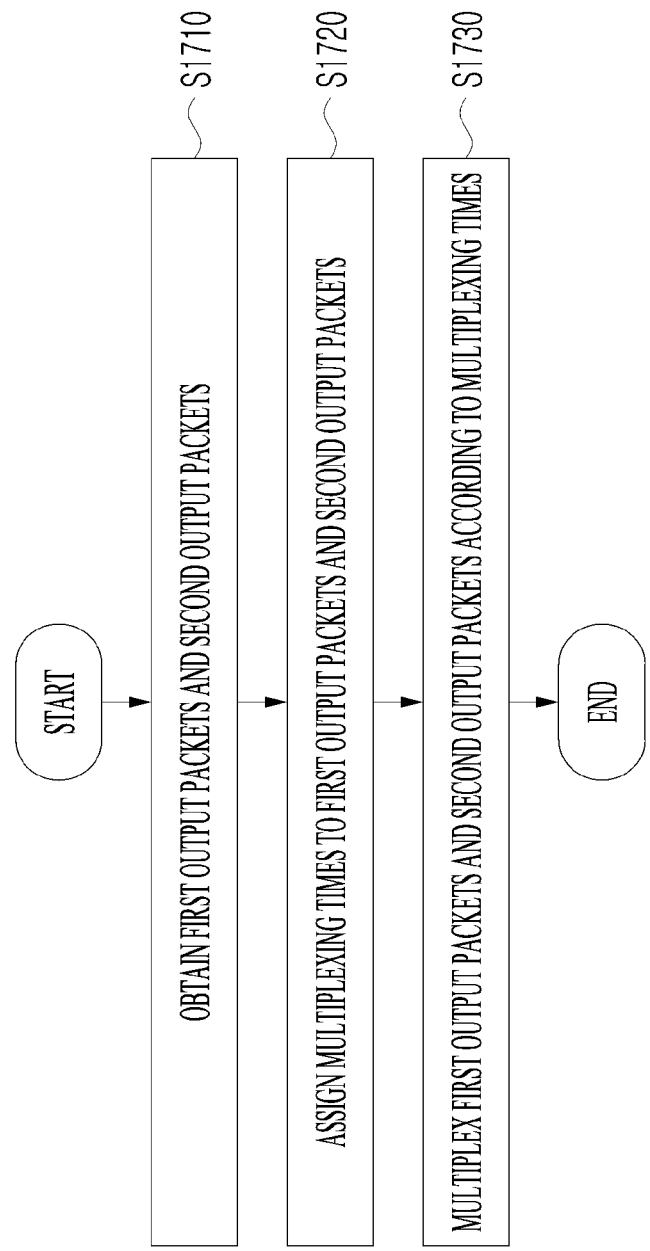
FIG. 17 is a flowchart of a method of multiplexing a plurality of output packets according to an embodiment.

FIG. 17 is a flowchart of a method of multiplexing a plurality of output packets according to an embodiment.

Referring to FIG. 17, the stream generator 1400 may obtain first output packets and second output packets (operation S1710). For example, the packetizer 1470 may obtain a video elementary stream from the video decoder 1200 and generate video output packets by packetizing the video elementary stream. In this case, the video output packets may be referred to as the first output packets. Furthermore, the packetizer 1470 may obtain an audio elementary stream from the audio decoder 1300 and generate audio output packets by packetizing the audio elementary stream. In this case, the audio output packets may be referred to as second output packets. The first output packets and the second output packets may be TS packets generated by the first stream generator 1410 or A3 packets generated by the second stream generator 1420.

In some embodiments, the stream generator 1400 may assign multiplexing time to the first output packets and the second output packets (operation S1720). In one embodiment, times when or an order in which the first output packets and the second output packets are generated, and times when or an order in which the first output packets and the second output packets are read by the multiplexer 1480 may be different. Thus, the stream generator 1400 may set multiplexing time for the first output packets and the second output packets according to different criteria.

The above description of operation S1320 of FIG. 13 may directly apply to operation S1720 and thus operation S1720 will not be described in detail here.

In some embodiments, the stream generator 1400 may multiplex the first output packets and the second output packets according to the multiplexing time (operation S1730).

Figure 18:
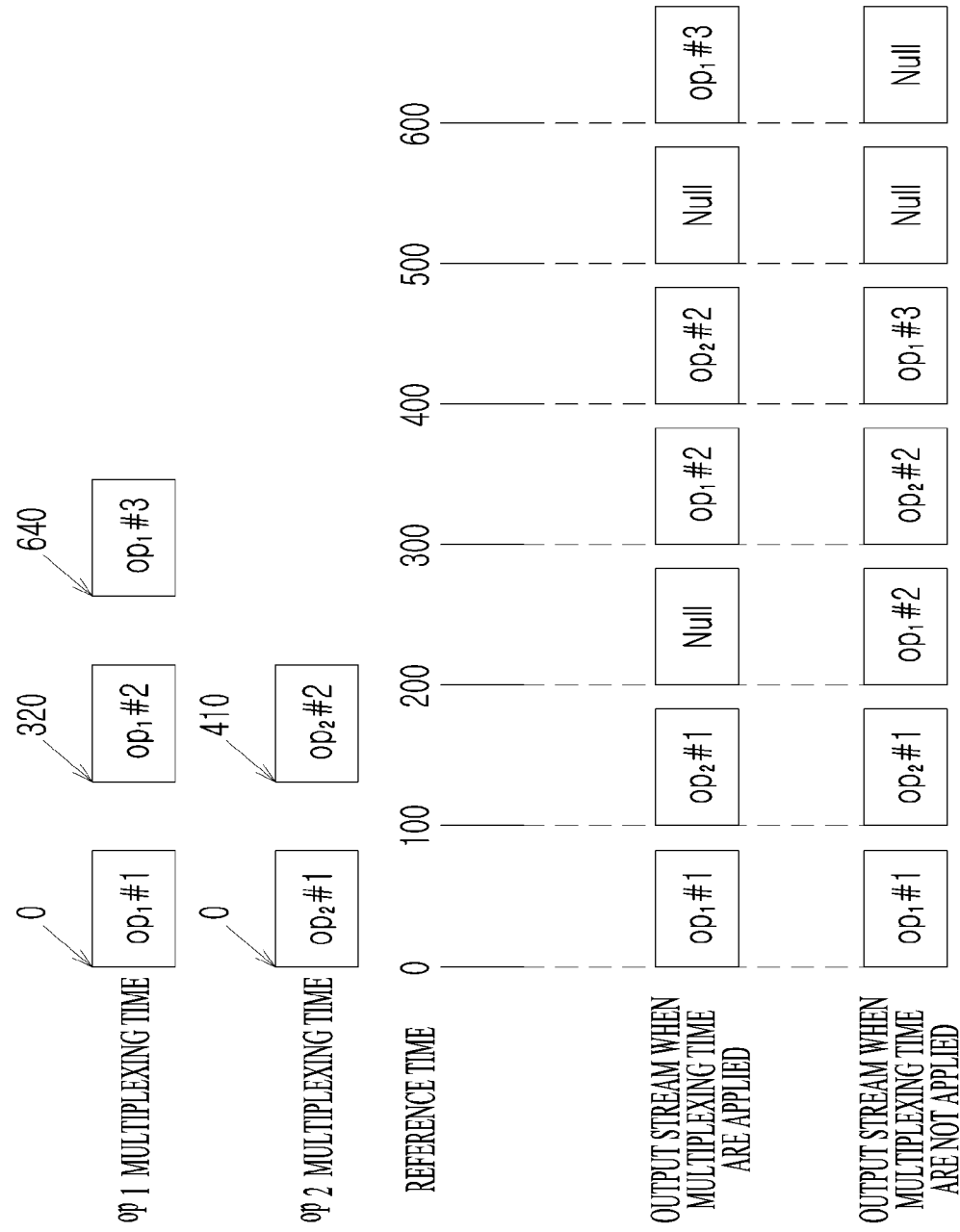
FIG. 18 is a diagram for describing multiplexing a plurality of output packets according to an embodiment.

As a concrete example, FIG. 18 is a diagram for describing multiplexing a plurality of output packets according to an embodiment.

In the embodiment of FIG. 18, the stream generator 1400 may obtain three video output packets (hereinafter referred to as first output packets) at a video ES bitrate for a certain time and obtain two audio output packets (hereinafter referred to as second output packets) at an audio ES bitrate for a certain time. The stream generator 1400 may set multiplexing time for the first output packets in units of 320 and set multiplexing time for the second output packets in units of 410. Furthermore, in the embodiment of FIG. 18, the stream generator 1400 may set multiplexing reference time in units of 100.

In one embodiment, when the first output packets and the second output packets are multiplexed without assigning multiplexing time thereto, the first output packets and the second output packets may be consecutively inserted into an output stream. Accordingly, in the output stream, null packets may be consecutively located after the first output packets and the second output packets.

Alternatively, the stream generator 1400 may multiplex the first output packets and the second output packets in consideration of the multiplexing time thereof.

Both a multiplexing time assigned to a first output packet #1 and a multiplexing time assigned to a second output packet #1 may be 0. In this case, the first output packet #1 and the second output packet #1 may vary according to locations corresponding to a reference time 0 and a reference time 100, into which the first output packet #1 and the second output packet #1 are inserted. In this case, the stream generator 1400 may insert a higher-priority output packet among the first output packet #1 and the second output packet #1 into a location corresponding to the reference time 0. Priorities of output packets will be described in more detail with reference to FIGS. 23 and 24 below.

Both the first output packets and the second output packets may not include output packets assigned multiplexing time between a reference time 200 and a reference time 300. Thus, the stream generator 1400 may insert a null packet into a location corresponding to the reference time 200. Similarly, since an output packet assigned a multiplexing time may not be present between a reference time 500 and a reference time 600, the stream generator 1400 may insert a null packet into a location corresponding to the reference time 500.

Accordingly, in the output stream, a null packet may be present between the second output packet #1 and a first output packet #2 and between a second output packet #2 and a first output packet #3. Thus, null packets may be dispersed in the output stream. Since null packets are dispersed in the output stream as described above, switching from a main stream providing device to a spare stream providing device may be prevented from occurring without causing any errors to occur.

The above description of operation S1330 of FIG. 13 may directly apply to operation S1730 and thus operation S1730 will not be described in detail here.

Although operations S1710 to S1730 have been described above with respect to the first output packets and the second output packets, embodiments are not limited thereto, and operations S1710 to S1730 may also apply to other packets. For example, the stream generator 1400 may obtain a plurality of video output packets and a plurality of audio output packet (or the plurality of video output packets, the plurality of audio output packets, and a plurality of data output packets) (here, the plurality of data output packets may be understood as a result of packetizing a data elementary stream into output packets) in operation S1710, assign multiplexing time to the plurality of video output packets and the plurality of audio output packets in operation S1720, and multiplex the plurality of video output packets and the plurality of audio output packet according to the multiplexing time in operation S1730.

Figure 19:
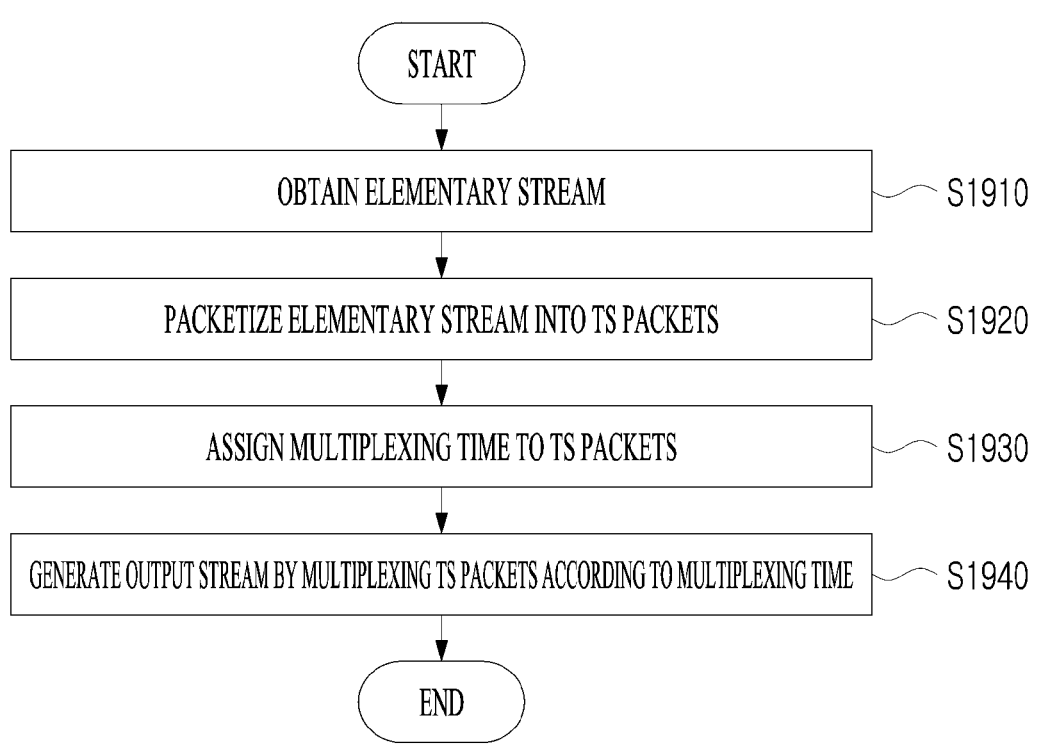
FIG. 19 is a flowchart of a method of multiplexing TS packets according to an embodiment.

FIG. 19 is a flowchart of a method of multiplexing TS packets according to an embodiment.

Referring to FIG. 19, the stream generator 1400 may obtain an elementary stream (operation S1910).

Next, the stream generator 1400 may packetize the elementary stream into TS packets (operation S1920).

Next, the stream generator 1400 may assign multiplexing time to the TS packets (operation S1930).

Next, the stream generator 1400 may generate an output stream by multiplexing the TS packets according to the multiplexing time (operation S1940).

The description of FIGS. 5 to 7, 11, and 13 to 18 may directly apply to operations S1910 to S1940 and thus operations S1910 to S1940 will not be described in detail here.

Figure 20:
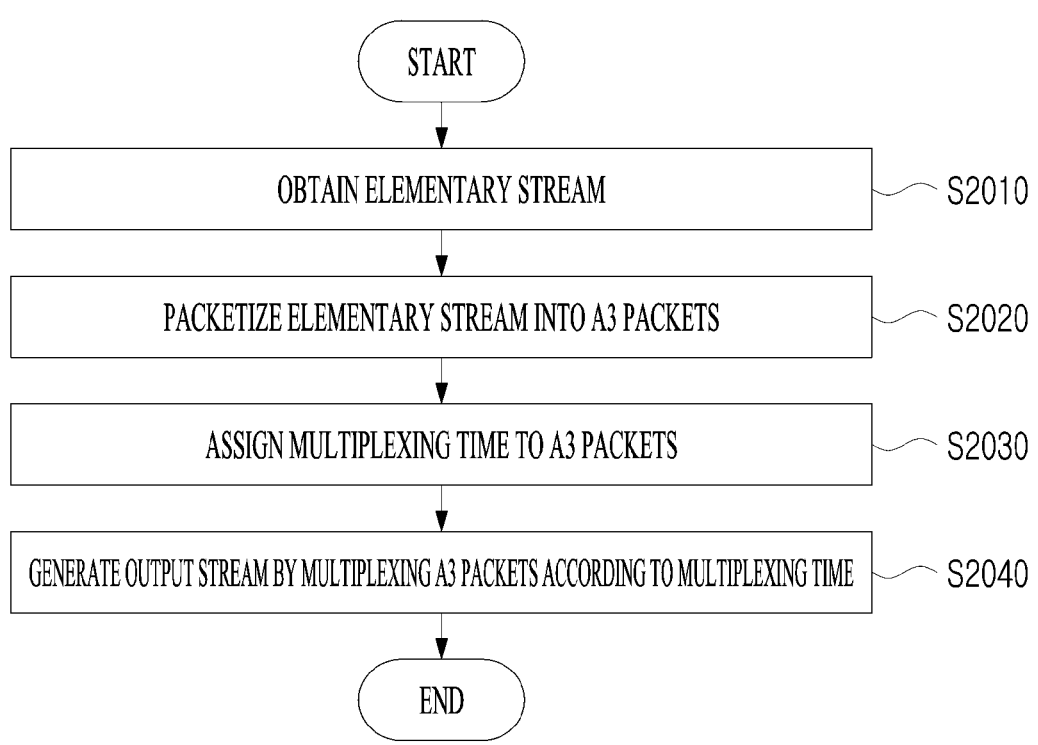
FIG. 20 is a flowchart of a method of multiplexing A3 packets according to an embodiment.

FIG. 20 is a flowchart of a method of multiplexing A3 packets according to an embodiment.

Referring to FIG. 20, the stream generator 1400 may obtain an elementary stream (operation S2010).

Next, the stream generator 1400 may packetize the elementary stream into A3 packets (operation S2020). In one embodiment, the stream generator 1400 may convert the elementary stream into the ISOBMFF, and generate A3 packets on the basis of the elementary stream converted into the ISOBMFF. The A3 packets may include ROUTE packets and/or MMTP packets.

The stream generator 1400 may assign multiplexing time to the A3 packets (operation S2030).

Furthermore, the stream generator 1400 may generate an output stream by multiplexing the A3 packets according to the multiplexing time (operation S2040).

The above description of FIGS. 5, 8 to 11, and 13 to 18 may directly apply to operations S1910 to S1940 and thus operations S1910 to S1940 may not be described in detail here.

Figure 21:
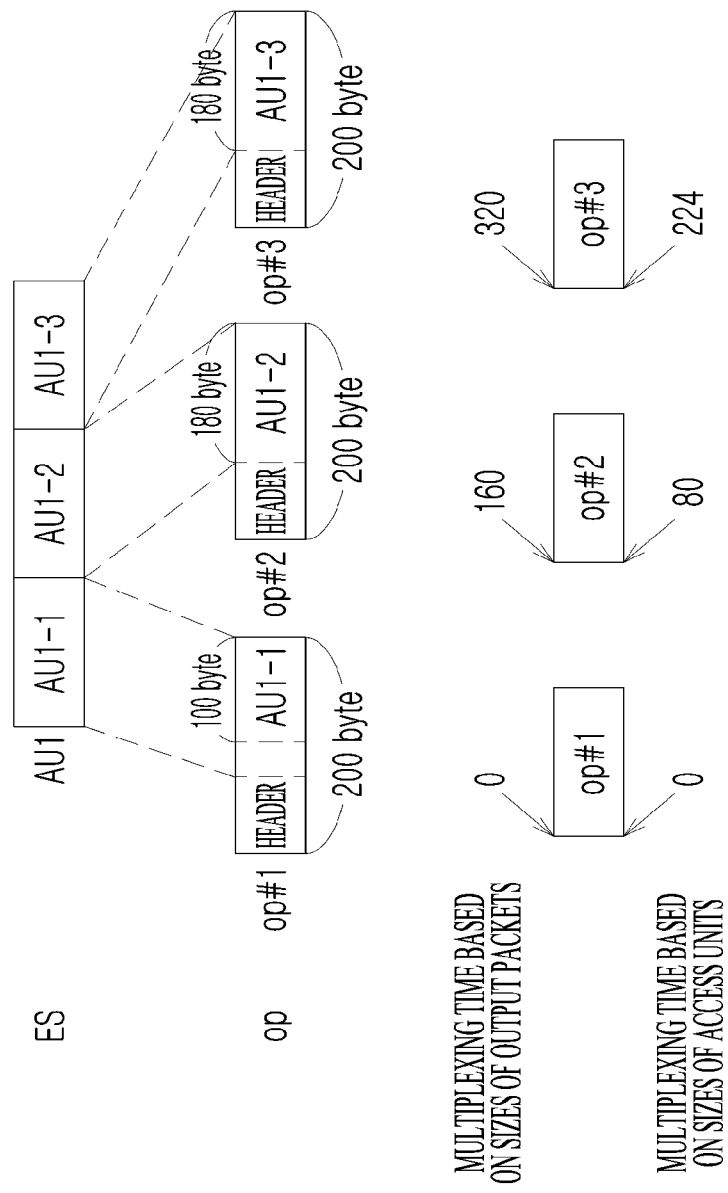
FIG. 21 is a diagram for describing setting of multiplexing time according to an embodiment.

FIG. 21 is a diagram for describing setting of multiplexing time according to an embodiment.

Referring to FIG. 21, the stream generator 1400 may generate an elementary stream at an ES bitrate of the video decoder 1200 or the audio decoder 1300.

In some embodiments, the stream generator 1400 may set multiplexing time in consideration of the types of the elementary stream and output packets. For example, the stream generator 1400 may set multiplexing time for output packets according to Equation 2 below.

$$t_{mux\_time} = OP_{acc\_bit}/ES_{bitrate}, \quad \text{[Equation 2]}$$

wherein $t_{mux\_time}$ represents a multiplexing time of an output packet, $OP_{acc\_bit}$ represents the number of bits of accumulated output packets, and $ES_{bitrate}$ represents an ES bitrate.

For example, when output packets #1 to #3 are 200 bytes long and the ES bitrate is 10 Mbps as in the embodiment of FIG. 21, a multiplexing time of the output packet #1 may be set to 0, a multiplexing time of the output packet #2 may be 160 μsec, and a multiplexing time of the output packet #3 may be set to 320 μsec.

In some embodiments, the stream generator 1400 may set multiplexing time in consideration of the sizes of access units included in the elementary stream and the output packets. For example, the stream generator 1400 may set multiplexing time for output packets according to Equation 3 below.

$$t_{mux\_time} = AU_{acc\_bit}/ES_{bitrate}, \quad \text{[Equation 3]}$$

wherein $t_{mux\_time}$ represents a multiplexing time of an output packet, $AU_{acc\_bit}$ represents the number of bits of accumulated access units included in the output packet, and $ES_{bitrate}$ represents an ES bitrate.

For example, as in the embodiment of FIG. 21, an access unit of the output packet #1 may be 100 bytes long, whereas access units of the output packet #2 and the output packet #3 may be each 180 bytes long. When the ES bitrate is 10 Mbps, a multiplexing time of the output packet #1 may be set to 0, a multiplexing time of the output packet #2 may be set to 80 μsec, and a multiplexing time of the output packet #3 may be set to 224 μsec.

Figure 22:
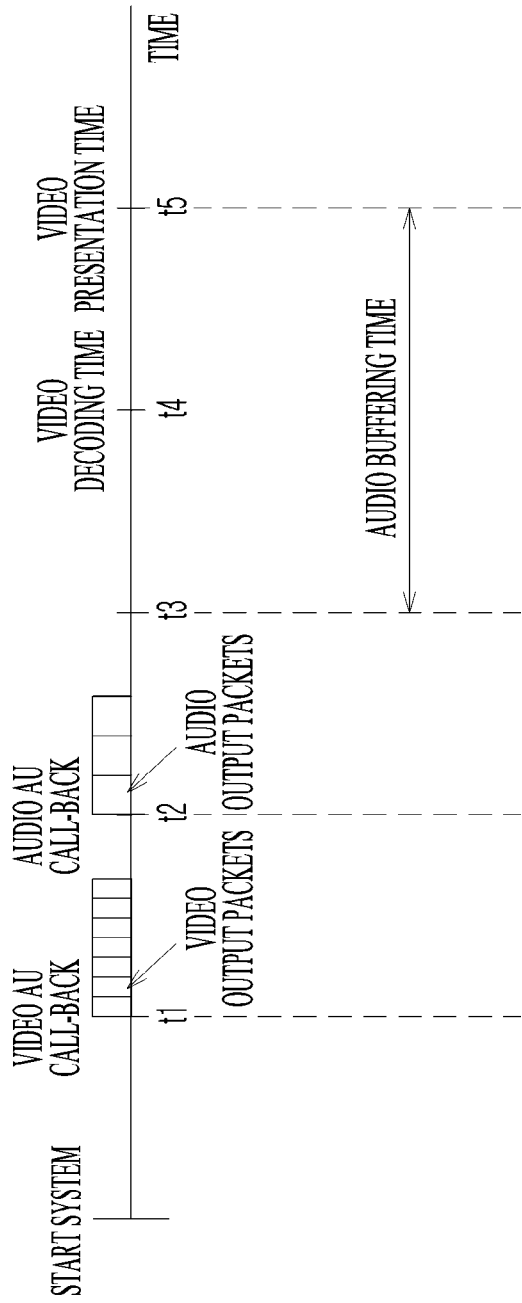
FIG. 22 is a diagram for describing setting of multiplexing time according to another embodiment.

FIG. 22 is a diagram for describing setting of multiplexing time according to another embodiment.

Referring to FIG. 22, the stream generator 1400 may set a multiplexing time differently according to the type of access unit.

In some embodiments, when a video access unit is included in an output packet, the stream generator 1400 may set a multiplexing time according to time when the video access unit included in the output packet is generated.

For example, the stream generator 1400 may set multiplexing time of output packets according to Equation 4 below.

$$t_{V\_mux\_time} = V\_AU_{acc\_bit}/V\_ES_{bitrate} + V\_AU_{delay}, \quad \text{[Equation 4]}$$

wherein $t_{V\_mux\_time}$ represents a multiplexing time of a video output packet including video access units, $V\_AU_{acc\_bit}$ represents the number of bits of accumulated video access units included in the output packet, and $V\_ES_{bitrate}$ represents a video ES bitrate. The stream generator 1400 may further consider $V\_AU_{delay}$. Here, $V\_AU_{delay}$ represents a first video access unit delay time, i.e., time when the stream generator 1400 first obtained the video access unit.

In the embodiment of FIG. 22, $V\_AU_{delay}$ may be t1, and the stream generator 1400 may perform multiplexing starting from a point of time t1 by setting multiplexing time of video output packets.

In some embodiments, when an output packet includes an audio access unit, the stream generator 1400 may set a multiplexing time of the audio access unit by taking into account not only time when the audio access unit included in the output packet is generated but also time when a video access unit is processed by the decoding device.

For example, the stream generator 1400 may set multiplexing time of the video output packets according to Equation 5 below.

$$t_{A\_mux\_time} = A\_AU_{acc\_bit}/A\_ES_{bitrate} + V\_AU_{delay} + (V\_AU_{pts} - V\_AU_{dts}) + V\_AU_{Buffer\_delay} - A\_Buffering, \quad \text{[Equation 5]}$$

wherein $t_{A\_mux\_time}$ represents a multiplexing time of an audio output packet including audio access units, $A\_AU_{acc\_bit}$ represents the number of bits of accumulated audio access units included in an output packet, and $A\_ES_{bitrate}$ represents an audio ES bitrate. $V\_AU_{delay}$ represents a first video access unit delay time. The stream generator 1400 may further consider $(V\_AU_{pts} - V\_AU_{dts})$ and $V\_AU_{Buffer\_delay}$. Here, $V\_AU_{pts}$ represents time when a first video access unit is reproduced, $V\_AU_{dts}$ represents time when the first video access unit is decoded, and $V\_AU_{Buffer\_delay}$ may represent a time that video access units are delayed in the buffer of the decoding device. Here, $V\_AU_{Buffer\_delay}$ may include CPB (Coded Picture Buffer) delay or VBV (Video Buffering Verifier) delay.

As described above, the stream generator 1400 may consider times that a video access unit is reproduced and decoded and a buffer delay time thereof to synchronize the video access unit with an audio access unit, since the video access unit is far greater in size than the audio access unit and is longer than the audio access unit in terms of a decoding time and a buffer delay time is decoded. Although not show in Equation 5 above, the stream generator 1400 may additionally consider a reordering time of the video access unit.

Furthermore, the stream generator 1400 may consider $A\_Buffering$ representing an audio buffering time in relation to a multiplexing time of the audio output packet. That is, the stream generator 1400 may multiplex the audio output packet starting from a point of time earlier by the audio buffering time than a point of time when the video access unit is reproduced by setting the multiplexing time of the audio output packet. In other words, in the embodiment of FIG. 22, the stream generator 1400 may obtain audio output packets at a point of time t2 but may multiplex the audio output packets starting from not the point of time t2 but a point of time t3 according to Equation 5 above.

Figure 23:
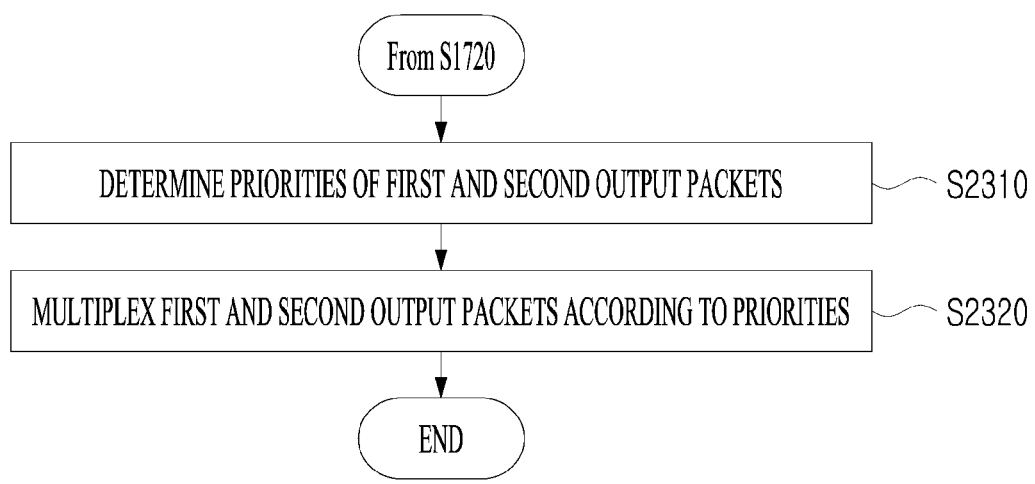
FIG. 23 is a flowchart of a multiplexing method performed in consideration of priority according to an embodiment.

FIG. 23 is a flowchart of a multiplexing method performed in consideration of priority according to an embodiment.

Referring to FIG. 23, the stream generator 1400 may determine priorities of the first and second output packets in operation S1730 of FIG. 17 described above (operation S2310). In detail, the stream generator 1400 may determine the priorities of the first and second output packets when the multiplexing time of the first and second output packets are the same or when the multiplexing time of the first and second output packets are different, but multiplexing reference time corresponding thereto are the same.

In one embodiment, the stream generator 1400 may determine the priorities of the first and second output packets according to the type of data included in the output packets. For example, when the first output packets include video access units and the second output packets include metadata related to the video access units (e.g., PSI information in the case of TS packets), the stream generator 1400 may determine the priority of the second output packets to be higher than that of the first output packets.

In another embodiment, when the first output packets include video access units and the second output packets include audio access units, the stream generator 1400 may determine the priority of the second output packets including the audio access units to be higher than that of the first output packets. However, embodiments are not limited thereto, and in another embodiment, the stream generator 1400 may determine the priority of the first output packets including video access units to be higher than that of the second output packets.

In one embodiment, when the multiplexing time of the first and second output packets are different and multiplexing reference time corresponding thereto are the same, the first or second output packets of earlier multiplexing time may be determined to be higher-priority packets.

In addition, the stream generator 1400 may determine the priorities of the first and second output packets according to various criteria.

In some embodiments, the stream generator 1400 may multiplex the first and second output packets according to the determined priorities (operation S2320). For example, when the priority of the second output packets is determined to be higher than that of the first output packets, the stream generator 1400 may preferentially include the second output packets in an output stream.

Figure 24:
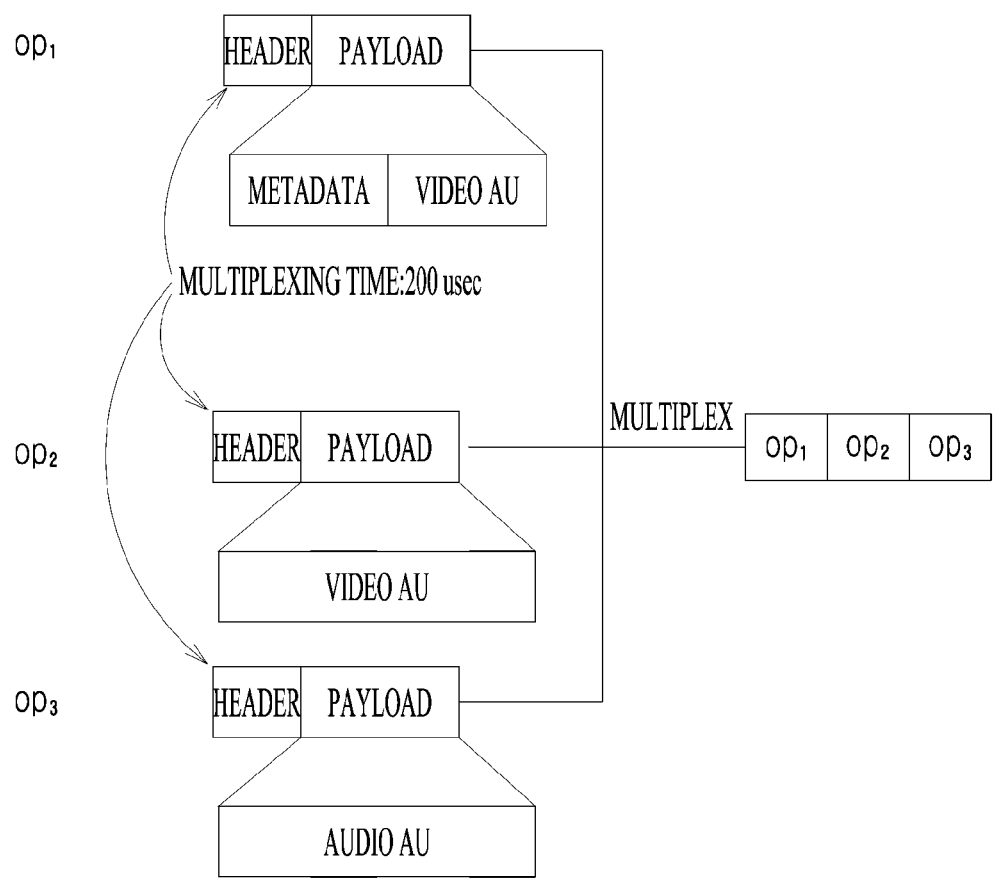
FIG. 24 is a diagram for describing multiplexing according to another embodiment.

As a concrete example, FIG. 24 is a diagram for describing multiplexing according to another embodiment.

Referring to FIG. 24, each of first to third output packets may include a header and a payload. In this case, the payload of the first output packet may include a video access unit and metadata of the video access unit, the payload of the second output packet may include a video access unit, and the payload of the third output packet may include an audio access unit. In this case, multiplexing time of the first to third output packets may be 200 μsec. In this case, the stream generator 1400 may determine priority of the first output packet, which includes the metadata, to be highest. Furthermore, the stream generator 1400 may determine priority of the second output packet including the video access unit to be higher than that of the third output packet including the audio access unit. In this case, the stream generator 1400 may configure an output stream in a sequence of the first output packet, the second output packet, and the third output packet.

Figure 25:
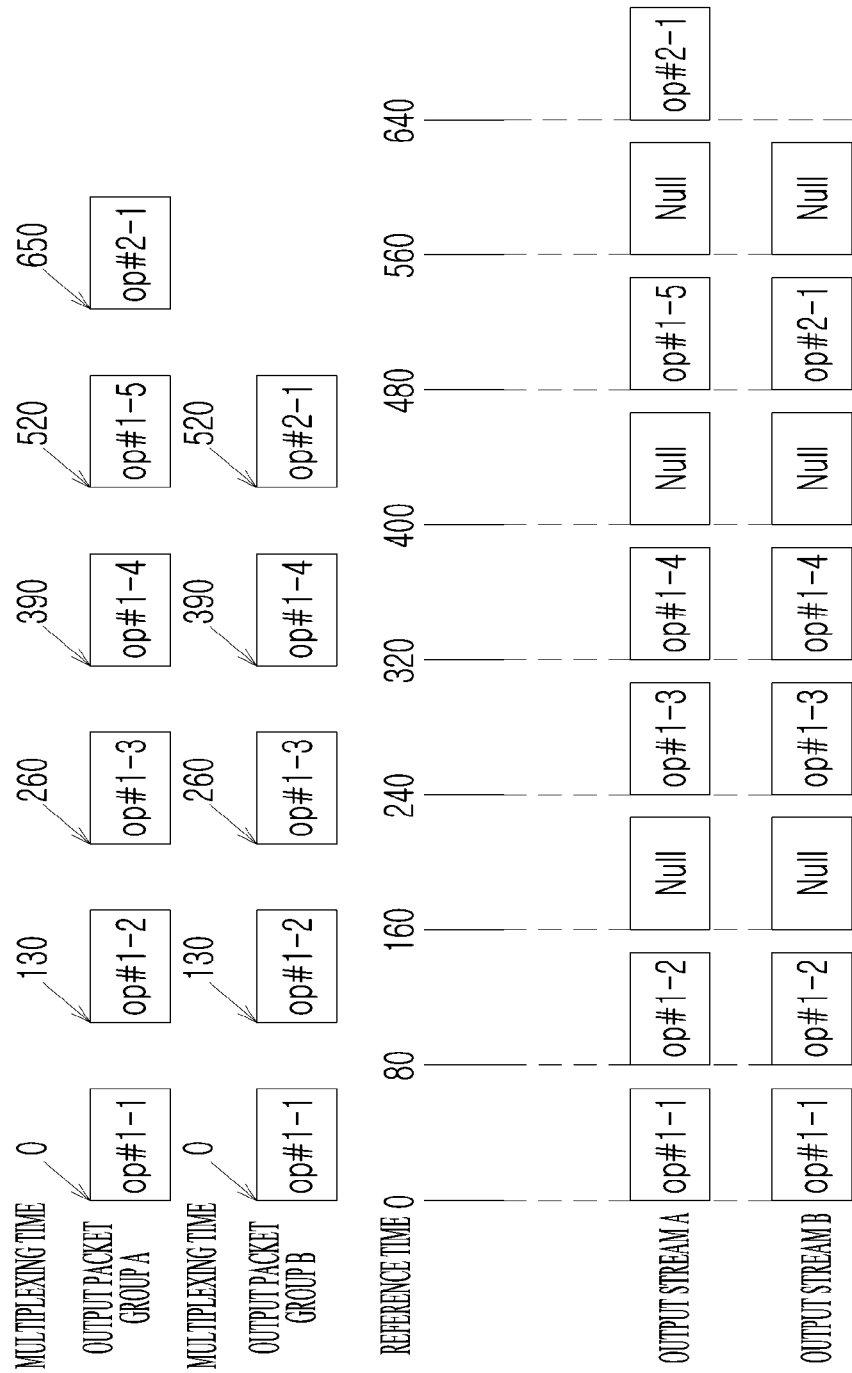
FIG. 25 is a diagram for describing an output stream when an actual elementary stream (ES) bitrate of a video encoder is less than a predetermined ES bitrate and multiplexing time are not adjusted.

FIG. 25 is a diagram for describing an output stream when an actual ES bitrate of the video encoder 1200 is less than a predetermined ES bitrate and multiplexing time are not adjusted.

Referring to FIG. 25, the controller 1600 may set an ES bitrate of the video encoder 1200. The video encoder 1200 may generate a video elementary stream according to the set ES bitrate. Thereafter, the packetizer 1470 may packetize the video elementary stream into output packets belonging to an output packet group A.

The multiplexer 1480 may obtain the output packet group A consisting of six output packets at the ES bitrate for a certain time. In the output packet group A, output packets #1-1 to #1-5 may be understood as output packets generated on the basis of an access unit #1, and an output packet #2-1 may be understood as an output packet generated on the basis of an access unit #2. That is, in the output packet group A, the output packets #1-1 to #1-5 may be output packets corresponding to a picture #1 of a source video signal, and the output packet #2-1 may be an output packet corresponding to a picture #2 from among the source video signals.

The multiplexer 1480 may set multiplexing time of the output packets belonging to the output packet group A in units of 130 according to a predetermined ES bitrate. Furthermore, in the embodiment of FIG. 25, the multiplexer 1480 may set reference time in units of 80 according to a predetermined output bitrate and generate an output stream A by comparing the multiplexing time of the output packets belonging to the output packet group A with the reference time. In this case, null packets are dispersed in the output stream A according to the multiplexing time of the output packets belonging to the output packet group A, and an output packet #2-1 may be inserted into a location corresponding to a reference time 640.

However, in some cases, an actual ES bitrate of the video encoder 1200 may be less than the predetermined ES bitrate of the video encoder 1200. For example, in the case of an output packet group B of FIG. 25, the video encoder 1200 may not generate five output packets but four output packets (output packets #1-1 to #1-4) as output packets corresponding to the picture #1. That is, five output packets may belong to the output packet group A and four output packets may belong to the output packet group B with respect to the same picture #1. The output packet group B may further include an output packet #2-1 corresponding to the picture #2.

In this case, similar to the output packet group A, the multiplexer 1480 may set multiplexing time of the output packets belonging to the output packet group B in units of 130 according to not the actual ES bitrate but the predetermined ES bitrate. Furthermore, in the embodiment of FIG. 25, the multiplexer 1480 may set reference time in units of 80 according to an output bitrate thereof and generate an output stream B by comparing the multiplexing time of the output packets belonging to the output packet group B with the reference time. In this case, since the multiplexing time of the output packets belonging to the output packet group B are set according to not the actual ES bitrate but the predetermined ES bitrate, the output packets belonging to the output packet group B may be output from the multiplexer 1480 earlier.

For example, the output packet #1-5 which is a last output packet of the output packet group A corresponding to the picture #1 may be inserted into a location on the output stream A corresponding to a reference time 480, whereas the output packet #1-4 which is a last output packet of the output packet group B corresponding to the picture #1 may be inserted into a location on the output stream B corresponding to a reference time 320 earlier than the reference time 480. The output packet #2-1 of the output packet group A corresponding to the picture #2 may be inserted into a location on the output stream A corresponding to the reference time 640, whereas the output packet #2-1 of the output packet group B corresponding to the picture #2 may be inserted into a location on the output stream B corresponding to the reference time 480 earlier than the reference time 640. In this case, the output packets of the output stream B are output earlier and thus a time that decoding of the output stream B waits in the buffer (e.g., a storage unit) of the decoding device may increase. In detail, when output packets are generated at the predetermined ES bitrate, the output packet #2-1 may be output in the output stream A at a point of time corresponding to the reference time 640. In this case, information regarding a decoding time may be included in the output packet #2-1, and the reference time 640 may match time when the output packet #2-1 is decoded by the decoding device, according to the information regarding the decoding time. However, when, as in the output packet group B, the actual ES bitrate is less than the predetermined ES bitrate, the output packet #2-1 is output in the output stream B at a point of time corresponding to the reference time 480 and may be thus understood as waiting in the decoding device for a time corresponding to the reference time 160. When such a process repeatedly occurs and the number of output packets waiting in the decoding device increases, an overflow may occur in the buffer of the decoding device.

Figure 26:
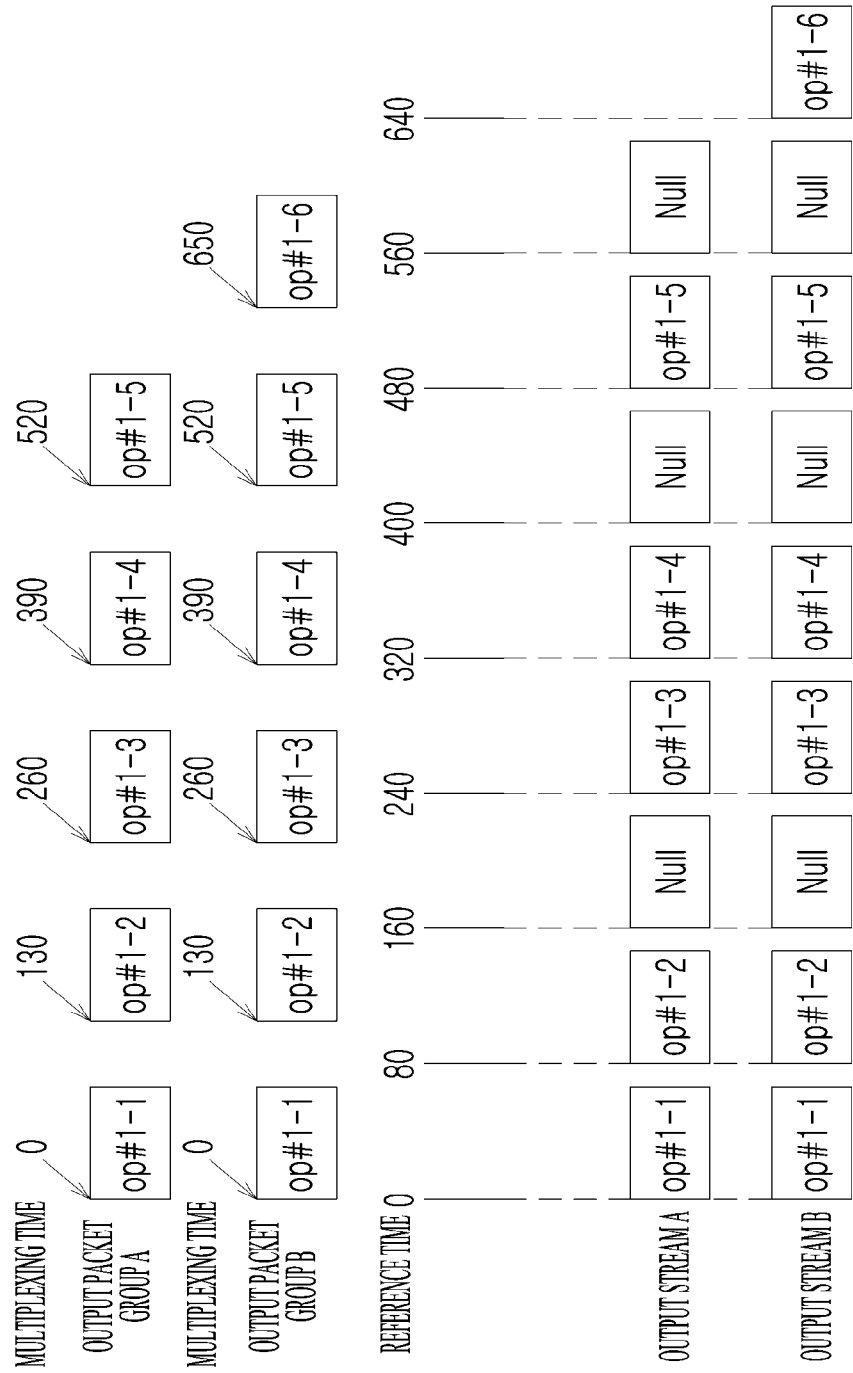
FIG. 26 is a diagram for describing an output stream when an actual ES bitrate of a video encoder is greater than a predetermined ES bitrate and multiplexing time are not adjusted.

FIG. 26 is a diagram for describing an output stream when an actual ES bitrate of the video encoder 1200 is greater than a predetermined ES bitrate and multiplexing time are not adjusted.

Referring to FIG. 26, the video encoder 1200 may generate a video elementary stream according to an ES bitrate set by the controller 1600, the packetizer 1470 may packetize the video elementary stream into output packets belonging to an output packet group A, and the multiplexer 1480 may generate an output stream A by comparing multiplexing time of the output packets with reference time. The above description of the output packet group A and the output stream A of FIG. 25 may apply to the output packet group A and the output stream A of FIG. 26.

In some cases, an actual ES bitrate of the video encoder 1200 may be greater than a predetermined ES bitrate thereof. For example, in the case of an output packet group B of FIG. 26, the video encoder 1200 may generate six output packets (output packets #1-1 to #1-6) corresponding to a picture #1 other than five output packets. That is, five output packets may belong to the output packet group A and six output packets may belong to the output packet group B with respect to the same picture #1. In this case, similar to the output packet group A, the multiplexer 1480 may set multiplexing time of the output packets belonging to the output packet group B in units of 130 according to the predetermined ES bitrate rather than the actual ES bitrate. Furthermore, in the embodiment of FIG. 26, the multiplexer 1480 may set reference time in units of 80 according to a predetermined output bitrate and generate an output stream B by comparing the multiplexing time of the output packets belonging to the output packet group B with the reference time. In this case, the multiplexing time of the output packets belonging to the output packet group B are set on the basis of the predetermined ES bitrate rather than the actual ES bitrate and thus the output packets belonging to the output packet group B may be output from the multiplexer 1480 later than at desired times. In this case, when the output packets are output later than the desired times, the output packets may not be decoded at a predetermined point of time.

For example, an output packet #1-5, which is a last output packet of the output packet group A corresponding to the picture #1, is inserted into a location on the output stream A corresponding to a reference time 480, whereas the output packet #1-6 which is a last output packet of the output packet group B may be inserted into a location on the output stream B corresponding to a reference time 640 which is later than the reference time 480. In this case, information regarding a decoding time may be included in each of the output packet #1-5 belonging to the output packet group A and the output packet #1-6 belonging to the output packet group B, and the reference time 480 may match times when the output packet #1-5 belonging to the output packet group A and the output packet #1-6 belonging to the output packet group B are decoded by the decoding device. However, the output packet #1-6 is output at the reference time 640 which is later than the reference time 480 and thus decoding of output packet #1-6 by the decoding device may be delayed for a time corresponding to a reference time 160. When this process repeatedly occurs, transmission of output packets to the decoding device is continuously delayed and thus an underflow may occur in the buffer of the decoding device.

Figure 27:
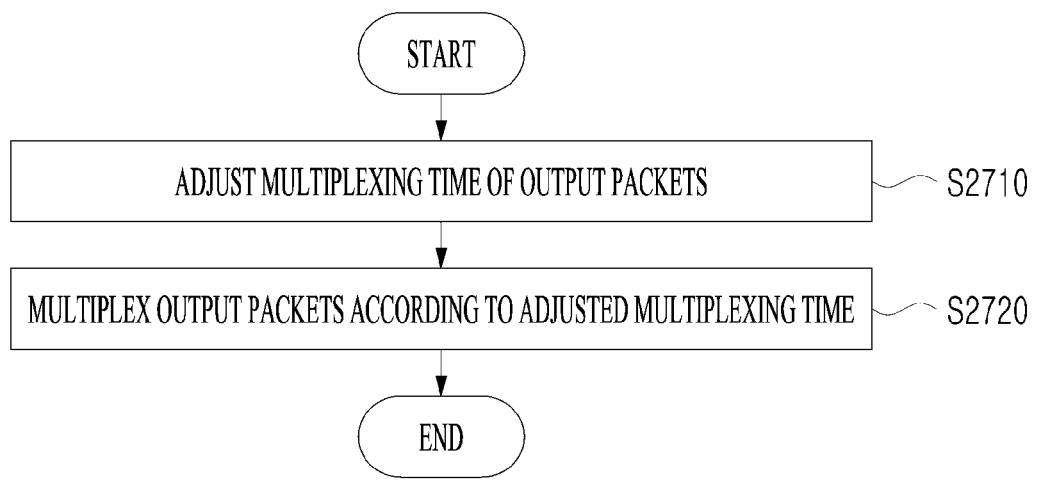
FIG. 27 is a flowchart of a method of adjusting a point of time when an output packet is to be output according to an embodiment.

FIG. 27 is a flowchart of a method of adjusting a point of time when an output packet is to be output according to an embodiment.

Times when output packets are to be output in the form of an output stream may be determined by multiplexing time assigned to output packets. Furthermore, due to a mismatch between the multiplexing time assigned to the output packets and an ES bitstream, an overflow may occur in the buffer of the decoding device when times that the output packets are output are moved forward or decoding of the output packets by the decoding device may be delayed when times that the output packets are output are later than expected.

In this case, the stream generator 1400 may adjust the multiplexing time of the output packets to change times when the output packets are output in the form of an output stream.

In some embodiments, as in the embodiments of FIGS. 25 and 26, the stream generator 1400 may adjust the multiplexing time of the output packets when a predetermined bitrate and an actual bitrate are different. In one embodiment, the predetermined bitrate may be understood as a predetermined ES bitrate set previously by the encoders 1200 and 1300 to generate an elementary stream, and the actual bitrate may be understood as an ES bitrate at which an output stream is actually output from the encoders 1200 and 1300. In another embodiment, the predetermined bitrate may be understood as a bitrate previously set by the packetizer 1470 to packetize an elementary stream into output packets, and the actual bitrate may be understood as a bitrate at which the output packets are provided from the packetizer 1470 to the multiplexer 1480.

For convenience of explanation, the predetermined bitrate and the actual bitrate will be described with respect to an ES stream applied to the encoders 1200 and 1300 below. Furthermore, the method of adjusting a point of time when an output packet is to be output will be described focusing on an actual ES bitrate of the video encoder 1200 among the encoders 1200 and 1300 below. However, a predetermined ES bitrate and an actual ES bitrate which will be described below may also apply to various types of bitrates other than the ES bitrate (for example, a bitrate previously set by the packetizer 1470 to packetize an elementary stream and a bitrate at which an output packet is actually provided from the packetizer 1470 to the multiplexer 1480). The adjusting of the point of time when the output packet is to be output may be understood to include appropriately providing the output packet so as not to cause an error to occur in the decoding device when the predetermined bitrate and the actual bitrate are different. Thus, the adjusting of the point of time when the output packet is to be output may be understood as compensating for the bitrate. In addition, the method of adjusting a point of time when an output packet is to be output may be understood as a method of adjusting a point of time when an output packet is to be provided.

Although for convenience of explanation it will be described below that the sizes of output packets are the same, embodiments are not limited thereto and the sizes of the output packets may be different. For example, the size of an output packet according to the predetermined ES bitrate and the size of an output packet according to the actual ES bitrate, which is greater or less in size than the predetermined ES bitrate, may be different. Furthermore, the sizes of output packets obtained at the same ES bitrate may be different.

In some embodiments, the stream generator 1400 may adjust multiplexing time of output packets (operation S2710). Here, the adjusting of the multiplexing time of the output packets may be understood as assigning, to at least some of the output packets, multiplexing time different from the multiplexing time assigned to the output packets in operation S1720 described above. For example, in the embodiment of FIG. 18, when multiplexing time 0, 320, and 640 are assigned to the first output packets in operation S1720, other multiplexing time may be assigned to at least some of the first output packets in operation S2710. In other words, the adjusting of the multiplexing time of the output packets in operation S2710 may be understood as changing multiplexing time previously assigned to the output packets to other multiplexing time or assigning multiplexing time different from the multiplexing time assigned in operation S1720 to the output packets while no multiplexing time are assigned to the output packets. In one embodiment, when the stream generator 1400 changes the multiplexing time previously assigned to the output packets to other multiplexing time, operation S2710 may be performed after operation S1320 or S1330 of FIG. 13. When the stream generator 1400 assigns multiplexing time different from the multiplexing time assigned in operation S1720 to the output packets while no multiplexing time are assigned to the output packets, operation S2710 may be performed after operation S1310 of FIG. 13.

The adjusting of the multiplexing time on the basis of the output packets has been described above, but embodiments are not limited thereto and multiplexing time may be adjusted on the basis of access units.

In some embodiments, the stream generator 1400 may multiplex the output packets according to the adjusted multiplexing time (operation S2720). That is, the stream generator 1400 may generate an output stream by multiplexing the output packets by comparing the adjusted multiplexing time with reference time. The above description of operation S1730 may apply to operation S2720 and thus operation S2720 is not described in detail here.

More specifically, in some embodiments, in operation S2710, the stream generator 1400 may adjust the multiplexing time by adding a certain adjustment value to or subtracting the certain adjustment value from the multiplexing time to be assigned to the output packets (of the multiplexing time assigned to the output packets). For example, the stream generator 1400 may adjust the multiplexing time according to Equation 6 below.

$$t_{ad\_mux\_time} = t_{mux\_time} \pm \Delta t_{ad},$$ [Equation 6]

wherein $t_{mux\_time}$ represents a multiplexing time previously assigned to each of output packets, $\Delta t_{ad}$ represents an adjusted value, and $t_{ad\_mux\_time}$ represents an adjusted multiplexing time. $\Delta t_{ad}$ represents a predetermined constant. Here, a predetermined constant or a plurality of predetermined constants may be set. For example, the stream generator 1400 may adjust the multiplexing time by adding the same adjustment value to or subtracting the same adjustment values from the multiplexing time of the output packets or by adding different adjustment values to or subtracting different adjustment values from the multiplexing time of the output packets. For example, the stream generator 1400 may apply different adjustment values according to the number of the output packets to which the multiplexing time are assigned and the sizes of the output packets, and adjust the multiplexing time by changing the adjustment value when the multiplexing time assigned to the output packets exceed a predetermined time. As described above, the multiplexing time may be adjusted by adding the adjustment value thereto or subtracting the adjustment value therefrom according to Equation 6 above. Thus, the stream generator 1400 may quickly adjust a speed at which the output packets are output without checking the actual ES bitrate.

In one embodiment, the stream generator 1400 may adjust the multiplexing time by comparing the actual ES bitrate and the predetermined ES bitrate to each other. In detail, when the actual ES bitrate is less than the predetermined ES bitrate, the stream generator 1400 may adjust the multiplexing time by adding the adjustment value thereto or subtracting the adjustment value therefrom.

When the actual ES bitrate is less than the predetermined ES bitrate, the output packets may be output earlier than expected and thus an overflow may occur in the buffer of the decoding device. In this case, when the multiplexing time are delayed, the outputting of the output packets may be delayed and thus the occurrence of an overflow in the buffer of the decoding device may be prevented. Accordingly, when the actual ES bitrate is less than the predetermined ES bitrate, the stream generator 1400 may adjust the multiplexing time by adding the adjustment value thereto so that the output packets may be output at desired times.

Figure 28:
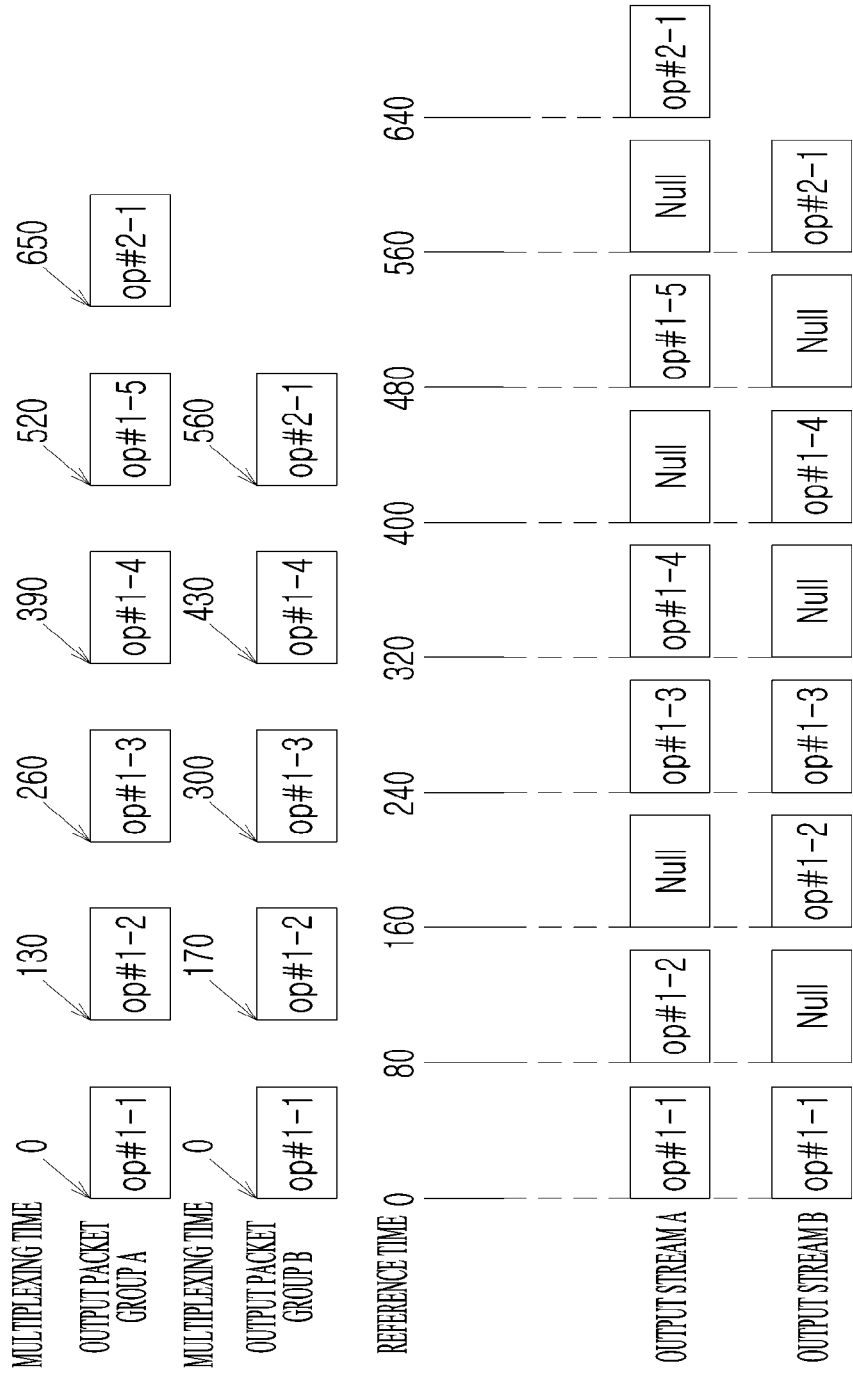
FIG. 28 is a diagram for describing adjustment of a multiplexing time according to an embodiment.

As a concrete example, FIG. 28 is a diagram for describing adjustment of a multiplexing time according to an embodiment.

In FIG. 28, an output packet group A and an output packet group B may include output packets which are substantially the same as those of the output packet group A and the output packet group B of FIG. 25. For example, in the output packet group A, output packets #1-1 to #1-5 may be output packets corresponding to a picture #1 of a source video signal, and an output packet #2-1 may be an output packet corresponding to a picture #2 of the source video signal. In the output packet group B, output packets #1-1 to #1-4 may be output packets corresponding to a picture #1 of a source video signal, and an output packet #2-1 may be an output packet corresponding to a picture #2 of the source video signal.

The stream generator 1400 may set multiplexing time of the output packets belonging to the output packet group A in units of 130 according to a predetermined ES bitrate. However, when the multiplexing time of the output packet group A apply to the output packet group B, the output packets of the output packet group B may be output earlier than expected. In order to output the output packets of the output packet group B at desired times, the stream generator 1400 may adjust the multiplexing time by adding an adjustment value thereto.

In detail, in the embodiment of FIG. 28, the adjustment value may be 40. Thus, the stream generator 1400 may add the multiplexing time of the output packets belonging to the output packet group B by adding the adjustment value of 40 thereto according to Equation 6. Although in the embodiment of FIG. 28 the multiplexing time of the output packet #1-1 of the output packet group B is fixed to 0, the embodiments are not limited thereto and the multiplexing time of the output packet #1-1 may be also adjusted.

The stream generator 1400 may generate an output stream B by comparing the adjusted multiplexing time with reference time. With the adjustment of the multiplexing time, an output packet #2-1 of the output stream B of FIG. 28 may be output at a point of time corresponding to a reference time 560 which is later than the point of time at which the output packet #2-1 of the output stream B of FIG. 25 is output. That is, sequencing an output packet #1-1 to the output packet #2-1 and null packets in the output stream B of FIG. 28 may be different from sequencing the output packets #1-1 to #2-1 and null packets in the output stream B of FIG. 25.

Although FIG. 28 illustrates an example in which the output packet #2-1 of the output stream B is output at a point of time corresponding to a reference time 560 which is earlier than the point of time when the output packet #2-1 of the output stream A is output, the point of time when the output packet #2-1 of the output stream B is output may be the same as that when the output packet #2-1 of the output stream A is output, according to the adjustment value. For example, when the adjustment value is 120, the output packet #2-1 of the output stream B may be output at a point of time corresponding to a reference time 640, similar to the output packet #2-1 of the output stream A. As described above, when an actual ES bitrate is less than a predetermined ES bitrate, the stream generator 1400 may adjust output packets to be output later than expected. Accordingly, a time period for which the output packets waits in the buffer of the decoding device may be decreased and an overflow may be prevented from occurring in the buffer of the decoding device.

In one embodiment, when the actual ES bitrate is greater than the predetermined ES bitrate, the stream generator 1400 may adjust the multiplexing time by subtracting the adjustment value therefrom.

When the actual ES bitrate is greater than the predetermined ES bitrate, the output packets may be output later than expected and thus may not be decoded by the decoding device at a desired time. Furthermore, an underflow may occur in the buffer of the decoding device. In this case, when the multiplexing time are moved forward, the output packets may be output more quickly and thus may be decoded by the decoding device at a desired time. Accordingly, when the actual ES bitrate is greater than the predetermined ES bitrate, the stream generator 1400 may adjust the multiplexing time by subtracting the adjustment value therefrom so that the output packets may be output at desired times and an underflow may be prevented from occurring in the buffer of the decoding device.

Figure 29:
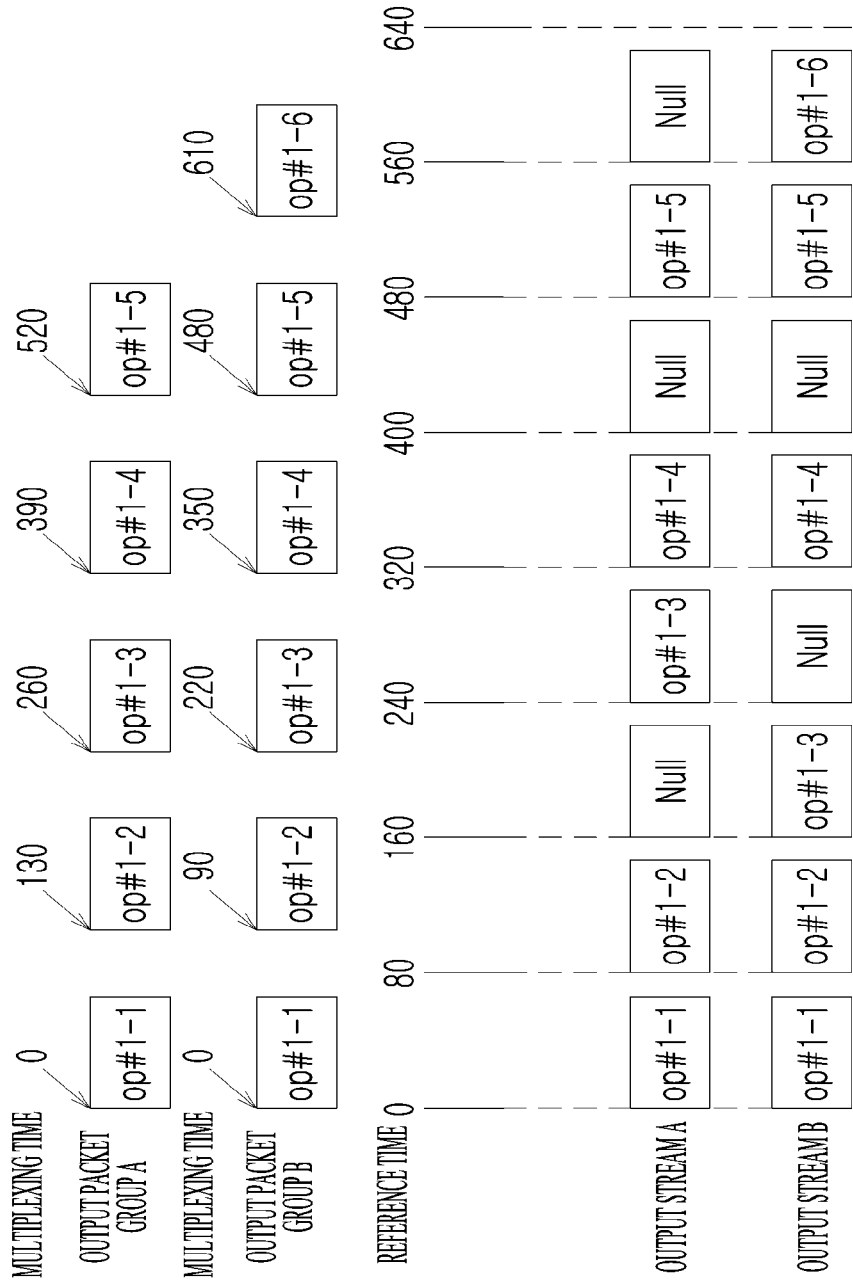
FIG. 29 is a diagram for describing adjustment of a multiplexing time according to another embodiment.

As a concrete example, FIG. 29 is a diagram for describing adjusting a multiplexing time according to another embodiment.

In FIG. 29, an output packet group A and an output packet group B may include output packets which are substantially the same as those of the output packet group A and the output packet group B of FIG. 26. For example, in the output packet group A, output packets #1-1 to #1-5 may be output packets corresponding to a picture #1 of a source video signal. In the output packet group B, output packets #1-1 to #1-4 may be output packets corresponding to the picture #1 of a source video signal.

The stream generator 1400 may set multiplexing time of the output packets of the output packet group A in units of 130 according to a predetermined ES bitrate. However, when the multiplexing time of the output packet group A apply to the output packet group B, the output packets of the output packet group B may be output later than expected. In order to output the output packets of the output packet group B at desired times, the stream generator 1400 may adjust the multiplexing time by subtracting a certain adjustment value therefrom.

In detail, in the embodiment of FIG. 29, the adjustment value may be 40. Thus, the stream generator 1400 may adjust the multiplexing time of the output packets of the output packet group B by subtracting the adjustment value of 40 therefrom according to Equation 6. Similar to the embodiment of FIG. 28, in the embodiment of FIG. 29, the multiplexing time of the output packet #1-1 of the output packet group B is fixed to 0, but embodiments are not limited thereto and the multiplexing time of the output packet #1-1 may be adjusted.

The stream generator 1400 may generate an output stream B by comparing the adjusted multiplexing time with reference time. With the adjustment of the multiplexing time, in the output stream B of FIG. 29, an output packet #1-6 may be output at a point of time corresponding to a reference time 560 which is earlier than the point of time when the output packet #1-6 of the output stream B of FIG. 26 is output. That is, sequencing the output packets #1-1 to #1-6 and null packets in the output stream B of FIG. 29 may be different from sequencing the output packets #1-1 to #1-6 and null packets in the output stream B of FIG. 26.

Although FIG. 29 illustrates an example in which the output packet #1-6 of the output stream B is output at a point of time corresponding to the reference time 560, which is later than the point of time when the output packet #1-5 of the output stream A is output, the point of time when the output packet #1-6 of the output stream B is output may be the same as that when the output packet #1-5 of the output stream A is output, according to the adjustment value. For example, when the adjustment value is 100, the output packet #1-6 of the output stream B may be output at a point of time corresponding to the reference time 480, which is similar to the output packet #1-5 of the output stream A.

As described above, when an actual ES bitrate is greater than a predetermined ES bitrate, the stream generator 1400 may adjust the output packets to be output more quickly, thereby preventing the output packets from being decoded by the decoding device at undesired times or preventing an underflow from occurring in the buffer of the decoding device.

In some embodiments, the stream generator 1400 may adjust the multiplexing time to be assigned to output packets (or the multiplexing time assigned to the output packets) by reflecting the actual ES bitrate thereinto. For example, the stream generator 1400 may adjust the multiplexing time according to Equation 7 below.

$$t_{ad\_mux\_time} = t_{mux\_time} \times (ES_{bitrate\_set}/ES_{bitrate\_act}), \quad \text{[Equation 7]}$$

wherein $t_{mux\_time}$ represents a multiplexing time previously assigned to each output packet, $ES_{bitrate\_set}$ represents a predetermined ES bitrate, and $ES_{bitrate\_act}$ represents an actual ES bitrate. In one embodiment, the stream generator 1400 may obtain the actual ES bitrate and adjust the multiplexing time according to Equation 7 above. For example, the stream generator 1400 may obtain the actual ES bitrate from the encoders 1200 and 1300 and calculate the actual ES bitrate by using the number of bits of elementary streams output from the encoders 1200 and 1300 for a certain time.

When Equation 7 is applied, Equation 2 may be modified into Equation 8 below and Equation 3 may be modified into Equation 9 below.

$$t_{ad\_mux\_time} = OP_{acc\_bit}/ES_{bitrate\_act} \quad \text{[Equation 8]}$$

$$t_{ad\_mux\_time} = AU_{acc\_bit}/ES_{bitrate\_act}, \quad \text{[Equation 9]}$$

wherein $OP_{acc\_bit}$ represents the number of accumulated bits of output packets, and $AU_{acc\_bit}$ represents the number of accumulated bits of access units included in the output packets. That is, Equations 8 and 9 may be understood to mean that multiplexing time are set by replacing the predetermined ES bitrate with the actual ES bitrate when the multiplexing time are adjusted by applying Equation 7 thereto. Accordingly, the actual ES bitrates are reflected in the multiplexing time and thus the output packets may be output in an output stream more exactly at desired times.

Figure 30:
FIG. 30 is a diagram for describing adjustment of a multiplexing time according to another embodiment.

As a concrete example, FIG. 30 is a diagram for describing adjusting a multiplexing time according to another embodiment.

Referring to FIG. 30, output packets may be 188 bytes long. In this case, an output packet group A may include output packets generated at an actual ES bitrate which is the same as a predetermined ES bitrate, an output packet group B may include output packets generated at an actual ES bitrate which is less than the predetermined ES bitrate, and an output packet group C may include output packets generated at an actual ES bitrate which is greater than the predetermined ES bitrate. Here, the predetermined ES bitrate may be 5 Mbps, the actual ES bitrate of the output packet group B may be 4 Mbps less than the predetermined ES bitrate, and the actual ES bitrate of the output packet group C may be 6 Mbps greater than the predetermined ES bitrate. Output packets #1-1 to #1-5 of the output packet group A, output packets #1-1 to #1-4 of the output packet group B, and output packets #1-1 to #1-6 of the output packet group C may be output packets corresponding to a picture #1 of a source video signal. Output packets #2-1 of the output packet groups A, B, and C may be output packets corresponding to a picture #2 of the source video signal. Output streams A, B, and C may respectively correspond to the output packet groups A, B, and C.

Since an output bitrate of an output stream is 7 Mbps, a multiplexing reference time may be 214 µsec. That is, an output packet may be inserted into an output stream at intervals of 214 µsec.

In one embodiment, since the predetermined ES bitrate and the actual ES bitrate of the output packet group A are the same, the stream generator 1400 may set multiplexing time of the output packets of the output packet group A according to the predetermined ES bitrate of 5 Mbps. The stream generator 1400 may adjust multiplexing time of the output packets of the output packet groups B and C by reflecting the actual ES bitrates thereof, i.e., 4 Mbps and 6 Mbps, according to Equation 7. Accordingly, the multiplexing time of the output packets of the output packet group B may be adjusted to be later than the multiplexing time of the output packets of the output packet group A, and the multiplexing time of the output packets of the output packet group C maybe adjusted to be earlier than the multiplexing time of the output packets of the output packet group A.

Furthermore, the stream generator 1400 may multiplex the output packets of the output packet group A, B, and C according to the multiplexing time of the output packets.

When the multiplexing time of the output packet #2-1 of the output stream B is not adjusted, the output packet #2-1 is output at time corresponding to a reference time of 1074 µsec which is the same as a time when the output packet #1-5 of the output stream A is output. When the multiplexing time of the output packet #2-1 of the output stream B is adjusted, the output packet #2-1 is output at time corresponding to a reference time of 1504 µsec which is the same as a time when the output packet #2-1 of the output stream A is output. Accordingly, when the actual ES bitrate is less than the predetermined ES bitrate, the stream generator 1400 may adjust the output of the output packets to be delayed, thereby decreasing a time period for which the output packets wait in the buffer of the decoding device and preventing an overflow from occurring in the buffer of the decoding device.

When the multiplexing time of the output packet #1-6, which is a last output packet of the output stream C corresponding to the picture #1, is not adjusted, the output packet #1-6 is output at a time corresponding to a reference time of 1504 µsec which is the same as the time when the output packet #2-1 of the output stream A is output. However, when the multiplexing time of the output packet #1-6 of the output stream C is adjusted, the output packet #1-6 of the output stream B may be output at a time corresponding to the reference time of 1074 µsec which is the same as the time when the output packet #1-5, which is a last packet of the output stream A corresponding to the picture #1, is output. As described above, when the actual ES bitrate is greater than the predetermined ES bitrate, the stream generator 1400 may adjust the output packets to be output more quickly, thereby preventing the output packets from being decoded at an undesired time by the decoding device. As described above, when the multiplexing time are adjusted according to Equation 7, the last output packets of the output packet groups A, B, and C corresponding to the picture #1 may be output at the same point of time and the first output packets of the output packet groups A, B, and C corresponding to the picture #2 may also be output at the same point of time. Thus, when the actual ES bitrate is reflected into the adjustment of the multiplexing time, the output packets may be transmitted to the decoding device more exactly at desired times.

However, embodiments are not limited thereto, and the stream generator 1400 may adjust the multiplexing time assigned to the output packets by reflecting the actual ES bitrate thereto even when a certain adjustment value is added to or subtracted from the multiplexing time. For example, after the actual ES bitrate is obtained, the stream generator 1400 may select an adjustment value corresponding to the difference between the actual ES bitrate and the predetermined ES bitrate from among a plurality of adjustment values and apply the selected adjustment value in the adjustment of the multiplexing time. As described above, even when the adjustment value is added to or subtracted from the multiplexing time assigned to the output packets, the actual ES bitrate may be reflected into the multiplexing time so that the output packets may be transmitted to the decoding device more exactly at desired times.

Figure 31:
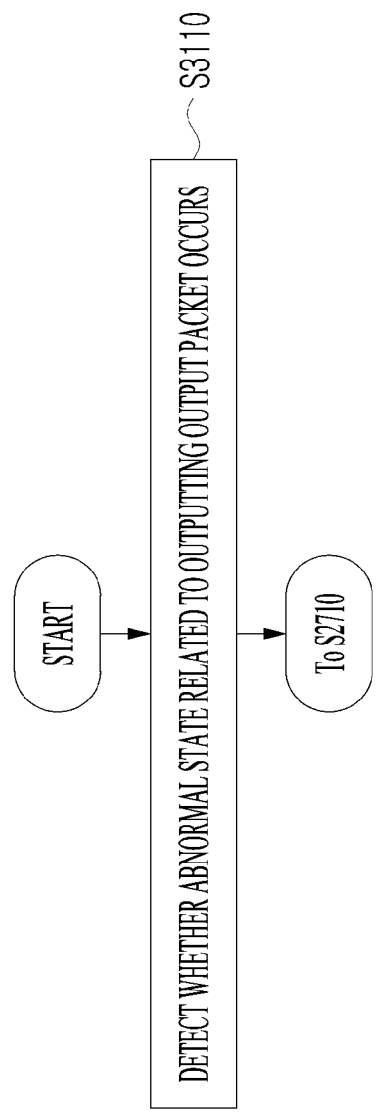
FIG. 31 is a flowchart of a method of adjusting a point of time when an output packet is to be output according to another embodiment.

FIG. 31 is a flowchart of a method of adjusting a point of time when an output packet is to be output according to another embodiment.

Referring to FIG. 31, the stream generator 1400 may detect whether an abnormal state (or an error) related to outputting an output packet occurs (operation S3110). Here, whether the abnormal state related to outputting the output packet occurs may be understood to include whether an actual ES bitrate does not match a predetermined ES bitrate, whether an overflow or an underflow occurs in the buffer of the decoding device, whether the output packet is output to the decoding device at an undesired time and/or whether an error occurs in the decoding device due to the output of the output packet to the decoding device at an undesired time. In addition, whether the abnormal state related to outputting the output packet occurs may include whether all abnormal states related to outputting the output packet occur.

In one embodiment, the stream generator 1400 may obtain information from the decoding device regarding whether the abnormal state related to outputting the output packet occurs. For example, the stream generator 1400 may obtain information regarding whether an overflow or an underflow occurs in the buffer of the decoding device or whether the output packet is decoded by the decoding device at an undesired time.

Furthermore, the stream generator 1400 may determine whether the abnormal state related to outputting the output packet occurs on the basis of the information obtained from the decoding device. In this case, the stream generator 1400 may determine whether the abnormal state related to outputting the output packet occurs after an output stream including the output packet is transmitted from the stream providing device 10000.

When information indicating that an overflow occurs in the buffer of the decoding device is obtained from the decoding device, the stream generator 1400 may determine that the actual ES bitrate is less than the predetermined ES bitrate. As another example, when information indicating that the output packet cannot be decoded by the decoding device at a desired time or information indicating that an underflow occurs in the buffer of the decoding device is obtained from the decoding device, the stream generator 1400 may determine that the actual ES bitrate is greater than the predetermined ES bitrate.

In another embodiment, the stream generator 1400 may determine whether the abnormal state related to outputting the output packet occurs without additionally obtaining the information from the decoding device. In this case, the stream generator 1400 may determine whether the abnormal state related to outputting the output packet occurs before the output stream including the output packet is transmitted from the stream generation device 1000 to the decoding device. Alternatively, the stream generator 1400 may determine whether the abnormal state related to outputting the output packet occurs after the output stream including the output packet is transmitted from the stream providing device 1000 to the decoding device.

For example, the stream generator 1400 may obtain the actual ES bitrate from the encoders 1200 and 1300 at predetermined time intervals or at a certain point of time or may obtain the actual ES bitstream using the number of bits of elementary streams output from the encoders 1200 and 1300 for a certain time. The stream generator 1400 may determine whether the actual ES bitrate and the predetermined ES bitrate match each other by comparing the obtained actual ES bitrate with the predetermined ES bitrate.

As another example, the stream providing device 1000 may include a virtual buffer. Here, the virtual buffer is configured to predict load of the buffer of the decoding device. The stream providing device 1000 may operate the virtual buffer by predicting the amount of data to be stored in the buffer of the decoding device and a point of time when the data is to be removed from the buffer of the decoding device. For example, the stream providing device 1000 may predict the amount of data to be stored in the buffer of the decoding device on the basis of the amount of an output stream provided from the stream providing device 1000 and predict the point of time when the data is to be removed from the buffer of the decoding device on the basis of information regarding time when output packets are decoded and/or information regarding time when the output packets are reproduced.

In one embodiment, when the amount of data stored in the virtual buffer is greater than a certain reference value, the stream generator 1400 may determine that an overflow occurs in the buffer of the decoding device and the actual ES bitrate is less than the predetermined ES bitrate. When the amount of data stored in the virtual buffer is less than the certain reference value, the stream generator 1400 may determine that an underflow occurs in the buffer of the decoding device and the actual ES bitrate is greater than the predetermined ES bitrate.

In one embodiment, when it is determined that the abnormal state related to outputting the output packet occurs, the stream generator 1400 may perform operation S2710 to adjust multiplexing time of the output packets.

Figure 32:
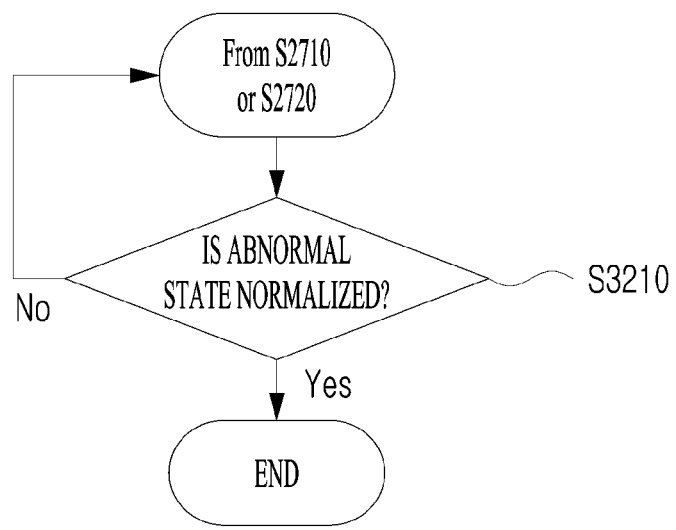
FIG. 32 is a flowchart of a method of adjusting a point of time when an output packet is to be output according to another embodiment.

FIG. 32 is a flowchart of a method of adjusting a point of time when an output packet is to be output according to another embodiment.

Referring to FIG. 32, the stream generator 1400 may determine whether an abnormal state related to outputting an output packet is normalized (operation S3210). Here, the normalization of the abnormal state may be understood to mean that the actual ES bitrate matches the predetermined ES bitrate, an overflow or an underflow does not occur in the buffer of the decoding device, the output packet is output to the decoding device at a desired time and/or an error occurring in the decoding device due to the output of the output packet at a time different from the desired time is normalized. In addition, the normalizing of the abnormal state may be understood to include various other situations in which the abnormal state is normalized until the actual ES bitrate matches the predetermined ES bitrate.

In one embodiment, the stream generator 1400 may determine whether the abnormal state is normalized in a similar way to the detecting of whether the abnormal state occurs in operation S3110 of FIG. 31. For example, the stream generator 1400 may determine whether the abnormal state is normalized by obtaining information from the decoding device indicating whether the abnormal state related to outputting the output packet is normalized. For example, the stream generator 1400 may obtain information indicating whether an overflow or an underflow occurring in the buffer of the decoding device is normalized or information indicating whether the output packet is decoded by the decoding device at a desired time. In this case, the stream generator 1400 may determine whether the abnormal state related to outputting the output packet is normalized after an output stream including the output packet is transmitted from the stream providing device 1000. For example, the stream generator 1400 may determine whether the abnormal state related to outputting the output packet is normalized after operations S2710 and S2720 are performed and an output stream including output packets, the multiplexing time of which are adjusted, is transmitted from the stream providing device 1000 to the decoding device.

As another example, the stream generator 1400 may determine whether the abnormal state is normalized without additionally obtaining the information from the decoding device. In this case, the stream generator 1400 may determine whether the abnormal state related to outputting the output packet is normalized before the output stream including the output packet is transmitted from the stream providing device 1000. For example, the stream generator 1400 may determine whether the abnormal state related to outputting the output packet is normalized before operation S2720 is performed or before the output stream including output packets, the multiplexing time of which are adjusted, is transmitted from the stream providing device 1000 to the decoding device. Alternatively, the stream generator 1400 may determine whether the abnormal state related to outputting the output packet is normalized after the output stream including the output packet is transmitted from the stream providing device 1000 to the decoding device.

For example, the stream generator 1400 may determine whether an overflow or an underflow occurring in the buffer of the decoding device is normalized on the basis of the amount of data stored in the virtual buffer, or may determine whether the abnormal state is normalized by obtaining an actual ES bitrate from the encoders 1200 and 1300 at a predetermined time interval or a certain time point or by obtaining an actual ES bitrate using the number of bits of elementary streams output from the encoders 1200 and 1300 for a certain time.

When it is determined that the abnormal state is normalized, the stream generator 1400 may stop adjusting multiplexing time or may continue the adjustment of the multiplexing time by performing operations S2710 and S2720. For example, in operation S3210, when it is determined that the actual ES bitrate matches the predetermined ES bitrate, the adjustment of the multiplexing time may be stopped. However, operations S2710 and S2720 may be performed when the actual ES bitrate does not match the predetermined ES bitrate, when an overflow or an underflow occurring in the buffer of the decoding device is normalized, or when it is determined that the output packets are to be decoded by the decoding device at a desired time.

Alternatively, the stream generator 1400 may continue the adjustment of multiplexing time of which an abnormal state is not normalized by performing operations S2710 and S2720. In this case, in operation S2710, the stream generator 1400 may readjust the multiplexing time. Here, the readjustment of the multiplexing time may be understood as applying, to the output packets, multiplexing time different from the multiplexing time previously adjusted in operation S2710.

For example, when the stream generator 1400 adds a certain adjustment value to or subtracts the adjustment value from the multiplexing time assigned to the output packets according to Equation 6, the multiplexing time may be readjusted by changing the adjustment value. As a concrete example, after adjusting the multiplexing time using a smaller adjustment value among a plurality of adjustment values, the stream generator 1400 may readjust the multiplexing time by increasing the adjustment value when it is determined that the abnormal state is not normalized. For example, when it is determined that the abnormal state is not normalized after the multiplexing time are adjusted by setting the adjustment value to 30, the stream generator 1400 may readjust the multiplexing time by changing the adjustment value to 40. Thereafter, the multiplexing time may be adjusted by fixing the adjustment value to 40 when it is determined that the abnormal state is normalized and the multiplexing time may be adjusted by changing the adjustment value to 50 when it is determined that the abnormal state is not normalized. Alternatively, the multiplexing time may be readjusted by decreasing the adjustment value when it is determined that the abnormal state is not normalized after the multiplexing time are adjusted using a larger adjustment value among the plurality of multiplexing time adjustment values.

As another example, when the stream generator 1400 adjusts the multiplexing time by reflecting an actual ES bitrate thereto according to Equations 7 to 9, the stream generator 1400 may adjust the multiplexing time by reflecting a recently obtained actual ES bitrate thereto, i.e., the stream generator 1400 may update the actual ES bitrate and adjust the multiplexing time on the basis of the updated actual ES bitrate.

In one embodiment, the stream generator 1400 may readjust the multiplexing time of an output packet before the output packet is transmitted in an output stream to the decoding device. For example, when the stream generator 1400 determines that an abnormal state related to outputting the output packet is not normalized before the output stream including the output packet is transmitted, the stream generator 1400 may readjust the multiplexing time of the output packet before the output packet is transmitted in the output stream to the decoding device.

In another embodiment, after an output packet is transmitted in an output stream to the decoding device, the stream generator 1400 may readjust the multiplexing time of another output packet. For example, when the stream generator 1400 determines that an abnormal state related to outputting an output packet is not normalized after an output stream including the output packet is transmitted, the stream generator 1400 may readjust the multiplexing time of an output packet subsequent to the output packet.

Figure 33:
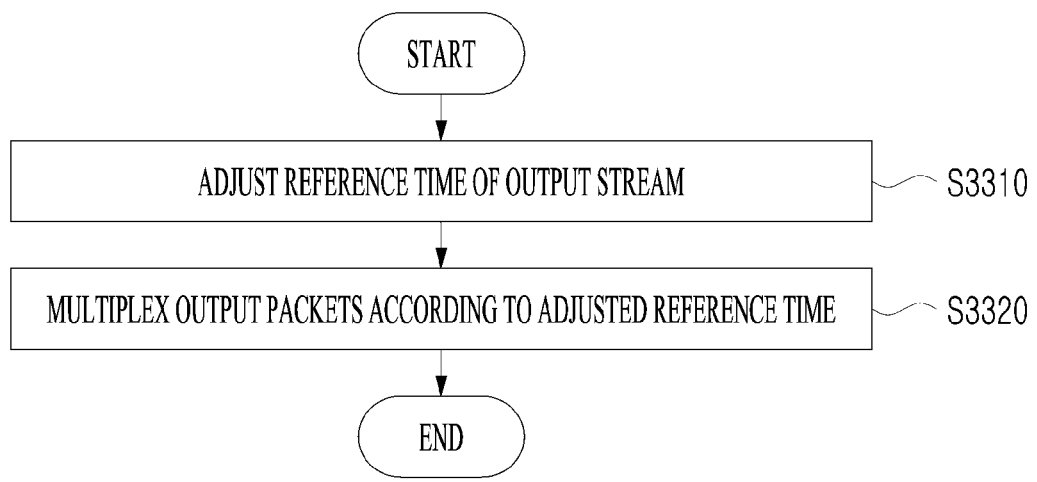
FIG. 33 is a flowchart of a method of adjusting a point of time when an output packet is to be output according to another embodiment.

FIG. 33 is a flowchart of a method of adjusting a point of time when an output packet is to be output according to another embodiment.

Referring to FIG. 33, the stream generator 1400 may adjust a reference time of an output stream (operation S3310). Here the adjustment of the reference time may be understood as adjusting an output bitrate of the output stream.

That is, as described above, an abnormal state related to outputting an output packet may occur when an actual ES bitrate and a predetermined ES bitrate do not match each other. A method of adjusting a multiplexing time to resolove the abnormal state has been described above with reference to FIG. 27 but is not limited thereto. For example, in operation S3310, the abnormal state may be normalized by adjusting the reference time of the output stream.

In one embodiment, the stream generator 1400 may adjust the reference time by adding a certain adjustment value to or subtracting the adjustment value from multiplexing time to be assigned to output packets (or the multiplexing time assigned to the output packets). For example, the stream generator 1400 may adjust the reference time according to Equation 10 below.

$$t_{ad\_mux\_ref} = t_{mux\_ref} \pm \Delta t_{ad\_ref} \qquad \text{[Equation 10]}$$

wherein $t_{mux\_ref}$ represents a current reference time, $\Delta t_{ad\_ref}$ represents an adjustment value for adjusting a reference time, and $t_{ad\_mux\_ref}$ represents an adjusted reference time. $\Delta t_{ad}$ represents a predetermined constant. Here, a predetermined constant or a plurality of predetermined constants may be set. For example, the stream generator 1400 may adjust the reference time by adding the same adjustment value to or subtracting the same adjustment value from each of the output packets or by adding different adjustment values to or subtracting the different adjustment values from each of the output packets. For example, the stream generator 1400 may apply different adjustment values according to the number of the output packets assigned with the multiplexing time and the sizes of the output packets. When the multiplexing time assigned to the output packets exceed a predetermined time, the stream generator 1400 may adjust the reference time by changing the adjustment value.

In one embodiment, the stream generator 1400 may adjust the reference time by comparing an actual ES bitrate and a predetermined ES bitrate to each other. In detail, when the actual ES bitrate is less than the predetermined ES bitrate, the stream generator 1400 may adjust the reference time by adding the adjustment value thereto. When the actual ES bitrate is less than the predetermined ES bitrate, the output packets should be provided to the decoding device at a low speed to prevent an overflow from occurring in the decoding device, and the reference time should be increased to provide the output packets to the decoding device at the low speed.

In contrast, when actual ES bitrate is greater than the predetermined ES bitrate, the stream generator 1400 may adjust the reference time by subtracting the adjustment value therefrom. When the actual ES bitrate is greater than the predetermined ES bitrate, the output packets should be provided earlier to the decoding device to prevent an underflow from occurring in the decoding device and decode the output packets at a desired time, and the reference time should be decreased to provide the output packets earlier to the decoding device.

In some embodiments, the stream generator 1400 may adjust the reference time by reflecting the actual ES bitrate. For example, the stream generator 1400 may adjust the reference time according to Equation 11 below.

$$t_{ad\_mux\_ref} = t_{mux\_ref} \times (ES_{bitrate\_set}/ES_{bitrate\_act}),$$ [Equation 11]

wherein $t_{mux\_ref}$ represents a current reference time, $ES_{bitrate\_set}$ represents a predetermined ES bitrate, and $ES_{bitrate\_act}$ represents an actual ES bitrate.

Alternatively, the stream generator 1400 may adjust the reference time by reflecting the actual ES bitrate even when a certain adjustment value is added to or subtracted from the reference time. For example, after the actual ES bitrate is obtained, the stream generator 1400 may select an adjustment value corresponding to the difference between the actual ES bitrate and the predetermined ES bitrate among a plurality of adjustment values and apply the selected adjustment value to the adjustment of the reference time.

In some embodiments, when the actual ES bitrate and the predetermined ES bitrate do not match each other, the stream generator 1400 may adjust an output bitrate to prevent the occurrence of an abnormal state related to outputting the output packets.

As described above, the stream generator 1400 may adjust points of time when the output packets are to be output by simply adjusting either a reference time of the output stream or the output stream.

Although operation S3310 in which only the reference time of the output stream is adjusted has been described above, embodiments are not limited thereto and both the adjustment of the reference time in operation S3310 and the adjustment of the multiplexing time in operation S2710 may be performed to adjust the points of times when the output packets are to be output.

In some embodiments, the stream generator 1400 may multiplex the output packets according to the adjusted reference time (operation S3320). That is, the stream generator 1400 may generate an output stream by multiplexing the output packets by comparing the multiplexing time with the adjusted reference time. The above description of operations S1730 and S2720 may apply to operation S3320 and thus operation S3320 will not be described in detail here.

In one embodiment, an output stream may be provided by multiplexing the output packets not to prevent an error from occurring in a broadcasting system.

In one embodiment, an output stream available in an ATSC 3.0 broadcasting system may be provided.

In one embodiment, an output stream available in a UHD broadcasting system may be provided.

In one embodiment, a method of multiplexing output packets to prevent an error from occurring in a decoding device, performed by a stream providing device, may be provided.

Effects of the present disclosure should not be understood as being limited to the above-described effects, and other unmentioned effects will be clearly understood by those of ordinary skill in the art from the present specification and the accompanying drawings.

The method according to an embodiment may be implemented as program instructions executable by a variety of computers and recorded on a computer-readable medium. The computer-readable recording medium may include a program instruction, a data file, a data structure, or a combination thereof. The program instruction recorded on the recording medium may be designed and configured specifically for an embodiment or can be publicly known and available to those who are skilled in the field of computer software. Examples of the computer-readable medium include a magnetic medium, such as a hard disk, a floppy disk, and a magnetic tape, an optical medium, such as a compact disk read-only memory (CD-ROM), a digital versatile disk (DVD), etc., a magneto-optical medium such as a floptical disk, and a hardware device specially configured to store and perform program instructions, for example, a ROM, random access memory (RAM), flash memory, etc. Examples of the program instruction include not only machine code generated by a compiler or the like but also high-level language codes that may be executed by a computer using an interpreter or the like. The above exemplary hardware device may be configured to operate as one or more software modules in order to perform the operation of an embodiment, and vice versa.

Although the present disclosure has been described with reference to specific embodiments and features, it should be appreciated that various variations and modifications may be made from the disclosure by those skilled in the art. For example, suitable results may be achieved if the described techniques are performed in a different order and/or if components in a described system, architecture, device, or circuit are combined in a different manner and/or replaced or supplemented by other components or their equivalents.

Accordingly, other implementations, embodiments, and equivalents are within the scope of the following claims.

What is claimed is:

1. A method for adjusting output packet provision timing of a stream generation device, wherein the stream generation device providing an output stream including output packets to a decoding device, the method comprising:
   obtaining a first output packet and a second output packet;
   assigning a first multiplexing time to the first output packet and a second multiplexing time different than the first multiplexing time to the second output packet;
   multiplexing the first output packet and the second output packet based on the first multiplexing time and the second multiplexing time; and
   providing the multiplexed first output packet and second output packet as the output stream to the decoding device,
   wherein a timing that the first output packet and the second output packet are provided to the decoding device is adjusted such that an error related to the first output packet and the second output packet does not occur in the decoding device,
   wherein the first output packet and the second output packet are preset to be obtained at a first bitrate, and
   wherein the first multiplexing time and the second multiplexing time are adjusted such that the timing that the first output packet and the second output packet are provided to the decoding device is adjusted, when the first output packet and the second output packet are obtained at a second bitrate different than the first bitrate.

2. The method of claim 1, wherein the providing the multiplexed first output packet and second output packet comprises:
setting a first reference time for multiplexing the first output packet and a second reference time for multiplexing the second output packet based on a predetermined output bitrate;
sequencing the first output packet to the output stream by comparing the first reference time and the first multiplexing time; and
sequencing the second output packet to the output stream by comparing the second reference time and the second multiplexing time.

3. The method of claim 2, wherein
the assigning a first multiplexing time to the first output packet and a second multiplexing time different than the first multiplexing time to the second output packet comprises assigning the first multiplexing time the first output packet and the second multiplexing time to the second output packet based on the first bitrate.

4. The method of claim 1, wherein the the first multiplexing time and the second multiplexing time are adjusted without using the second bitrate.

5. The method of claim 4, wherein the first multiplexing time and the second multiplexing time are adjusted by applying a predetermined adjustment value to the first multiplexing time and the second multiplexing time.

6. The method of claim 5, wherein the first multiplexing time and the second multiplexing time are adjusted by increasing the first multiplexing time and the second multiplexing time using the predetermined adjustment value when the first bitrate is larger than the second bitrate.

7. The method of claim 5, wherein the first multiplexing time and the second multiplexing time are adjusted by decreasing the first multiplexing time and the second multiplexing time using the predetermined adjustment value when the first bitrate is smaller than the second bitrate.

8. The method of claim 1, wherein the first multiplexing time and the second multiplexing time are adjusted using the second bitrate.

9. The method of claim 8, wherein the first multiplexing time and the second multiplexing time are adjusted.

10. The method of claim 8, wherein a predetermined adjustment value is selected among a plurality of adjustment values based on a difference between the first bitrate and the second bitrate, and
wherein the first multiplexing time and the second multiplexing time are adjusted by applying the selected predetermined adjustment value to the first multiplexing time and the second multiplexing time.

11. The method of claim 1, wherein the timing that the first output packet and the second output packet are provided to the decoding device is adjusted when an error related to the first output packet and the second output packet occurs in the decoding device.

12. The method of claim 11, further comprising:
obtaining information on the error from the decoding device, and
determining whether or not the error has occurred in the decoding device based on the information.

13. The method of claim 11, further comprising:
estimating a time at which the first output packet and the second output packet are stored in a storage unit of the decoding device based on a virtual buffer in the stream generation device, and a time at which the first output packet and the second output packet are removed in the storage unit, and
determining whether or not the error has occurred in the decoding device based on the time at which the first output packet and the second output packet are stored in the storage unit and the time at which the first output packet and the second output packet are removed in the storage unit.

14. The method of claim 1, wherein the error related to the first output packet and the second output packet includes an overflow in a storage unit of the decoding device.

15. The method of claim 1, wherein the error related to the first output packet and the second output packet includes a thing that at least one of the first output packet and the second output packet is not decoded at an intended time in the decoding device.

16. The method of claim 3, wherein the first reference time and the second reference time are adjusted so that the timing when the first output packet and the second output packet are provided to the decoding device is adjusted.

17. A non-transitory computer-readable recording medium having recorded thereon a program for performing the method of claim 1.

18. A stream generation device for providing an output stream including an output packet to a decoding device, the stream generation device comprising:
a control unit is configured to obtaining a first output packet, assigning a first multiplexing time to the first output packet, multiplexing the first output packet according to the first multiplexing time, and providing the multiplexed first output packet as the output stream to the decoding device,
wherein a timing that the first output packet is provided to the decoding device is adjusted such that an error related to the first output packet is not occurred in the decoding device,
wherein the first output packet is preset to be obtained at a first bitrate, and
wherein the first multiplexing time is adjusted such that the timing that the first output packet is provided to the decoding device is adjusted, when and the first output packet is obtained at a second bitrate different than the first bitrate.

* * * * *